United States Patent
Fujii

(10) Patent No.: US 9,163,105 B2
(45) Date of Patent: Oct. 20, 2015

(54) CONJUGATED DIENE BASED POLYMER, AND POLYMER COMPOSITION CONTAINING THE POLYMER

(71) Applicant: Sumitomo Chemical Company, Limited, Tokyo (JP)

(72) Inventor: Mana Fujii, Singapore (SG)

(73) Assignee: Sumitomo Chemical Company, Limited, Tokyo (JP)

( * ) Notice: Subject to any disclaimer, the term of this patent is extended or adjusted under 35 U.S.C. 154(b) by 0 days.

(21) Appl. No.: 14/197,647

(22) Filed: Mar. 5, 2014

(65) Prior Publication Data
US 2014/0275404 A1    Sep. 18, 2014

(30) Foreign Application Priority Data

Mar. 12, 2013    (JP) .................. 2013-048763

(51) Int. Cl.
- *C08F 236/22* (2006.01)
- *C08K 3/04* (2006.01)
- *C08F 236/06* (2006.01)
- *C08F 236/10* (2006.01)
- *C08F 4/48* (2006.01)

(52) U.S. Cl.
CPC ............. *C08F 236/22* (2013.01); *C08F 236/06* (2013.01); *C08F 236/10* (2013.01); *C08K 3/04* (2013.01)

(58) Field of Classification Search
CPC ...... C08F 4/086; C08F 236/06; C08F 236/08; C08F 236/22; C08K 3/04
USPC ............................ 526/173, 336, 180; 524/573
See application file for complete search history.

(56) References Cited

U.S. PATENT DOCUMENTS

| | | | | |
|---|---|---|---|---|
| 2,683,162 | A | * | 7/1954 | Gleason ................... 558/377 |
| 2,829,065 | A | * | 4/1958 | Gleason et al. ............ 585/12 |
| 3,586,661 | A | * | 6/1971 | Parris et al. ............ 526/142 |
| 4,397,994 | A | | 8/1983 | Takeuchi et al. |

FOREIGN PATENT DOCUMENTS

| | | |
|---|---|---|
| JP | S63-179908 A | 7/1988 |
| WO | 9640846 A1 | 12/1996 |
| WO | 9723520 A1 | 7/1997 |
| WO | WO 2013/128977 * | 9/2013 |

OTHER PUBLICATIONS

Machine translation of JP 05-125108A; publication date: May 1993.*
Sivola, "The n-butyllithium-initiated polymerization of myrcene and its copolymerization with styrene," ACTA Polytechnica Scandinavia, 134, 1-65 (1977).*
Johanson, et al., "Emulsion Polymerization of Myrcene," Ind. and Eng'g Chem. (1948), 40, 500-502.*
Search Report and Written Opinion issued May 8, 2015 in SG Application No. 10201400571X.

* cited by examiner

*Primary Examiner* — Fred M Teskin
(74) *Attorney, Agent, or Firm* — Panitch Schwarze Belisario & Nadel LLP

(57) ABSTRACT

The present invention relates to a conjugated diene based polymer comprising a monomer unit derived from at least one conjugated diene selected from 1,3-butadiene and isoprene and a monomer unit derived from a compound having two conjugated carbon-carbon double bonds and one or more non-conjugated carbon-carbon double bond.

6 Claims, No Drawings

CONJUGATED DIENE BASED POLYMER, AND POLYMER COMPOSITION CONTAINING THE POLYMER

BACKGROUND OF THE INVENTION

1. Field of the Invention

The present invention relates to a polymer composition excellent in fuel cost-saving properties and a conjugated diene based polymer for producing the polymer composition.

2. Description of the Related Art

In recent years, with an increase in concern about environmental problems, requirements of fuel cost-saving properties on automobiles have been increasing, and a rubber composition used in automobile tires has also been required to be excellent in fuel cost-saving properties. As a rubber composition for automobile tires, a rubber composition containing a conjugated diene based polymer such as polybutadiene or a styrene-butadiene copolymer, and a reinforcing agent is used.

For example, Patent Document 1 suggests a styrene-butadiene copolymer containing many vinyl bonds, and a polymer composition using the copolymer.

[Patent Document 1] JP 01-29802 B1

SUMMARY OF THE INVENTION

However, polymer compositions using the above conventional conjugated diene based polymer are still unsatisfactory in fuel cost-saving properties.

Under such circumstances, an object of the present invention is to provide a conjugated diene based polymer that can give a polymer composition excellent in fuel cost-saving properties, and a polymer composition containing the polymer.

A first aspect of the present invention relates to a conjugated diene based polymer comprising a monomer unit derived from at least one conjugated diene selected from 1,3-butadiene and isoprene and a monomer unit derived from a compound having two conjugated carbon-carbon double bonds and one or more non-conjugated carbon-carbon double bond.

A second aspect of the present invention relates to a polymer composition comprising the conjugated diene based polymer and a reinforcing agent, wherein the content of the reinforcing agent is not less than 10 parts by weight and not more than 150 parts by weight per 100 parts by weight of the content of the conjugated diene based polymer.

A third aspect of the present invention relates to a method for producing a conjugated diene based polymer, wherein the method comprises a step of polymerizing monomer components in a hydrocarbon solvent with an alkali metal catalyst, the monomer components comprising at least one conjugated diene selected from 1,3-butadiene and isoprene and a compound having two conjugated carbon-carbon double bonds and one or more non-conjugated carbon-carbon double bond.

According to the present invention, a polymer composition excellent in fuel cost-saving properties can be obtained.

DETAILED DESCRIPTION OF THE PREFERRED EMBODIMENTS

Herein, a hydrocarbyl group represents a monovalent group obtained by removing one hydrogen atom from a hydrocarbon. A hydrocarbylene group represents a divalent group obtained by removing two hydrogen atoms from a hydrocarbon. A hydrocarbyloxy group represents a monovalent group having a structure in which a hydrogen atom of a hydroxy group is replaced with a hydrocarbyl group. An amino group having a substituent (hereinafter, referred to as substituted amino group in some cases) represents a group having a structure in which at least one hydrogen atom of an amino group is replaced with a monovalent atom other than a hydrogen atom or a monovalent group, or a group having a structure in which two hydrogen atoms of an amino group are replaced with a divalent group. A hydrocarbyl group having a substituent (hereinafter, referred to as substituted hydrocarbyl group in some cases) represents a monovalent group having a structure in which at least one hydrogen atom of a hydrocarbyl group is replaced with a substituent. A hydrocarbylene group having a hetero atom (hereinafter, referred to as hetero atom-containing hydrocarbylene group in some cases) represents a divalent group having a structure in which, in a hydrocarbylene group, a hydrogen atom and/or a carbon atom other than a carbon atom from which a hydrogen atom has been removed is replaced with a group having a hetero atom (an atom other than a carbon atom and a hydrogen atom). [Note] This sentence means that, in the case that a hydrocarbylene group is —CH(CH$_3$)—, one or more atoms selected from a carbon atom of CH$_3$ and four hydrogen atoms is replaced with a group having a hetero atom.

The conjugated diene based polymer of the present invention is a conjugated diene based polymer comprising a monomer unit derived from at least one conjugated diene selected from 1,3-butadiene and isoprene and a monomer unit derived from a compound having two conjugated carbon-carbon double bonds and one or more non-conjugated carbon-carbon double bond.

Preferred examples of the compound having two conjugated carbon-carbon double bonds and one or more non-conjugated carbon-carbon double bond include compounds represented by the following formula (1).

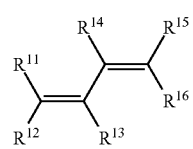

(1)

wherein $R^{11}$ to $R^{16}$ each independently represent a hydrogen atom, a hydrocarbyl group, or the following formula (1-A), and at least one of $R^{11}$ to $R^{16}$ represents the following formula (1-A).

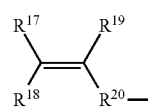

(1-A)

wherein $R^{17}$ to $R^{19}$ each independently represent a hydrogen atom or a hydrocarbyl group, and $R^{20}$ represents an alkylene group.

Examples of the hydrocarbyl groups of $R^{11}$ to $R^{16}$ in the formula (1) include alkyl groups, and aryl groups. Examples of the alkyl group include a methyl group, an ethyl group, a n-propyl group, an isopropyl group, a n-butyl group, a sec-butyl group, and a tert-butyl group. Examples of the aryl group include a phenyl group, a methyl phenyl group, and an ethyl phenyl group.

The hydrocarbyl groups of $R^{11}$ to $R^{16}$ in the formula (1) are preferably an alkyl group. The alkyl group is preferably a methyl group.

Examples of the hydrocarbyl groups of $R^{17}$ to $R^{19}$ in the formula (1-A) include alkyl groups and aryl groups. Examples of the alkyl group include a methyl group, an ethyl group, a n-propyl group, an isopropyl group, a n-butyl group, a sec-butyl group, and a tert-butyl group. Examples of the aryl group include a phenyl group, a methyl phenyl group, and an ethyl phenyl group.

The hydrocarbyl groups of $R^{17}$ to $R^{19}$ in the formula (1-A) are preferably an alkyl group. The alkyl group is preferably a methyl group.

$R^{17}$ to $R^{19}$ in the formula (1-A) are preferably a hydrogen atom or a methyl group.

The alkylene group of $R^{20}$ in the formula (1-A) is preferably a methylene group, an ethylene group, or a propylene group.

The group represented by the formula (1-A) is preferably
a 2-propenyl group, a 2-butenyl group, a 3-methyl-2-butenyl group, a 2-methyl-2-propenyl group, a 2-methyl-2-butenyl group, or a 2,3-dimethyl-2-butenyl group, in which the alkylene group of $R^{20}$ is a methylene group;
a 3-butenyl group, a 3-pentenyl group, a 4-methyl-3-pentenyl group, a 3-methyl-3-butenyl group, a 3-methyl-3-pentenyl group, or a 3,4-dimethyl-3-pentenyl group, in which the alkylene group of $R^{20}$ is an ethylene group; or
a 4-pentenyl group, a 4-hexenyl group, a 5-methyl-4-hexenyl group, a 4-methyl-4-pentenyl group, a 4-methyl-4-hexenyl group, or a 4,5-dimethyl-4-hexenyl group, in which the alkylene group of $R^{20}$ is a propylene group.

$R^{11}$, $R^{12}$, $R^{15}$ and $R^{16}$ in the formula (1) are preferably a hydrogen atom or a methyl group, and more preferably a hydrogen atom.

$R^{13}$ and $R^{14}$ in the formula (1) are preferably a hydrogen atom, a methyl group, or a group represented by the formula (1-A), and at least one of $R^{13}$ and $R^{14}$ is a group represented by the formula (1-A), and more preferably, at least one of $R^{13}$ and $R^{14}$ is a group represented by the formula (1-A), and the other one is a hydrogen atom or a methyl group.

The compound represented by the formula (1) is preferably a compound in which $R^{22}$, $R^{12}$, $R^{15}$ and $R^{16}$ in the formula (1) are a hydrogen atom, one of $R^{13}$ and $R^{14}$ is a group represented by the formula (1-A), $R^{17}$ to $R^{19}$ in the formula (1-A) are a hydrogen atom or a methyl group, $R^{20}$ in the formula (1-A) is a group selected from a methylene group, an ethylene group and a propylene group, and one of $R^{13}$ and $R^{14}$ is a hydrogen atom.

Preferred examples of the compound represented by the formula (1) include
3-methylene-1,5-hexadiene,
3-methylene-1,5-heptadiene,
6-methyl-3-methylene-1,5-heptadiene,
5-methyl-3-methylene-1,5-hexadiene,
5-methyl-3-methylene-1,5-heptadiene, and
5,6-dimethyl-3-methylene-1,5-heptadiene, in which $R^{20}$ in the formula (1-A) is a methylene group, and one of $R^{13}$ and $R^{14}$ is a hydrogen atom;
2-methyl-3-methylene-1,5-hexadiene,
2-methyl-3-methylene-1,5-heptadiene,
2,6-dimethyl-3-methylene-1,5-heptadiene,
2,5-dimethyl-3-methylene-1,5-hexadiene,
2,5-dimethyl-3-methylene-1,5-heptadiene, and
2,5,6-trimethyl-3-methylene-1,5-heptadiene, in which $R^{20}$ in the formula (1-A) is a methylene group, and one of $R^{13}$ and $R^{14}$ is a methyl group;
3-methylene-1,6-heptadiene,
3-methylene-1,6-octadiene,
7-methyl-3-methylene-1,6-octadiene,
6-methyl-3-methylene-1,6-heptadiene,
6-methyl-3-methylene-1,6-octadiene, and
6,7-dimethyl-3-methylene-1,6-octadiene, in which $R^{20}$ in the formula (1-A) is an ethylene group, and one of $R^{13}$ and $R^{14}$ is a hydrogen atom;
2-methyl-3-methylene-1,6-heptadiene,
2-methyl-3-methylene-1,6-octadiene,
2,7-dimethyl-3-methylene-1,6-octadiene,
2,6-dimethyl-3-methylene-1,6-heptadiene,
2,6-dimethyl-3-methylene-1,6-octadiene, and
2,6,7-trimethyl-3-methylene-1,6-octadiene, in which $R^{20}$ in the formula (1-A) is an ethylene group, and one of $R^{13}$ and $R^{14}$ is a methyl group;
3-methylene-1,7-octadiene,
3-methylene-1,7-nonadiene,
8-methyl-3-methylene-1,7-nonadiene,
7-methyl-3-methylene-1,7-octadiene,
7-methyl-3-methylene-1,7-nonadiene, and
7,8-dimethyl-3-methylene-1,7-nonadiene, in which $R^{20}$ in the formula (1-A) is a propylene group, and one of $R^{13}$ and $R^{14}$ is a hydrogen group; and
2-methyl-3-methylene-1,7-octadiene,
2-methyl-3-methylene-1,7-nonadiene,
2,8-dimethyl-3-methylene-1,7-nonadiene,
2,7-dimethyl-3-methylene-1,7-octadiene,
2,7-dimethyl-3-methylene-1,7-nonadiene, and
2,7,8-trimethyl-3-methylene-1,7-nonadiene, in which $R^{20}$ in the formula (1-A) is a propylene group, and one of $R^{13}$ and $R^{14}$ is a methyl group.

The compound represented by the formula (1) is more preferably
3-methylene-1,5-hexadiene,
3-methylene-1,5-heptadiene,
6-methyl-3-methylene-1,5-heptadiene,
5-methyl-3-methylene-1,5-hexadiene,
5-methyl-3-methylene-1,5-heptadiene, or
5,6-dimethyl-3-methylene-1,5-heptadiene, in which $R^{20}$ in the formula (1-A) is a methylene group, and one of $R^{13}$ and $R^{14}$ is a hydrogen atom;
3-methylene-1,6-heptadiene,
3-methylene-1,6-octadiene,
7-methyl-3-methylene-1,6-octadiene,
6-methyl-3-methylene-1,6-heptadiene,
6-methyl-3-methylene-1,6-octadiene, or
6,7-dimethyl-3-methylene-1,6-octadiene, in which $R^{20}$ in the formula (1-A) is an ethylene group, and one of $R^{13}$ and $R^{14}$ is a hydrogen atom; or
3-methylene-1,7-octadiene,
3-methylene-1,7-nonadiene,
8-methyl-3-methylene-1,7-nonadiene,
7-methyl-3-methylene-1,7-octadiene,
7-methyl-3-methylene-1,7-nonadiene, or
7,8-dimethyl-3-methylene-1,7-nonadiene, in which $R^{20}$ in the formula (1-A) is a propylene group, and one of $R^{13}$ and $R^{14}$ is a hydrogen group.

The compound represented by the formula (1) is more preferably 7-methyl-3-methylene-1,6-octadiene.

Two or more compounds represented by the formula (1) may be used.

Among the monomer units contained in the conjugated diene based polymer of the present invention, in order to enhance fuel cost-saving properties, the content of the monomer unit derived from a compound having two conjugated carbon-carbon double bonds and one or more non-conjugated carbon-carbon double bond is preferably not less than 0.01% by weight, more preferably not less than 0.02% by weight, and still more preferably not less than 0.05% by weight, based on 100% by weight of the total amount of the monomer units contained in the conjugated diene based polymer.

In order to enhance economical properties and to enhance grip properties, it is preferably not more than 30% by weight, more preferably not more than 10% by weight, and still more preferably not more than 5% by weight.

The conjugated diene based polymer may be modified with a group containing a nitrogen atom.

Examples of the group containing a nitrogen atom contained in the conjugated diene based polymer include the group represented by the following formula (2).

(2)

wherein $R^{21}$ and $R^{22}$ each independently represent a hydrocarbyl group optionally having a substituent, or a trihydrocarbylsilyl group, or $R^{21}$ and $R^{22}$ are bonded, and a group in which $R^{21}$ is bonded to $R^{22}$ represents a hydrocarbylene group optionally having a nitrogen atom and/or an oxygen atom.

The group containing a nitrogen atom may be bonded to either terminal or side chain of the polymer chain.

Examples of a method for producing a conjugated diene based polymer modified with the group containing a nitrogen atom include the method (a), method (b), method (c) and method (d) described below.

(a) A method of producing a conjugated diene based polymer by polymerizing monomer components containing a conjugated diene and a compound having two conjugated carbon-carbon double bonds and one or more non-conjugated carbon-carbon double bond, in a solvent, subsequently adding a compound (modifier) having a group containing a nitrogen atom to the solvent, and reacting the active terminal of the conjugated diene based polymer with the modifier.

(b) A method of producing a conjugated diene based polymer by polymerizing monomer components containing a conjugated diene and a compound having two conjugated carbon-carbon double bonds and one or more non-conjugated carbon-carbon double bond, using an organic alkali metal compound having a group containing a nitrogen atom.

(c) A method of producing a conjugated diene based polymer by polymerizing monomer components containing a conjugated diene and a compound having two conjugated carbon-carbon double bonds and one or more non-conjugated carbon-carbon double bond, using a secondary amine compound and organic alkali metal compound having a group containing a nitrogen atom.

(d) A method of producing a conjugated diene based polymer by polymerizing monomer components containing a conjugated diene, a compound having two conjugated carbon-carbon double bonds and one or more non-conjugated carbon-carbon double bond, and a vinyl-based monomer having a group containing a nitrogen atom.

In the method (a) described above, examples of the compound preferred as a compound having a group containing a nitrogen atom include compounds containing a nitrogen atom and a carbonyl group and compounds containing a nitrogen atom and a silicon atom.

As the compound containing a nitrogen atom and a carbonyl group, a compound represented by the following formula (3) is preferable.

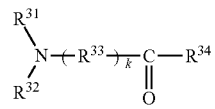

(3)

wherein $R^{31}$ and $R^{32}$ may be bonded, or $R^{31}$ and $R^{34}$ may be bonded, $R^{31}$ represents a hydrocarbyl group optionally having a substituent, or is bonded to $R^{32}$ to represent a hydrocarbylene group optionally having a nitrogen atom and/or an oxygen atom, or is bonded to $R^{34}$ to represent a divalent group, $R^{32}$ represents a hydrocarbyl group optionally having a substituent, or is bonded to $R^{31}$ to represent a hydrocarbylene group optionally having a nitrogen atom and/or an oxygen atom, and $R^{34}$ represents a hydrocarbyl group optionally having a substituent, or a hydrogen atom, or is bonded to $R^{31}$ to represent a divalent group. Also, $R^{33}$ represents a divalent group, and k represents 0 or 1.

In the formula (3), the hydrocarbyl group optionally having a substituent in $R^{31}$, $R^{32}$ and $R^{34}$ is a hydrocarbyl group or a substituted hydrocarbyl group. Examples of the substituted hydrocarbyl group include a substituted hydrocarbyl group in which the substituent is a hydrocarbyloxy group, and a substituted hydrocarbyl group in which the substituent is a substituted amino group. Examples of the hydrocarbyl group include alkyl groups such as a methyl group, an ethyl group, a n-propyl group, an isopropyl group and a n-butyl group; alkenyl groups such as a vinyl group, an allyl group and an isopropenyl group; and aryl groups such as a phenyl group. Examples of the substituted hydrocarbyl group in which the substituent is a hydrocarbyloxy group include alkoxyalkyl groups such as a methoxy methyl group, an ethoxy methyl group, and an ethoxy ethyl group. Examples of the substituted hydrocarbyl group in which the substituent is a substituted amino group include (N,N-dialkylamino)alkyl groups such as a 2-(N,N-dimethylamino)ethyl group, a 2-(N,N-diethylamino)ethyl group, a 3-(N,N-dimethylamino)propyl group and a 3-(N,N-diethylamino)propyl group; (N,N-dialkylamino)aryl groups such as a 4-(N,N-dimethylamino)phenyl group, a 3-(N,N-dimethylamino)phenyl group, a 4-(N,N-diethylamino)phenyl group and a 3-(N,N-diethylamino)phenyl group; (N,N-dialkylamino)alkylaryl groups such as a 4-(N,N-dimethylamino)methylphenyl group and a 4-[2-(N,N-dimethylamino)ethyl]phenyl group; cyclic amino group-containing alkyl groups such as a 3-(1-pyrrolidinyl)propyl group, a 3-(1-piperidinyl)propyl group and a 3-(1-imidazolyl)propyl group; cyclic amino group-containing aryl groups such as a 4-(1-pyrrolidinyl)phenyl group, a 4-(1-piperidinyl)phenyl group and a 4-(1-imidazolyl)phenyl group; and cyclic amino group-containing alkylaryl groups such as a 4-[2-(1-pyrrolidinyl)ethyl]phenyl group, a 4-[2-(1-piperidinyl)ethyl]phenyl group and a 4-[2-(1-imidazolyl)ethyl]phenyl group.

In the formula (3), the hydrocarbylene group formed by bonding $R^{31}$ and $R^{32}$ and optionally having a nitrogen atom and/or an oxygen atom is a hydrocarbylene group, or a hetero atom-containing hydrocarbylene group in which the hetero atom is a nitrogen atom and/or an oxygen atom. Examples of the hetero atom-containing hydrocarbylene group in which the hetero atom is a nitrogen atom and/or an oxygen atom include a hetero atom-containing hydrocarbylene group in which the hetero atom is a nitrogen atom and a hetero atom-containing hydrocarbylene group in which the hetero atom is an oxygen atom. Examples of the hydrocarbylene group include alkylene groups such as a trimethylene group, a tetramethylene group, a pentamethylene group, a hexamethylene group and a 2,2,4-trimethylhexane-1,6-diyl group; and arylene groups such as a 1,4-phenylene group. Examples of the hetero atom-containing hydrocarbylene group in which the hetero atom is a nitrogen atom include a group represented by —CH=N—CH=CH— and a group represented by —CH=N—CH$_2$—CH$_2$—. Examples of the hetero atom-containing hydrocarbylene group in which the hetero atom is an oxygen atom include groups represented by —(CH$_2$)$_s$—O—(CH$_2$)$_t$— (s and t are an integer of 1 or more).

In the formula (3), examples of the divalent group to which $R^{31}$ and $R^{34}$ are bonded, and the divalent group of $R^{33}$ include a hydrocarbylene group, a hetero atom-containing hydrocarbylene group in which the hetero atom is a nitrogen atom, a hetero atom-containing hydrocarbylene group in which the hetero atom is an oxygen atom, a group in which a hydrocarbylene group and an oxygen atom are bonded, and a group in which a hydrocarbylene group and a group represented by —NR$^{35}$— (R$^{35}$ represents a hydrocarbyl group or a hydrogen atom) are bonded. Examples of the hydrocarbylene group include alkylene groups such as a trimethylene group, a tetramethylene group, a pentamethylene group, a hexamethylene group and a 2,2,4-trimethylhexane-1,6-diyl group; and arylene groups such as a 1,4-phenylene group. Examples of the hetero atom-containing hydrocarbylene group in which the hetero atom is a nitrogen atom include a group represented by —CH=N—CH=CH— and a group represented by —CH=N—CH$_2$—CH$_2$—. Examples of the hetero atom-containing hydrocarbylene group in which the hetero atom is an oxygen atom include groups represented by —(CH$_2$)$_s$—O—(CH$_2$)$_t$— (s and t are an integer of 1 or more). Examples of the group in which a hydrocarbylene group and an oxygen atom are bonded include groups represented by —(CH$_2$)$_u$—O— (u represents an integer of 1 or more). Examples of the group in which a hydrocarbylene group and a group represented by —NR$^{35}$— (R$^{35}$ represents a hydrocarbyl group or a hydrogen atom) are bonded include a group represented by —(CH$_2$)$_v$—NR$^{35}$— (R$^{35}$ represents a hydrocarbyl group having 1 to 6 carbon atoms or a hydrogen atom, and v represents an integer of 1 or more).

Examples of a preferable compound represented by the formula (3) include compounds represented by (3-A) in which k is 0 and $R^{34}$ is a hydrocarbyl group optionally having a substituent or a hydrogen atom.

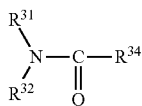

(3-A)

wherein $R^{31}$ and $R^{32}$ may be bonded, $R^{31}$ represents a hydrocarbyl group optionally having a substituent, or is bonded to $R^{32}$ to represent a hydrocarbylene group optionally having, as a hetero atom, a nitrogen atom and/or an oxygen atom, $R^{32}$ represents a hydrocarbyl group optionally having a substituent, or is bonded to $R^{31}$ to represent a hydrocarbylene group optionally having, as a hetero atom, a nitrogen atom and/or an oxygen atom, and $R^{34}$ represents a hydrocarbyl group optionally having a substituent or a hydrogen atom.

In the formula (3-A), description and exemplification of the hydrocarbyl group optionally having a substituent in $R^{31}$, $R^{32}$ and $R^{34}$, and the hydrocarbylene group formed by bonding $R^{31}$ and $R^{32}$ optionally having, as a hetero atom, a nitrogen atom and/or an oxygen atom are the same as those stated in the description of the formula (3).

In the formula (3-A), $R^{31}$ is preferably a hydrocarbyl group having 1 to 10 carbon atoms, or is bonded to $R^{32}$ to form a hydrocarbylene group having 3 to 10 carbon atoms or a hetero atom-containing hydrocarbylene group having 3 to 10 carbon atoms in which the hetero atom is a nitrogen atom. $R^{31}$ is more preferably an alkyl group having 1 to 10 carbon atoms or an aryl group having 6 to 10 carbon atoms, or is bonded to $R^{32}$ to form an alkylene group having 3 to 10 carbon atoms, a group represented by —CH=N—CH=CH—, or a group represented by —CH=N—CH$_2$—CH$_2$—, still more preferably an alkyl group having 1 to 6 carbon atoms, and particularly preferably a methyl group or an ethyl group.

In the formula (3-A), $R^{32}$ is preferably a hydrocarbyl group having 1 to 10 carbon atoms, or is bonded to $R^{31}$ to form a hydrocarbylene group having 3 to 10 carbon atoms or a hetero atom-containing hydrocarbylene group having 3 to 10 carbon atoms in which the hetero atom is a nitrogen atom. $R^{32}$ is more preferably an alkyl group having 1 to 10 carbon atoms or an aryl group having 6 to 10 carbon atoms, or is bonded to $R^{31}$ to form an alkylene group having 3 to 10 carbon atoms, a group represented by —CH=N—CH=CH—, or a group represented by —CH=N—CH$_2$—CH$_2$—, still more preferably an alkyl group having 1 to 6 carbon atoms, and particularly preferably a methyl group or an ethyl group.

In the formula (3-A), $R^{34}$ is preferably a hydrocarbyl group or a hydrogen atom, more preferably a hydrocarbyl group having 1 to 10 carbon atoms or a hydrogen atom, still more preferably an alkyl group having 1 to 6 carbon atoms or a hydrogen atom, and particularly preferably a hydrogen atom, a methyl group or an ethyl group.

Examples of a compound in which $R^{34}$ is a hydrocarbyl group, of the compounds represented by the formula (3-A), include N,N-dihydrocarbylacetamides such as N,N-dimethylacetamide, N,N-diethylacetamide and N-methyl-N-ethylacetamide; N,N-dihydrocarbylacrylamides such as N-dimethylacrylamide, N,N-diethylacrylamide and N-methyl-N-ethylacrylamide; and N,N-dihydrocarbylmethacrylamides such as N,N-dimethylmethacrylamide, N,N-diethylmethacrylamide and N-methyl-N-ethylmethacrylamide.

Examples of a compound in which $R^{34}$ is a hydrogen atom, of the compounds represented by the formula (3-A), include N,N-dihydrocarbylformamides such as N,N-dimethylformamide, N,N-diethylformamide, and N-methyl-N-ethylformamide.

Examples of a preferable compound represented by the formula (3) include compounds represented by (3-B) in which k is 0 and $R^{34}$ is bonded to $R^{31}$ to form a divalent group.

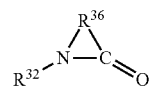

(3-B)

wherein $R^{32}$ represents a hydrocarbyl group optionally having a substituent, $R^{36}$ represents a group in which a hydrocarbylene group and a group represented by —NR$^{35}$— are bonded, or a hydrocarbylene group, wherein $R^{35}$ represents a hydrocarbyl group or a hydrogen atom. A nitrogen atom to which $R^{35}$ is bonded is bonded to the carbon atom of C=O.

In the formula (3-B), description and exemplification of the hydrocarbyl group optionally having a substituent in $R^{32}$ is the same as those stated in the description of the formula (3).

In the formula (3-B), examples of the hydrocarbylene group in $R^{36}$ include alkylene groups such as a trimethylene group, a tetramethylene group, a pentamethylene group, a hexamethylene group and a 2,2,4-trimethylhexane-1,6-diyl group; and arylene groups such as a 1,4-phenylene group. Examples of the group in which a hydrocarbylene group and a group represented by —$NR^{35}$— ($R^{35}$ represents a hydrocarbyl group or a hydrogen atom) are bonded in $R^{36}$ include a group represented by —$(CH_2)_w$—$NR^{35}$— ($R^{35}$ represents a hydrocarbyl group or a hydrogen atom, and w represents an integer of 1 or more).

In the formula (3-B), $R^{32}$ is preferably a hydrocarbyl group having 1 to 10 carbon atoms, more preferably an alkyl group having 1 to 10 carbon atoms or an aryl group having 6 to 10 carbon atoms, still more preferably an alkyl group having 1 to 6 carbon atoms or a phenyl group, and particularly preferably a methyl group, an ethyl group, or a phenyl group.

In the formula (3-B), $R^{36}$ is preferably a hydrocarbylene group having 1 to 10 carbon atoms, or a group in which a hydrocarbylene group having 1 to 10 carbon atoms and a group represented by —$NR^{35}$— ($R^{35}$ represents a hydrocarbyl group having 1 to 10 carbon atoms or a hydrogen atom) are bonded, more preferably an alkylene group having 3 to 6 carbon atoms or a group represented by —$(CH_2)_w$—$NR^{35}$— ($R^{35}$ represents a hydrocarbyl group having 1 to 10 carbon atoms, and w represents an integer of 2 to 5), and still more preferably a trimethylene group, a tetramethylene group, a pentamethylene group, or a group represented by —$(CH_2)_2$—$N(CH_3)$—.

Examples of a compound in which $R^{36}$ is a hydrocarbylene group, of the compounds represented by the formula (3-B), include N-hydrocarbyl-β-propiolactams such as N-methyl-β-propiolactam and N-phenyl-β-propiolactam; N-hydrocarbyl-2-pyrrolidones such as N-methyl-2-pyrrolidone, N-vinyl-2-pyrrolidone, N-phenyl-2-pyrrolidone, N-tert-butyl-2-pyrrolidone and N-methyl-5-methyl-2-pyrrolidone; N-hydrocarbyl-2-piperidones such as N-methyl-2-piperidone, N-vinyl-2-piperidone and N-phenyl-2-piperidone; N-hydrocarbyl-ε-caprolactams such as N-methyl-ε-caprolactam and N-phenyl-ε-caprolactam; N-hydrocarbyl-ω-laurilolactams such as N-methyl-ω-laurilolactam and N-vinyl-ω-laurilolactam. The compound is preferably a compound in which $R^{36}$ is an alkylene group having 3 to 6 carbon atoms and $R^{32}$ is an alkyl group having 1 to 6 carbon atoms or a phenyl group, more preferably a compound in which $R^{36}$ is a trimethylene group, a tetramethylene group, or a pentamethylene group, and $R^{32}$ is a methyl group, an ethyl group, or a phenyl group, and still more preferably N-phenyl-2-pyrrolidone, or N-methyl-ε-caprolactam.

The compound in which $R^{36}$ is a group in which a hydrocarbylene group and a group represented by —$NR^{35}$— ($R^{35}$ is a hydrocarbyl group or a hydrogen atom) are bonded, of the compounds represented by the formula (3-B), include 1,3-dihydrocarbyl-2-imidazolidinones such as 1,3-dimethyl-2-imidazolidinone, 1,3-diethyl-2-imidazolidinone, 1,3-divinyl-2-imidazolidinone, and 1-methyl-3-ethyl-2-imidazolidinone. The compound is preferably a compound in which $R^{36}$ is a group represented by —$(CH_2)_w$—$NR^{35}$— ($R^{35}$ is a hydrocarbyl group having 1 to 10 carbon atoms, and w represents an integer of 2 to 5) and $R^{32}$ is an alkyl group having 1 to 6 carbon atoms or a phenyl group, more preferably a compound in which $R^{36}$ is a group represented by —$(CH_2)_2$—$N(CH_3)$— and $R^{32}$ is a methyl group or an ethyl group, and still more preferably 1,3-dimethyl-2-imidazolidinone.

Examples of a preferred compound represented by the formula (3) include compounds represented by the following formula (3-C) in which k is 1 and $R^{33}$ is a hydrocarbylene group.

(3-C)

wherein $R^{31}$ and $R^{32}$ may be bonded, $R^{31}$ represents a hydrocarbyl group optionally having a substituent, or is bonded to $R^{32}$ to represent a hydrocarbylene group optionally having, as a hetero atom, a nitrogen atom and/or an oxygen atom, $R^{32}$ represents a hydrocarbyl group optionally having a substituent, or is bonded to $R^{31}$ to represent a hydrocarbylene group optionally having, as a hetero atom, a nitrogen atom and/or an oxygen atom, $R^{33}$ represents a hydrocarbylene group, and $R^{34}$ represents a hydrocarbyl group optionally having a substituent.

In the formula (3-C), description and exemplification of the hydrocarbyl group optionally having a substituent in $R^{31}$, $R^{32}$ and $R^{34}$, and the hydrocarbylene group formed by bonding $R^{31}$ and $R^{32}$ and optionally having, as a hetero atom, a nitrogen atom and/or an oxygen atom, and the hydrocarbylene group in $R^{33}$ are the same as those stated in the description of the formula (3).

In the formula (3-C), $R^{33}$ is preferably a hydrocarbylene group having 1 to 10 carbon atoms, more preferably an alkylene group having 1 to 10 carbon atoms or an arylene group having 6 to 10 carbon atoms, still more preferably an alkylene group having 1 to 6 carbon atoms or a phenylene group, and particularly preferably an ethylene group, a trimethylene group, or a 1,4-phenylene group.

In the formula (3-C), $R^{34}$ is preferably a hydrocarbyl group having 1 to 10 carbon atoms, or a substituted hydrocarbyl group having 3 to 10 carbon atoms in which the substituent is a dialkylamino group, more preferably an alkyl group having 1 to 6 carbon atoms, an aryl group having 6 to 10 carbon atoms, a dialkylaminoalkyl group having 3 to 6 carbon atoms or a dialkylaminoaryl group having 8 to 10 carbon atoms, and still more preferably a methyl group, an ethyl group, a dialkylaminomethyl group having 3 to 6 carbon atoms, a dialkylaminoethyl group having 4 to 6 carbon atoms, a phenyl group, or a dialkylaminophenyl group having 8 to 10 carbon atoms.

In the formula (3-C), $R^{31}$ is preferably a hydrocarbyl group having 1 to 10 carbon atoms, or is bonded to $R^{32}$ to form a hydrocarbylene group having 3 to 10 carbon atoms, or a hetero atom-containing hydrocarbylene group having 3 to 10 carbon atoms in which the hetero atom is a nitrogen atom, more preferably an alkyl group having 1 to 10 carbon atoms or an aryl group having 6 to 10 carbon atoms, or is bonded to $R^{32}$ to form an alkylene group having 3 to 10 carbon atoms, a group represented by —CH=N—CH=CH—, a group represented by —CH=N—$CH_2$—$CH_2$—, or a group represented by —$(CH_2)_2$—O—$(CH_2)_2$—, still more preferably an alkyl group having 1 to 6 carbon atoms, or is bonded to $R^{32}$ to form an alkylene group having 3 to 6 carbon atoms, a group represented by —CH=N—CH=CH—, or a group represented by —CH=N—$CH_2$—$CH_2$—, and particularly preferably a methyl group or an ethyl group, or is bonded to $R^{32}$ to form a tetramethylene group, a hexamethylene group, or a group represented by —CH=N—CH=CH—.

In the formula (3-C), $R^{32}$ is preferably a hydrocarbyl group having 1 to 10 carbon atoms, or is bonded to $R^{31}$ to form a hydrocarbylene group having 3 to 10 carbon atoms, or a hetero atom-containing hydrocarbylene group having 3 to 10 carbon atoms in which the hetero atom is a nitrogen atom, more preferably an alkyl group having 1 to 10 carbon atoms or an aryl group having 6 to 10 carbon atoms, or is bonded to $R^{31}$ to form an alkylene group having 3 to 10 carbon atoms, a group represented by —CH═N—CH═CH—, a group represented by —CH═N—CH$_2$—CH$_2$—, or a group represented by —(CH$_2$)$_2$—O—(CH$_2$)$_2$—, still more preferably an alkyl group having 1 to 6 carbon atoms, or is bonded to $R^{31}$ to form an alkylene group having 3 to 6 carbon atoms, a group represented by —CH═N—CH═CH—, or a group represented by —CH═N—CH$_2$—CH$_2$—, and particularly preferably a methyl group or an ethyl group, or is bonded to $R^{31}$ to form a tetramethylene group, a hexamethylene group, or a group represented by —CH═N—CH═CH—.

Examples of a compound in which $R^{33}$ is an arylene group and $R^{34}$ is an alkyl group, of the compounds represented by the formula (3-C), include 4-(N,N-dihydrocarbylamino)acetophenones such as 4-(N,N-dimethylamino)acetophenone, 4-(N-methyl-N-ethylamino)acetophenone and 4-(N,N-diethylamino)acetophenone; 4-cyclic amino acetophenone compounds such as 4'-(imidazol-1-yl)acetophenone. Among them, a 4-cyclic amino acetophenone compound is preferable, and 4'-(imidazol-1-yl)acetophenone is more preferable.

Examples of a compound in which $R^{33}$ is an arylene group and $R^{34}$ is an aryl group or a substituted aryl group, of the compounds represented by the formula (3-C), include bis(dihydrocarbylaminoalkyl)ketones such as 1,7-bis(methylethylamino)-4-heptanone and 1,3-bis(diphenylamino)-2-propanone; 4-(dihydrocarbylamino)benzophenones such as 4-N,N-dimethylaminobenzophenone, 4-N,N-diethylaminobenzophenone, 4-N,N-di-t-butylaminobenzophenone and 4-N,N-diphenylaminobenzophenone; and 4,4'-bis(dihydrocarbylamino)benzophenones such as 4,4'-bis(dimethylamino)benzophenone, 4,4'-bis(diethylamino)benzophenone and 4,4'-bis(diphenylamino)benzophenone. Among them, a compound in which $R^{31}$ and $R^{32}$ are an alkyl group having 1 to 6 carbon atoms, $R^{33}$ is a phenylene group, and $R^{34}$ is a phenyl group or a dialkylaminophenyl group having 8 to 10 carbon atoms is preferable, and 4-N,N-dimethylaminobenzophenone, 4-N,N-diethylaminobenzophenone, 4,4'-bis(dimethylamino)benzophenone and 4,4'-bis(diethylamino) benzophenone are more preferable.

Examples of a preferable compound represented by the formula (3) include compounds represented by the following formula (3-D) in which k is 1 and $R^{33}$ is a group in which a hydrocarbylene group and an oxygen atom are bonded, or a group in which a hydrocarbylene group and a group represented by —NR$^{35}$— ($R^{35}$ represents a hydrocarbyl group or a hydrogen atom) are bonded.

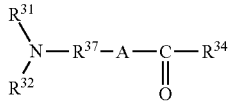

(3-D)

wherein $R^{31}$ and $R^{32}$ may be bonded, $R^{31}$ represents a hydrocarbyl group optionally having a substituent, or is bonded to $R^{32}$ to represent a hydrocarbylene group optionally having, as a hetero atom, a nitrogen atom and/or an oxygen atom, $R^{32}$ represents a hydrocarbyl group optionally having a substituent, or is bonded to $R^{31}$ to represent a hydrocarbylene group optionally having, as a hetero atom, a nitrogen atom and/or an oxygen atom, $R^{37}$ represents a hydrocarbylene group, A represents an oxygen atom or —NR$^{35}$—, $R^{35}$ represents a hydrocarbylene group or a hydrogen atom, and $R^{34}$ represents a hydrocarbyl group optionally having a substituent.

In the formula (3-D), description and exemplification of the hydrocarbyl group optionally having a substituent in $R^{31}$, $R^{32}$ and $R^{34}$, and the hydrocarbylene group optionally having, as a hetero atom, a nitrogen atom to which $R^{31}$ and $R^{32}$ are bonded and/or an oxygen atom are the same as those stated in the description of the formula (3).

In the formula (3-D), A is preferably an oxygen atom or a group represented by —NR$^{35}$— ($R^{35}$ is a hydrocarbylene group having 1 to 5 carbon atoms or a hydrogen atom), more preferably an oxygen atom or a group represented by —NH—, and still more preferably a group represented by —NH—.

In the formula (3-D), examples of the hydrocarbylene group in $R^{37}$ include alkylene groups such as a trimethylene group, a tetramethylene group, a pentamethylene group, a hexamethylene group and a 2,2,4-trimethylhexane-1,6-diyl group; arylene groups such as a 1,4-phenylene group.

In the formula (3-D), $R^{34}$ is preferably a hydrocarbyl group having 1 to 10 carbon atoms, more preferably an alkenyl group having 2 to 5 carbon atoms, still more preferably a vinyl group or an isopropenyl group, and particularly preferably a vinyl group.

In the formula (3-D), $R^{37}$ is preferably a hydrocarbylene group having 1 to 10 carbon atoms, more preferably an alkylene group having 1 to 6 carbon atoms, still more preferably an ethylene group or a trimethylene group, and particularly preferably a trimethylene group.

In the formula (3-D), $R^{31}$ is preferably a hydrocarbyl group having 1 to 10 carbon atoms, or is bonded to $R^{32}$ to form a hydrocarbylene group having 3 to 10 carbon atoms, or a hetero atom-containing hydrocarbylene group having 3 to 10 carbon atoms in which the hetero atom is a nitrogen atom, more preferably an alkyl group having 1 to 10 carbon atoms or an aryl group having 6 to 10 carbon atoms, or is bonded to $R^{32}$ to form an alkylene group having 3 to 10 carbon atoms, a group represented by —CH═N—CH═CH—, a group represented by —CH═N—CH$_2$—CH$_2$—, or a group represented by —(CH$_2$)$_2$—O—(CH$_2$)$_2$—, still more preferably an alkyl group having 1 to 6 carbon atoms, or is bonded to $R^{32}$ to form an alkylene group having 3 to 6 carbon atoms, a group represented by —CH═N—CH═CH—, or a group represented by —CH═N—CH$_2$—CH$_2$—, and particularly preferably a methyl group or an ethyl group, or is bonded to $R^{32}$ to form a tetramethylene group, a hexamethylene group, or a group represented by —CH═N—CH═CH—.

In the formula (3-D), $R^{32}$ is preferably a hydrocarbyl group having 1 to 10 carbon atoms, or is bonded to $R^{31}$ to form a hydrocarbylene group having 3 to 10 carbon atoms, or a hetero atom-containing hydrocarbylene group having 3 to 10 carbon atoms in which the hetero atom is a nitrogen atom, more preferably an alkyl group having 1 to 10 carbon atoms or an aryl group having 6 to 10 carbon atoms, or is bonded to $R^{31}$ to form an alkylene group having 3 to 10 carbon atoms, a group represented by —CH═N—CH═CH—, a group represented by —CH═N—CH$_2$—CH$_2$—, or a group represented by —(CH$_2$)$_2$—O—(CH$_2$)$_2$—, still more preferably an alkyl group having 1 to 6 carbon atoms, or is bonded to $R^{31}$ to form an alkylene group having 3 to 6 carbon atoms, a group represented by —CH═N—CH═CH—, or a group represented by —CH═N—CH$_2$—CH$_2$—, and particularly preferably a methyl group or an ethyl group, or is bonded to $R^{31}$ to form a tetramethylene group, a hexamethylene group, or a group represented by —CH=N—CH=CH—.

Examples of a compound in which A is an oxygen atom, of the compounds represented by the formula (3-D), include 2-(dihydrocarbylamino)ethyl acrylates such as 2-(dimethylamino)ethyl acrylate and 2-(diethylamino)ethyl acrylate; 3-(dihydrocarbylamino)propyl acrylates such as 3-(dimethylamino)propyl acrylate; 2-(dihydrocarbylamino)ethyl methacrylates such as 2-(dimethylamino)ethyl methacrylate and 2-(diethylamino)ethyl methacrylate; 3-(dihydrocarbylamino)propyl methacrylates such as 3-(dimethylamino)propyl methacrylate. As the compound in which A is an oxygen atom, a compound in which $R^{31}$ and $R^{32}$ are an alkyl group having 1 to 6 carbon atoms, $R^{34}$ is a vinyl group or an isopropenyl group, and $R^{37}$ is an ethylene group or a trimethylene group is preferable, and a compound in which $R^{31}$ and $R^{32}$ are a methyl group or an ethyl group, $R^{34}$ is a vinyl group, and $R^{37}$ is a trimethylene group is more preferable.

Examples of a compound in which A is a group represented by —$NR^{35}$— ($R^{35}$ is a hydrocarbylene group or a hydrogen atom), of the compounds represented by the formula (3-D), include N-(2-dihydrocarbylaminoethyl)acrylamides such as N-(2-dimethylaminoethyl)acrylamide and N-(2-diethylaminoethyl)acrylamide; N-(3-dihydrocarbylaminopropyl)acrylamides such as N-(3-dimethylaminopropyl)acrylamide and N-(3-diethylaminopropyl)acrylamide; N-(4-dihydrocarbylaminobutyl)acrylamides such as N-(4-dimethylaminobutyl)acrylamide and N-(4-diethylaminobutyl)acrylamide; N-(2-dihydrocarbylaminoethyl)methacrylamides such as N-(2-dimethylaminoethyl)methacrylamide and N-(2-diethylaminoethyl)methacrylamide; N-(3-dihydrocarbylaminopropyl)methacrylamides such as N-(3-dimethylaminopropyl)methacrylamide and N-(3-diethylaminopropyl)methacrylamide; N-(4-dihydrocarbylaminobutyl)methacrylamides such as N-(4-dimethylaminobutyl)methacrylamide and N-(4-diethylaminobutyl)methacrylamide. Among them, a compound in which A is a group represented by —NH—, $R^{31}$ and $R^{32}$ are an alkyl group having 1 to 6 carbon atoms, $R^{34}$ is a vinyl group or an isopropenyl group, and $R^{37}$ is an ethylene group or a trimethylene group is preferable, and a compound in which A is a group represented by —NH—, $R^{31}$ and $R^{32}$ are a methyl group or an ethyl group, $R^{34}$ is a vinyl group, and $R^{37}$ is a trimethylene group is more preferable.

As the compound containing a nitrogen atom and a silicon atom, compounds represented by the following formula (4) are preferable.

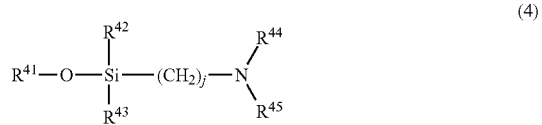

(4)

wherein $R^{44}$ and $R^{45}$ may be bonded, $R^{41}$ represents a hydrocarbyl group, $R^{42}$ and $R^{43}$ represent a hydrocarbyl group or a hydrocarbyloxy group, $R^{44}$ represents a hydrocarbyl group optionally having a substituent or a trihydrocarbylsilyl group, or is bonded to $R^{45}$ to represent a hydrocarbylene group optionally having, as a hetero atom, at least one atom selected from an atomic group consisting of a silicon atom, a nitrogen atom and an oxygen atom, $R^{45}$ represents a hydrocarbyl group optionally having a substituent or a trihydrocarbylsilyl group, or is bonded to $R^{44}$ to represent a hydrocarbylene group optionally having, as a hetero atom, at least one atom selected from an atomic group consisting of a silicon atom, a nitrogen atom and an oxygen atom, and j represents an integer of 1 to 5.

In the formula (4), the hydrocarbyl group optionally having a substituent is a hydrocarbyl group or a substituted hydrocarbyl group.

In the formula (4), examples of the hydrocarbyl group include alkyl groups such as a methyl group, an ethyl group, a n-propyl group, an isopropyl group and a n-butyl group; alkenyl groups such as a vinyl group, an allyl group and an isopropenyl group; and aryl groups such as a phenyl group, and preferably an alkyl group, and more preferably a methyl group or an ethyl group. Examples of the substituted hydrocarbyl group include oxacycloalkyl groups such as an oxiranyl group and a tetrahydrofuranyl group, and preferably a tetrahydrofuranyl group.

Herein, the oxacycloalkyl group represents a group in which $CH_2$ on an alicyclic ring of a cycloalkyl group is substituted with an oxygen atom.

Examples of the hydrocarbyloxy group include alkoxy groups such as a methoxy group, an ethoxy group, a n-propoxy group, an isopropoxy group, a n-butoxy group, a sec-butoxy group and a tert-butoxy group; and aryloxy groups such as a phenoxy group and a benzyloxy group, and preferably an alkoxy group, and more preferably a methoxy group or an ethoxy group.

Examples of the trihydrocarbylsilyl group include a trimethylsilyl group and a tert-butyl-dimethylsilyl group, and preferably a trimethylsilyl group.

The hydrocarbylene group optionally having, as a hetero atom, at least one atom selected from an atomic group consisting of a silicon atom, a nitrogen atom and an oxygen atom is a hydrocarbylene group, or a hetero atom-containing hydrocarbylene group in which the hetero atom is at least one atom selected from an atomic group consisting of a silicon atom, a nitrogen atom and an oxygen atom. Examples of the hetero atom-containing hydrocarbylene group in which the hetero atom is at least one atom selected from an atomic group consisting of a silicon atom, a nitrogen atom and an oxygen atom include a hetero atom-containing hydrocarbylene group in which the hetero atom is a silicon atom, a hetero atom-containing hydrocarbylene group in which the hetero atom is a nitrogen atom, and a hetero atom-containing hydrocarbylene group in which the hetero atom is an oxygen atom. Examples of the hydrocarbylene group include alkylene groups such as a tetramethylene group, a pentamethylene group, a hexamethylene group and a 2,2,4-trimethylhexane-1,6-diyl group; and among them, alkylene groups having 4 to 7 carbon atoms are preferable, and a pentamethylene group and a hexamethylene group are particularly preferable. Examples of the hetero atom-containing hydrocarbylene group in which the hetero atom is a silicon atom include a group represented by —$Si(CH_3)_2$—$CH_2$—$CH_2$—$Si(CH_3)_2$—. Examples of the hetero atom-containing hydrocarbylene group in which the hetero atom is a nitrogen atom include a group represented by —CH=N—CH=CH— and a group represented by —CH=N—$CH_2$—$CH_2$—. Examples of the hetero atom-containing hydrocarbylene group in which the hetero atom is an oxygen atom include a group represented by —$CH_2$—$CH_2$—O—$CH_2$—$CH_2$—.

In the formula (4), $R^{41}$ is preferably an alkyl group having 1 to 4 carbon atoms, and more preferably a methyl group or an ethyl group. $R^{42}$ and $R^{43}$ are preferably a hydrocarbyloxy group, more preferably an alkoxy group having 1 to 4 carbon atoms, and still more preferably a methoxy group or an ethoxy group. $R^{44}$ and $R^{45}$ are preferably a hydrocarbyl group, more preferably an alkyl group having 1 to 4 carbon atoms, and still more preferably a methyl group or an ethyl group. In addition, j is preferably an integer of 2 to 4.

Examples of the compound represented by the formula (4) include [(dialkylamino)alkyl]alkoxysilane compounds such as [3-(dimethylamino)propyl]triethoxysilane, [3-(dimethylamino)propyl]trimethoxysilane, [3-(diethylamino)propyl]triethoxysilane, [3-(diethylamino)propyl]trimethoxysilane, [3-(dimethylamino)propyl]methyldiethoxysilane, [2-(dimethylamino)ethyl]triethoxysilane and [2-(dimethylamino)ethyl]trimethoxysilane; cyclic aminoalkylalkoxysilane compounds such as (1-hexamethyleneiminomethyl)trimethoxysilane, [3-(1-hexamethyleneimino)propyl]triethoxysilane, N-(3-triethoxysilylpropyl)-4,5-dihydroimidazole and N-(3-trimethoxysilylpropyl)-4,5-imidazole; {[di(tetrahydrofuranyl)amino]alkyl}alkoxysilane compounds such as {3-[di(tetrahydrofuranyl)amino]propyl}trimethoxysilane and {3-[di(tetrahydrofuranyl)amino]propyl}triethoxysilane; [N,N-bis(trialkylsilyl)aminoalkyl]alkylalkoxysilane compounds such as {3-[N,N-bis(trimethylsilyl)amino]propyl}methyldimethoxysilane and {3-[N,N-bis(trimethylsilyl)amino]propyl}methyldiethoxysilane. A compound in which $R^{41}$ is an alkyl group having 1 to 4 carbon atoms, $R^{42}$ and $R^{43}$ are an alkoxy group having 1 to 4 carbon atoms, $R^{44}$ and $R^{45}$ are an alkyl group having 1 to 4 carbon atoms, and j is an integer of 2 to 4 is preferable, and [3-(dimethylamino)propyl]triethoxysilane, [3-(dimethylamino)propyl]trimethoxysilane, [3-(diethylamino)propyl]triethoxysilane and [3-(diethylamino)propyl]trimethoxysilane are more preferable.

Examples of the compound having an alkoxysilyl group include tetraalkoxysilanes such as tetramethoxysilane, tetraethoxysilane and tetra-n-propoxysilane; trialkoxyhydrocarbylsilanes such as methyltrimethoxysilane, methyltriethoxysilane, ethyltrimethoxysilane and phenyltrimethoxysilane; trialkoxyhalosilanes such as trimethoxychlorosilane, triethoxychlorosilane and tri-n-propoxychlorosilane; dialkoxydihydrocarbylsilanes such as dimethoxydimethylsilane, diethoxydimethylsilane and dimethoxydiethylsilane; dialkoxydihalosilanes such as dimethoxydichlorosilane, diethoxydichlorosilane and di-n-propoxydichlorosilane; monoalkoxytrihydrocarbylsilanes such as methoxytrimethylsilane; monoalkoxytrihalosilanes such as methoxytrichlorosilane and ethoxytrichlorosilane; (glycidoxyalkyl)alkylalkoxysilane compounds such as 2-glycidoxyethyltrimethoxysilane, 2-glycidoxyethyltriethoxysilane, (2-glycidoxyethyl)methyldimethoxysilane, 3-glycidoxypropyltrimethoxysilane, 3-glycidoxypropyltriethoxysilane and (3-glycidoxypropyl)methyldimethoxysilane; (3,4-epoxycyclohexyl)alkylalkoxysilane compounds such as 2-(3,4-epoxycyclohexyl)ethyltrimethoxysilane and 2-(3,4-epoxycyclohexyl)ethyltriethoxysilane; [(3,4-epoxycyclohexyl)alkyl]alkylalkoxysilane compounds such as [2-(3,4-epoxycyclohexyl)ethyl]methyldimethoxysilane; alkoxysilylalkylsuccinic acid anhydrides such as 3-trimethoxysilylpropylsuccinic acid anhydride and 3-triethoxysilylpropylsuccinic acid anhydride; and (methacryloyloxyalkyl)alkoxysilane compounds such as 3-methacryloyloxypropyltrimethoxysilane and 3-methacryloyloxypropyltriethoxysilane.

In addition, the compound containing an alkoxysilyl group may contain a nitrogen atom and a group represented by $>C=O$. Examples of the compound containing an alkoxysilyl group and containing a nitrogen atom and a group represented by $>C=O$ include tris[(alkoxysilyl)alkyl]isocyanurate compounds such as tris[3-(trimethoxysilyl)propyl]isocyanurate, tris[3-(triethoxysilyl)propyl]isocyanurate, tris[3-(tripropoxysilyl)propyl]isocyanurate and tris[3-(tributoxysilyl)propyl]isocyanurate. Among them, tris[3-(trialkoxysilyl)propyl]isocyanurate is preferable, tris[3-(trialkoxysilyl)propyl]isocyanurate in which the alkoxy group is an alkoxy group having 1 to 4 carbon atoms is more preferable, and tris[3-(trimethoxysilyl)propyl]isocyanurate is still more preferable.

In the method (A) described above, examples of the compound preferred as a compound having a group represented by the formula (2) include compounds represented by the following formula (5).

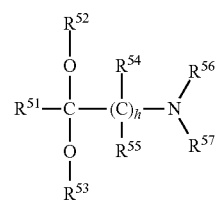

(5)

wherein $R^{51}$ represents a hydrogen atom, a hydrocarbyl group or a hydrocarbyloxy group, $R^{52}$ and $R^{53}$ represent a hydrocarbyl group. h represents an integer of 0 to 10, $R^{54}$ and $R^{55}$ each represent a hydrogen atom or a hydrocarbyl group, and when there is a plurality of $R^{54}$s, the plurality of $R^{54}$s may be the same or different from each other, and when there is a plurality of $R^{55}$s, the plurality of $R^{55}$s may be the same or different from each other. $R^{56}$ and $R^{57}$ each represent a hydrocarbyl group optionally having a substituent or a trihydrocarbylsilyl group, or $R^{56}$ and $R^{57}$ are bonded to represent a hydrocarbylene group optionally having, as a hetero atom, at least one atom selected from an atomic group consisting of a silicon atom, a nitrogen atom and an oxygen atom.

$R^{51}$ represents a hydrogen atom, a hydrocarbyl group or a hydrocarbyloxy group. The hydrocarbyl group is preferably a hydrocarbyl group having 1 to 4 carbon atoms, more preferably an alkyl group having 1 to 4 carbon atoms, and still more preferably a methyl group or an ethyl group. The hydrocarbyloxy group is preferably a hydrocarbyloxy group having 1 to 4 carbon atoms, more preferably an alkoxy group having 1 to 4 carbon atoms, and still more preferably a methoxy group or an ethoxy group. Among them, $R^{51}$ is preferably a hydrogen atom.

$R^{52}$ and $R^{53}$ represent a hydrocarbyl group. The hydrocarbyl group is preferably a hydrocarbyl group having 1 to 4 carbon atoms, more preferably an alkyl group having 1 to 4 carbon atoms, and still more preferably a methyl group or an ethyl group. $R^{52}$ and $R^{53}$ may be the same group or different groups.

h represents an integer of 0 to 10, and is preferably 3 or less and more preferably 0.

$R^{54}$ and $R^{55}$ each represent a hydrogen atom or a hydrocarbyl group, and when there is a plurality of $R^{54}$s, the plurality of $R^{54}$s may be the same or different from each other, and when there is a plurality of $R^{55}$s, the plurality of $R^{55}$s may be the same or different from each other. The hydrocarbyl group is preferably a hydrocarbyl group having 1 to 4 carbon atoms, more preferably an alkyl group having 1 to 4 carbon atoms, and still more preferably a methyl group or an ethyl group.

$R^{56}$ and $R^{57}$ each represent a hydrocarbyl group optionally having a substituent or a trihydrocarbylsilyl group. The hydrocarbyl group optionally having a substituent is a hydrocarbyl group or a substituted hydrocarbyl group. The hydrocarbyl group is preferably a hydrocarbyl group having 1 to 4 carbon atoms. Examples of the substituted hydrocarbyl group include a substituted hydrocarbyl group in which the substituent is a substituted amino group, such as a N,N-dimethylaminomethyl group, a 2-N,N-dimethylaminoethyl group and a 3-N,N-dimethylaminopropyl group; and a substituted hydrocarbyl group in which the substituent is a hydrocarbyloxy group, such as a methoxy methyl group, a methoxy ethyl group and an ethoxy methyl group. Examples of the trihydrocarbylsilyl group include a trimethylsilyl group and a tert-butyl-dimethylsilyl group, and preferably a trimethylsilyl group. Among them, $R^{56}$ and $R^{57}$ are preferably a hydrocarbyl group, more preferably a hydrocarbyl group having 1 to 4 carbon atoms, still more preferably an alkyl group having 1 to 4 carbon atoms, and particularly preferably a methyl group or an ethyl group.

$R^{56}$ and $R^{57}$ may be bonded to represent a hydrocarbylene group optionally having, as a hetero atom, at least one atom selected from an atomic group consisting of a silicon atom, a nitrogen atom and an oxygen atom. Examples of the hydrocarbylene group include alkylene groups such as a tetramethylene group, a pentamethylene group, a hexamethylene group and a 2,2,4-trimethylhexane-1,6-diyl group; and alkenediyl groups such as a pent-2-ene-1,5-diyl group, and preferably an alkylene group, and more preferably an alkylene group having 4 to 7 carbon atoms. Examples of the hetero atom-containing hydrocarbylene group in which the hetero atom is a silicon atom include a group represented by —Si(CH$_3$)$_2$—CH$_2$—CH$_2$—Si(CH$_3$)$_2$—. Examples of the hetero atom-containing hydrocarbylene group in which the hetero atom is a nitrogen atom include a group represented by —CH═N—CH═CH— and a group represented by —CH═N—CH$_2$—CH$_2$—. Examples of the hetero atom-containing hydrocarbylene group in which the hetero atom is an oxygen atom include a group represented by —CH$_2$—CH$_2$—O—CH$_2$—CH$_2$—. Among them, $R^{56}$ and $R^{57}$ are preferably a hydrocarbylene group, more preferably an alkylene group having 4 to 7 carbon atoms, and still more preferably a tetramethylene group, a pentamethylene group, or a hexamethylene group.

Examples of the compound represented by the formula (5) include N,N-dialkylformamide dialkyl acetals such as N,N-dimethylformamide dimethyl acetal, N,N-diethylformamide dimethyl acetal, N,N-dimethylformamide diethyl acetal and N,N-diethylformamide diethyl acetal; and N,N-dialkylacetamide dialkyl acetals such as N,N-dimethylacetamide dimethyl acetal, N,N-diethylacetamide dimethyl acetal, N,N-dimethylacetamide diethyl acetal and N,N-diethylacetamide diethyl acetal.

The compound represented by the formula (5) is preferably a compound in which h is 3 or less, $R^{51}$ is a hydrogen atom, and $R^{52}$, $R^{53}$, $R^{54}$, $R^{55}$, $R^{56}$ and $R^{57}$ are an alkyl group having 1 to 4 carbon atoms, and more preferably a compound in which h is 0, $R^{51}$ is a hydrogen atom, and $R^{52}$, $R^{53}$, $R^{56}$ and $R^{57}$ are an alkyl group having 1 to 4 carbon atoms. The compound represented by the formula (5) is particularly preferably N,N-dimethylformamide dimethyl acetal, N,N-diethylformamide dimethyl acetal, N,N-dimethylformamide diethyl acetal or N,N-diethylformamide diethyl acetal.

In the method (b) described above, examples of the compound preferred as an organic alkali metal compound having a group represented by the formula (2) include compounds represented by the following formula (6).

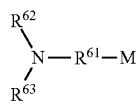

(6)

wherein $R^{61}$ represents a hydrocarbylene group having 6 to 100 carbon atoms, $R^{62}$ and $R^{63}$ each represent a hydrocarbyl group optionally having a substituent or a trihydrocarbylsilyl group, or $R^{62}$ is bonded to $R^{63}$, and a group in which $R^{62}$ is bonded to $R^{63}$ represents a hydrocarbylene group optionally having, as a hetero atom, a nitrogen atom and/or an oxygen atom, a group having 5 to 20 carbon atoms represented by —Si($R^{64}$)$_2$—(CH$_2$)$_x$—Si($R^{64}$)$_2$— ($R^{64}$ represents a hydrocarbyl group, and x represents an integer of 1 to 10), or a group having 4 to 20 carbon atoms represented by —Si($R^{65}$)$_2$—(CH$_2$)$_y$— ($R^{65}$ represents a hydrocarbyl group, and y represents an integer of 2 to 11), and M represents an alkali metal atom.

In the formula (6), $R^{61}$ is a hydrocarbylene group having 6 to 100 carbon atoms, preferably a hydrocarbylene group having 7 to 90 carbon atoms, and more preferably a hydrocarbylene group having 8 to 80 carbon atoms. When the number of carbon atoms of the hydrocarbylene group in $R^{61}$ is 5 or less, solubility of the compound represented by the formula (6) in a hydrocarbon solvent may be lowered. When the number of carbon atoms of the hydrocarbylene group in $R^{61}$ is 100 or more, the molecular weight of the compound represented by the formula (6) is increased, and economical properties and operability during polymerization may be lowered.

In the formula (6), the hydrocarbylene group in $R^{61}$ is preferably a group represented by the following formula (6-A).

(6-A)

wherein $R^{66}$ represents a hydrocarbylene group comprising monomer units derived from a conjugated diene compound and/or monomer units derived from an aromatic vinyl compound, and represents an integer of 1 to 10. (CH$_2$)$_i$ is bonded to a nitrogen atom in the formula (6).

In the formula (6-A), $R^{66}$ represents a hydrocarbylene group comprising monomer units derived from a conjugated diene compound and/or monomer units derived from an aromatic vinyl compound, and preferably a hydrocarbylene group comprising monomer units derived from isoprene.

The number of the monomer units derived from a conjugated diene compound and/or monomer units derived from an aromatic vinyl compound in $R^{66}$ is preferably 1 to 10 units, and more preferably 1 to 5 units.

In the formula (6-A), i is an integer of 1 to 10, preferably an integer of 2 to 4, and more preferably 3.

Examples of the group represented by the formula (6-A) include groups obtained by combining 1 to 10 monomer units derived from isoprene with a methylene group, groups obtained by combining 1 to 10 monomer units derived from isoprene with an ethylene group, and groups obtained by combining 1 to 10 monomer units derived from isoprene with a trimethylene group.

$R^{62}$ and $R^{63}$ in the formula (6) represent a hydrocarbyl group optionally having a substituent or a trihydrocarbylsilyl group, or $R^{62}$ is bonded to $R^{63}$, and a group in which $R^{62}$ is bonded to $R^{63}$ represents a hydrocarbylene group optionally having, as a hetero atom, a nitrogen atom and/or an oxygen atom, a group having 5 to 20 carbon atoms represented by —Si($R^{64}$)$_2$—(CH$_2$)$_x$—Si($R^{64}$)$_2$— ($R^{64}$ represents a hydrocarbyl group, and x represents an integer of 1 to 10), or a group having 4 to 20 carbon atoms represented by —Si($R^{65}$)$_2$—(CH$_2$)$_y$— ($R^{65}$ represents a hydrocarbyl group, and y represents an integer of 2 to 11).

The hydrocarbyl group optionally having a substituent in $R^{62}$ and $R^{63}$ is a hydrocarbyl group or a substituted hydrocarbyl group. Examples of the substituent in the substituted hydrocarbyl group include substituted amino groups or hydrocarbyloxy groups. Examples of the hydrocarbyl group include chain alkyl groups such as a methyl group, an ethyl group, a n-propyl group, an isopropyl group, a n-butyl group, an isobutyl group, a sec-butyl group, a tert-butyl group, a n-pentyl group, a n-hexyl group, a n-octyl group and a n-dodecyl group; cyclic alkyl groups such as a cyclopentyl group and a cyclohexyl group; and aryl groups such as a phenyl group and a benzyl group, preferably a chain alkyl group, and more preferably a chain alkyl group having 1 to 4 carbon atoms. Examples of the substituted hydrocarbyl group in which substituent is a substituted amino group include a N,N-dimethylaminomethyl group, a 2-N,N-dimethylaminoethyl group, and a 3-N,N-dimethylaminopropyl group. Examples of the substituted hydrocarbyl group in which substituent is a substituted hydrocarbyloxy group include a methoxy methyl group, a methoxy ethyl group, and an ethoxy methyl group. Among them, a hydrocarbyl group is preferable, a chain alkyl group having 1 to 4 carbon atoms is more preferable, and a methyl group or an ethyl group is still more preferable.

Examples of the trihydrocarbylsilyl group in $R^{62}$ and $R^{63}$ include a trimethylsilyl group and a tert-butyl-dimethylsilyl group, and preferably a trimethylsilyl group.

In the group in which $R^{62}$ is bonded to $R^{63}$, the hydrocarbylene group optionally having, as a hetero atom, a nitrogen atom and/or an oxygen atom is a hydrocarbylene group or a hetero atom-containing hydrocarbylene group in which the hetero atom is a nitrogen atom and/or an oxygen atom. The hetero atom-containing hydrocarbylene group in which the hetero atom is a nitrogen atom and/or an oxygen atom includes a hetero atom-containing hydrocarbylene group in which the hetero atom is a nitrogen atom and a hetero atom-containing hydrocarbylene group in which the hetero atom is an oxygen atom. Examples of the hydrocarbylene group include alkylene groups such as a tetramethylene group, a pentamethylene group, a hexamethylene group and a 2,2,4-trimethylhexane-1,6-diyl group; and alkenediyl groups such as a pent-2-ene-1,5-diyl group, and preferably an alkylene group, and more preferably an alkylene group having 4 to 7 carbon atoms. Examples of the hetero atom-containing hydrocarbylene group in which the hetero atom is a nitrogen atom include a group represented by —CH═N—CH═CH— and a group represented by —CH═N—CH$_2$—CH$_2$—. Examples of the hetero atom-containing hydrocarbylene group in which the hetero atom is an oxygen atom include a group represented by —CH$_2$—CH$_2$—O—CH$_2$—CH$_2$—. Among them, a hydrocarbylene group is preferable, an alkylene group having 4 to 7 carbon atoms is more preferable, and a tetramethylene group, a pentamethylene group or a hexamethylene group is still more preferable.

In the group in which $R^{62}$ is bonded to $R^{63}$, examples of the group having 5 to 20 carbon atoms represented by —Si($R^{64}$)$_2$—(CH$_2$)$_x$—Si($R^{64}$)$_2$— ($R^{64}$ represents a hydrocarbyl group, and x represents an integer of 1 to 10) include a group represented by —Si(CH$_3$)$_2$—CH$_2$—CH$_2$—Si(CH$_3$)$_2$—. Examples of the group having 4 to 20 carbon atoms represented by —Si($R^{65}$)$_2$—(CH$_2$)$_y$— ($R^{65}$ represents a hydrocarbyl group, and y represents an integer of 2 to 11) include a group represented by —Si(CH$_3$)$_2$—CH$_2$—CH$_2$—CH$_2$—.

$R^{62}$ and $R^{63}$ are preferably a hydrocarbyl group, or $R^{62}$ is bonded to $R^{63}$, and the group in which $R^{62}$ is bonded to $R^{63}$ is a hydrocarbylene group, more preferably a chain alkyl group having 1 to 4 carbon atoms, or $R^{62}$ is bonded to $R^{63}$, and the group in which $R^{62}$ is bonded to $R^{63}$ is an alkylene group having 4 to 7 carbon atoms, still more preferably a chain alkyl group having 1 to 4 carbon atoms, and particularly preferably a methyl group or an ethyl group.

In the formula (6), M represents an alkali metal atom. Examples of the alkali metal atom include Li, Na, K and Cs, and preferably Li.

Examples of the compound in which $R^{61}$ is a group represented by the formula (6-A), $R^{62}$ and $R^{63}$ area hydrocarbyl group, and M is Li, of the compounds represented by the formula (6), include a compound obtained by reacting 1 mol to 5 mols of isoprene with a (dialkylamino)alkyllithium compound (per mole of (dialkylamino)alkyllithium compound).

Examples of the (dialkylamino)alkyllithium compound include 3-(dimethylamino)propyllithium, 3-(diethylamino)propyllithium, 3-(dibutylamino)propyllithium, 4-(dimethylamino)butyllithium, 4-(diethylamino)butyllithium, 4-(dipropylamino)butyllithium, and 3-(dibutylamino)butyllithium.

Examples of the compound in which $R^{61}$ is a group represented by the formula (6-A), $R^{62}$ is bonded to $R^{63}$, and the group in which $R^{62}$ is bonded to $R^{63}$ is a hydrocarbylene group, and M is Li, of the compounds represented by the formula (6), include a compound obtained by reacting 1 mol to 5 mols of isoprene with a (hetero atom-free cyclic amino)alkyllithium compound (per mole of a (hetero atom-free cyclic amino)alkyllithium compound).

Examples of the (hetero atom-free cyclic amino)alkyllithium compound include 3-(1-pyrrolidinyl)propyllithium, 3-(1-pyperidinyl)propyllithium, 3-(1-hexamethyleneimino)propyllithium, and 3-[1-(1,2,3,6-tetrahydropyrrolidinyl)]propyllithium.

Examples of the compound in which $R^{61}$ is a group represented by the formula (6-A), $R^{62}$ is bonded to $R^{63}$, and the group in which $R^{62}$ is bonded to $R^{63}$ is a hetero atom-containing hydrocarbylene group, and M is Li, of the compounds represented by the formula (6), include a compound obtained by reacting 1 mol to 5 mols of isoprene with a (hetero atom-containing cyclic amino)alkyllithium compound (per mole of a (hetero atom-containing cyclic amino)alkyllithium compound).

Examples of the (hetero atom-containing cyclic amino)alkyllithium compound include 3-(1-morpholino)propyllithium, 3-(1-imidazolyl)propyllithium, and 3-(4,5-dihydro-1-imidazolyl)propyllithium.

Examples of the compound in which $R^{61}$ is a group represented by the formula (6-A), $R^{62}$ is bonded to $R^{63}$, and the group in which $R^{62}$ is bonded to $R^{63}$ is a group having 5 to 20 carbon atoms represented by —Si($R^{64}$)$_2$—(CH$_2$)$_x$—Si($R^{64}$)$_2$— ($R^{64}$ represents a hydrocarbyl group, and x represents an integer of 1 to 10), and M is Li, of the compounds represented by the formula (6), include a compound obtained by reacting 1 mol to 5 mols of isoprene with 3-(2,2,5,5-tetramethyl-1-aza-2,5-disila-1-cyclopentyl)propyllithium (per mole of 3-(2,2,5,5-tetramethyl-1-aza-2,5-disila-1-cyclopentyl)propyllithium).

Examples of the compound in which $R^{61}$ is a group represented by the formula (6-A), $R^{62}$ is bonded to $R^{63}$, and the group in which $R^{62}$ is bonded to $R^{63}$ is a group having 4 to 20 carbon atoms represented by —Si($R^{65}$)$_2$—(CH$_2$)$_y$— ($R^{65}$ represents a hydrocarbyl group, and y represents an integer of 2 to 11), and M is Li, of the compounds represented by the formula (6), include a compound obtained by reacting 1 mol to 5 mols of isoprene with 3-(2,2-dimethyl-1-aza-2-sila-1-cyclopentyl)propyllithium (per mole of 3-(2,2-dimethyl-1-aza-2-sila-1-cyclopentyl)propyllithium).

The compounds represented by the formula (6) is preferably a compound in which $R^{61}$ is a group represented by the formula (6-A), $R^{62}$ and $R^{63}$ are a hydrocarbyl group, and M is Li, and more preferably a compound in which $R^{62}$ and $R^{63}$ are each an alkyl group having 1 to 4 carbon atoms, M is Li, $R^{61}$ is a group represented by the formula (6-A), and $R^{66}$ is a group comprising 1 to 5 monomer units derived from isoprene, and g is 2 to 4, and more preferably a compound obtained by reacting 1 mol to 5 mols of isoprene with 3-(dimethylamino) propyllithium or 3-(diethylamino)propyllithium (per mole of 3-(dimethylamino)propyllithium or 3-(diethylamino)propyllithium).

The compounds represented by the formula (6) may be a mixture of a plurality of compounds different in $R^{61}$.

In the method (c) described above, examples of the compound preferred as an organic alkali metal compound include organic lithium compounds, organic sodium compounds, organic potassium compounds, and organic cesium compounds. Examples of the organic lithium compound include alkyllithium compounds such as methyllithium, ethyllithium, n-propyllithium, isopropyllithium, n-butyllithium, isobutyllithium, sec-butyllithium, tert-butyllithium, n-hexyllithium and n-octyllithium; alkenyllithium compounds such as vinyllithium and propenyllithium; aryllithium compounds such as phenyllithium, benzyllithium, tolyllithium and lithium naphthyride; alkylenedilithium compounds such as tetramethylenedilithium, pentamethylenedilithium, hexamethylenedilithium and decamethylenedilithium; and lithium naphthalenide, and lithium biphenylide. Examples of the organic sodium compound include sodium naphthalenide and sodium biphenylide. Examples of the organic potassium compound include potassium naphthalenide. The organic sodium compound is preferably an organic lithium compound, more preferably an alkyllithium compound having 1 to 20 carbon atoms, and still more preferably n-butyllithium, sec-butyllithium, or tert-butyllithium.

In the method (c) described above, examples of the compound preferred as a secondary amine compound having a group represented by the formula (2) include compounds represented by the following formula (7).

(7)

wherein $R^{72}$ and $R^{73}$ represent a hydrocarbyl group having 1 to 20 carbon atoms and optionally having a substituent, or $R^{72}$ is bonded to $R^{73}$, and a group in which $R^{72}$ is bonded to $R^{73}$ represents a hydrocarbylene group having 3 to 20 carbon atoms and optionally having, as a hetero atom, a nitrogen atom and/or an oxygen atom, a group having 5 to 20 carbon atoms represented by $-Si(R^{74})_2-(CH_2)_x-Si(R^{74})_2-$ ($R^{74}$ represents a hydrocarbyl group, and x represents an integer of 1 to 10), or a group having 4 to 20 carbon atoms represented by $-Si(R^{75})_2-(CH_2)_y-$ ($R^{75}$ represents a hydrocarbyl group, and y represents an integer of 2 to 11).

The hydrocarbyl group having 1 to 20 carbon atoms and optionally having a substituent in $R^{72}$ and $R^{73}$ is a hydrocarbyl group having 1 to 20 carbon atoms or a substituted hydrocarbyl group having 1 to 20 carbon atoms. Examples of the substituted hydrocarbyl group having 1 to 20 carbon atoms include substituted hydrocarbyl groups having 1 to 20 carbon atoms and having a hydrocarbyloxy group as a substituent, substituted hydrocarbyl groups having 1 to 20 carbon atoms and having a substituted amino group as a substituent, substituted hydrocarbyl groups having 1 to 20 carbon atoms and having a trialkylsilyl group as a substituent, and substituted hydrocarbyl groups having 1 to 20 carbon atoms and having a trialkoxysilyl group as a substituent.

Examples of the hydrocarbyl group having 1 to 20 carbon atoms include chain alkyl groups such as a methyl group, an ethyl group, a n-propyl group, an isopropyl group, a n-butyl group, an isobutyl group, a sec-butyl group, a tert-butyl group, a n-hexyl group, a n-octyl group and a n-dodecyl group; cyclic alkyl groups such as a cyclopentyl group and a cyclohexyl group; and aryl groups such as a phenyl group, a tolyl group, a xylyl group, a benzyl group and a naphthyl group. Examples of the substituted hydrocarbyl group having 1 to 20 carbon atoms and having a hydrocarbyloxy group as a substituent include alkoxyalkyl groups such as a methoxy methyl group, an ethoxy methyl group, a methoxy ethyl group, and an ethoxy ethyl group. Examples of the substituted hydrocarbyl group having 1 to 20 carbon atoms and having a substituted amino group as a substituent include dialkylaminoalkyl groups such as a dimethylaminomethyl group and a diethylaminomethyl group. Examples of the substituted hydrocarbyl group having 1 to 20 carbon atoms and having a trialkylsilyl group as a substituent include trialkylsilylalkyl groups such as a trimethylsilylmethyl group, a 2-trimethylsilylethyl group and a 3-trimethylsilylpropyl group. Examples of the substituted hydrocarbyl group having 1 to 20 carbon atoms and having a trialkoxysilyl group as a substituent include trialkoxysilylalkyl groups such as a trimethoxysilylmethyl group, a 2-trimethoxysilylethyl group and a 3-trimethoxysilylpropyl group.

The hydrocarbyl group having 1 to 20 carbon atoms and optionally having a substituent in $R^{72}$ and $R^{73}$ is preferably a hydrocarbyl group having 1 to 20 carbon atoms, more preferably an alkyl group having 1 to 10 carbon atoms, and still more preferably an ethyl group, a n-propyl group, an isopropyl group or a n-butyl group.

Examples of the compound in which $R^{72}$ and $R^{73}$ are a hydrocarbyl group having 1 to 20 carbon atoms, of the compounds represented by the formula (7), include dialkylamines such as dimethylamine, diethylamine, methylethylamine, di-n-propylamine, diisopropylamine, di-n-butylamine, diisobutylamine, di-sec-butylamine, di-tert-butylamine, di-n-hexylamine, di-n-octylamine and dicyclohexylamine; alkylarylamines such as N-methylaniline, N-ethylaniline and N-methyl-N-benzylamine; and diarylamines such as diphenylamine.

Examples of the compound in which at least one of $R^{72}$ and $R^{73}$ is a substituted hydrocarbyl group having 1 to 20 carbon atoms, of the compounds represented by the formula (7), include di(alkoxyalkyl)amines such as di(methoxymethyl)amine, di(ethoxymethyl)amine, di(2-methoxyethyl)amine and di(2-ethoxyethyl)amine; bis(dialkylaminoalkyl)amines such as bis(dimethylaminomethyl)amine; trialkylsilylalkyl group-containing amine compounds such as trimethylsilylpropylmethylamine; and trialkoxysilylalkyl group-containing amine compounds such as trimethoxysilylpropylmethylamine.

In the group in which $R^{72}$ is bonded to $R^{73}$, the hydrocarbylene group having 3 to 20 carbon atoms and optionally having, as a hetero atom, a nitrogen atom and/or an oxygen atom is a hydrocarbylene group having 3 to 20 carbon atoms or a hetero atom-containing hydrocarbylene group having 3 to 20 carbon atoms and having, as a hetero atom, a nitrogen atom and/or an oxygen atom. Examples of the hetero atom-containing hydrocarbylene group having 3 to 20 carbon atoms and having, as a hetero atom, a nitrogen atom and/or an oxygen atom include a hetero atom-containing hydrocarbylene groups having 3 to 20 carbon atoms in which the hetero atom is a nitrogen atom and a hetero atom-containing hydrocarbylene groups having 3 to 20 carbon atoms in which the hetero atom is an oxygen atom.

Examples of the hydrocarbylene group having 3 to 20 carbon atoms include alkylene groups such as a tetramethylene group, a pentamethylene group, a hexamethylene group, an octamethylene group, a decamethylene group, a dodecamethylene group, a hexane-1,5-diyl group, a 2-methylpentane-1,5-diyl group, a 3-methylpentane-1,5-diyl group, a 2,4-methylpentane-1,5-diyl group, and a 2,2,4-trimethylhexane-1,6-diyl group. Example of the hydrocarbylene group having 3 to 20 carbon atoms in which the hetero atom is a nitrogen atom includes a group represented by —CH=N—CH=CH— and a group represented by —CH=N—CH$_2$—CH$_2$—. Examples of the hetero atom-containing hydrocarbylene group having 3 to 20 carbon atoms in which the hetero atom is an oxygen atom include a group represented by —CH$_2$—CH$_2$—O—CH$_2$—CH$_2$—.

In the group in which $R^{72}$ is bonded to $R^{73}$, examples of the group having 5 to 20 carbon atoms represented by —Si(R$^{74}$)$_2$—(CH$_2$)$_x$—Si(R$^{74}$)$_2$— (R$^{74}$ represents a hydrocarbyl group, and x represents an integer of 1 to 10) include a group represented by —Si(CH$_3$)$_2$—CH$_2$—CH$_2$—Si(CH$_3$)$_2$—. Examples of the group having 4 to 20 carbon atoms represented by —Si(R$^{75}$)$_2$—(CH$_2$)$_y$— (R$^{75}$ represents a hydrocarbyl group, and y represents an integer of 2 to 11) include a group represented by —Si(CH$_3$)$_2$—CH$_2$—CH$_2$—CH$_2$—.

Examples of the compound in which $R^{72}$ is bonded to $R^{73}$, and a group in which $R^{72}$ is bonded to $R^{73}$ is a hydrocarbylene group having 3 to 20 carbon atoms, of the compounds represented by the formula (7), include trimethyleneimine, pyrrolidine, piperidine, 2-methylpiperidine, hexamethyleneimine, octamethyleneimine, decamethyleneimine, dodecamethyleneimine, 3-methylpiperidine, 4-methylpiperidine, 3,5-dimethylpiperidine, 1,2,3,6-tetrahydropyridine, 3,5,5-trimethylhexahydroazepine and 1,3,3-trimethyl-6-azabicyclo[3,2,2]octane.

Examples of the compound in which $R^{72}$ is bonded to $R^{73}$, and a group in which $R^{72}$ is bonded to $R^{73}$ is a hetero atom-containing hydrocarbylene group having 3 to 20 carbon atoms and having, as a hetero atom, a nitrogen atom and/or an oxygen atom, of the compounds represented by the formula (7), include imidazole, 4,5-dihydroimidazole, and morpholine.

Examples of the compound in which $R^{72}$ is bonded to $R^{73}$, and a group in which $R^{72}$ is bonded to $R^{73}$ is a group having 5 to 20 carbon atoms represented by —Si(R$^{74}$)$_2$—(CH$_2$)$_x$—Si(R$^{74}$)$_2$— (R$^{74}$ represents a hydrocarbyl group, and x represents an integer of 1 to 10), of the compounds represented by the formula (7), include 2,2,5,5-tetramethyl-1-aza-2,5-disilacyclopentane, and examples of the compound in which a group in which $R^{72}$ is bonded to $R^{73}$ is a group having 4 to 20 carbon atoms represented by —Si(R$^{75}$)$_2$—(CH$_2$)$_y$— (R$^{75}$ represents a hydrocarbyl group, and y represents an integer of 2 to 11) include 2,2-dimethyl-1-aza-2-silacyclopentane.

The secondary amine compound is preferably a compound in which $R^{72}$ is bonded to $R^{73}$ in the formula (7) (a compound represented by the following formula (7-A)).

(7-A)

wherein $R^{71}$ represents a hydrocarbylene group having 3 to 20 carbon atoms and optionally having, as a hetero atom, a nitrogen atom and/or an oxygen atom, a group having 5 to 20 carbon atoms represented by —Si(R$^{74}$)$_2$—(CH$_2$)$_x$—Si(R$^{74}$)$_2$— (R$^{74}$ represents a hydrocarbyl group, and x represents an integer of 1 to 10), or a group having 4 to 20 carbon atoms represented by —Si(R$^{75}$)$_2$—(CH$_2$)$_y$— (R$^{75}$ represents a hydrocarbyl group, and y represents an integer of 2 to 11).

$R^{71}$ is preferably a hydrocarbylene group having 3 to 20 carbon atoms, more preferably an alkylene group having 4 to 8 carbon atoms, and still more preferably a tetramethylene group, a pentamethylene group, or a hexamethylene group.

The compound particularly preferred as the compound represented by the formula (7-A) is pyrrolidine, piperidine, and hexamethyleneimine.

In the method (d) described above, examples of the compound preferred as a vinyl based monomer having a group represented by the formula (2) include the compound represented by the following formula (8).

$$E^8\text{-}A^8 \qquad (8)$$

wherein $E^8$ represents a hydrocarbyl group having a polymerizable carbon-carbon double bond, and $A^8$ represents a substituted amino group or a nitrogen-containing heterocyclic group.

$E^8$ in the formula (8) represents a hydrocarbyl group having a polymerizable carbon-carbon double bond, and $A^8$ represents a substituted amino group or a nitrogen-containing heterocyclic group.

$E^8$ is preferably a group represented by the following formula (8-E).

(8-E)

wherein m represents an integer of 0 or 1, $R^{81}$, $R^{83}$ and $R^{84}$ each represent a hydrogen atom or a hydrocarbyl group, and $R^{82}$ represents a hydrocarbylene group.

In the formula (8-E), m represents an integer of 0 or 1.

Examples of the hydrocarbyl group in $R^{81}$, $R^{83}$ and $R^{84}$ include alkyl groups, alkenyl groups, and aryl groups. Examples of the alkyl group include a methyl group, an ethyl group, a n-propyl group, an isopropyl group, a n-butyl group, a sec-butyl group, and a tert-butyl group, and preferably a methyl group. Examples of the alkenyl group include a vinyl group, an allyl group, a 1-propenyl group, and an isopropenyl group, and preferably a vinyl group. Examples of the aryl group include a phenyl group, a methyl phenyl group, and an ethyl phenyl group, and preferably a phenyl group.

$R^{81}$ is preferably a hydrogen atom, a methyl group, a vinyl group or a phenyl group, and more preferably a hydrogen atom.

$R^{83}$ and $R^{84}$ are preferably a hydrogen atom.

Examples of the hydrocarbylene group in $R^{82}$ include alkylene groups, arylene groups, and groups in which an arylene group is bonded to an alkylene group.

Examples of the alkylene group include a methylene group, an ethylene group, and a trimethylene group, and preferably a methylene group or an ethylene group. Examples of the arylene group include a phenylene group, a naphthylene group, and a biphenylene group, and preferably a phenylene group, and more preferably a para-phenylene group or a meta-phenylene group.

Examples of the group in which an arylene group is bonded to an alkylene group include groups in which a phenylene group is bonded to an alkylene group, groups in which a naphthylene group is bonded to an alkylene group, and groups in which a biphenylene group is bonded to an alkylene group, and preferably a group in which a phenylene group is bonded to an alkylene group.

In addition, as the group in which an arylene group is bonded to an alkylene group, the carbon atom in the arylene group of the group is preferably bonded to the carbon atom to which $R^{81}$ of the formula (8-E) is bonded.

Examples of the group in which a phenylene group is bonded to an alkylene group (hereinafter, may be referred to as a phenylene-alkylene group) include the groups represented by the following formula (8-R).

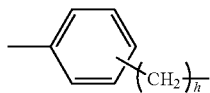
(8-R)

wherein h represents an integer of 1 to 10, and $(CH_2)_h$ is a substituent on a benzene ring.

Examples of the phenylene-alkylene group include a para-phenylene-alkylene group, a meta-phenylene-alkylene group, and an ortho-phenylene-alkylene group, depending on the position of the carbon atom on the benzene ring to which an alkylene group is bonded. In the case of the group represented by the formula (8-R), the para-phenylene-alkylene group is a group represented by the following formula (8-Ra), the meta-phenylene-alkylene group is a group represented by the following formula (8-Rb), and the ortho-phenylene-alkylene group is a group represented by the following formula (8-Rc).

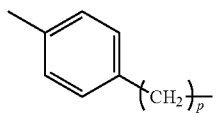
(8-Ra)

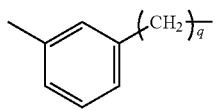
(8-Rb)

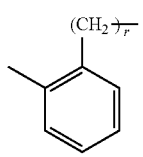
(8-Rc)

wherein p, q and r each represent an integer of 1 to 10.

h in the formula (8-R), p in the formula (8-Ra), q in the formula (8-Rb) and r in the formula (8-Rc) are preferably 1 to 5, more preferably 1 to 2, and still more preferably 2.

The group in which an arylene group is bonded to an alkylene group is preferably the group in which a phenylene group is bonded to an alkylene group, more preferably the group represented by the formula (8-Ra) or the group represented by the formula (8-Rb), still more preferably a para-phenylene-methylene group (a group represented by the formula (8-Ra) wherein p is 1), a meta-phenylene-methylene group (a group represented by the formula (8-Rb) wherein q is 1), a para-phenylene-ethylene group (a group represented by the formula (8-Ra) wherein p is 2) or a meta-phenylene-ethylene group (a group represented by the formula (8-Rb) wherein q is 2), and particularly preferably a para-phenylene-ethylene group (a group represented by the formula (8-Ra) wherein p is 2) or a meta-phenylene-ethylene group (a group represented by the formula (8-Rb) wherein q is 2).

Examples of the group represented by the formula (8-E) include the groups shown below.

Examples of the group in which $R^{81}$, $R^{83}$ and $R^{84}$ are a hydrogen atom include a vinyl group, an allyl group, a 3-butenyl group, a 4-vinylphenyl group, a 3-vinylphenyl group, a (4-vinylphenyl)methyl group, a 2-(4-vinylphenyl)ethyl group, a (3-vinylphenyl)methyl group and a 2-(3-vinylphenyl)ethyl group.

Examples of the group in which $R^{81}$ is a methyl group, and $R^{83}$ and $R^{84}$ are a hydrogen atom include an isopropenyl group, a 2-methyl-2-propenyl group, a 4-isopropenylphenyl group, a 3-isopropenylphenyl group, a (4-isopropenylphenyl)methyl group, a 2-(4-isopropenylphenyl)ethyl group, a (3-isopropenylphenyl)methyl group, and a 2-(3-isopropenylphenyl)ethyl group.

Examples of the group in which $R^{81}$ is a vinyl group, and $R^{83}$ and $R^{84}$ are a hydrogen atom include a 1-methylene-2-propenyl group and a 2-methylene-3-butenyl group.

Examples of the group in which $R^{81}$ is a phenyl group, and $R^{83}$ and $R^{84}$ are a hydrogen atom include a 1-phenylethenyl group, a 2-phenyl-2-propenyl group, a 4-(1-phenylethenyl)phenyl group, a 3-(1-phenylethenyl)phenyl group, and a 2-(1-phenylethenyl)phenyl group.

Examples of the group in which $R^{81}$ is a hydrogen group, $R^{83}$ is a methyl group, and $R^{84}$ is a hydrogen atom include a 1-propenyl group, a 2-butenyl group, a 4-(1-propenyl)phenyl group, a [4-(1-propenyl)phenyl]methyl group, a 2-[4-(1-propenyl)phenyl]ethyl group, a 3-(1-propenyl)phenyl group, a [3-(1-propenyl)phenyl]methyl group, and a 2-[3-(1-propenyl)phenyl]ethyl group.

The group represented by the formula (8-E) is preferably a group represented by the following formula (8-E1).

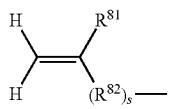
(8-E1)

wherein $R^{81}$ represents a hydrogen atom or a hydrocarbyl group, s represents an integer of 0 or 1, and $R^{82}$ represents a hydrocarbylene group.

Among the preferred groups represented by the formula (8-E1), examples of the group in which $R^{81}$ is a hydrogen atom include a vinyl group, a 4-vinylphenyl group, a 3-vinylphenyl group, a (4-vinylphenyl)methyl group, a 2-(4-vinylphenyl)ethyl group, a (3-vinylphenyl)methyl group, and a 2-(3-vinylphenyl)ethyl group. Examples of the group in which $R^{81}$ is a methyl group include a 4-isopropenylphenyl group, a 3-isopropenylphenyl group, a (4-isopropenylphenyl)methyl group, a 2-(4-isopropenylphenyl)ethyl group, a (3-isopropenylphenyl)methyl group, and a 2-(3-isopropenylphenyl)ethyl group. Examples of the group in which $R^{81}$ is a vinyl group include a 1-methylene-2-propenyl group and a 2-methylene-3-butenyl group. Examples of the group in which $R^{81}$ is a phenyl group include a 4-(1-phenylethenyl)phenyl group.

The group represented by the formula (8-E1) is more preferably a group in which $R^{81}$ is a hydrogen atom, and still more preferably a group in which s is 1 and $R^{82}$ is the group represented by the formula (8-R), a vinylphenyl group, or a vinyl group.

In the formula (8), $A^8$ represents a substituted amino group, or a nitrogen-containing heterocyclic group.

The substituted amino group in $A^8$ is preferably a group represented by the following formula (8-A).

(8-A)

wherein $R^{85}$ and $R^{86}$ each independently represent a hydrocarbyl group or a trihydrocarbylsilyl group, or $R^{85}$ is bonded to $R^{86}$, and a group in which $R^{85}$ is bonded to $R^{86}$ represents a hydrocarbylene group optionally having, as a hetero atom, a nitrogen atom and/or an oxygen atom, or $R^{85}$ and $R^{86}$ are one group, and represent a group which bonds to a nitrogen atom with a double bond.

Examples of the hydrocarbyl group in $R^{85}$ and $R^{86}$ include alkyl groups, alkenyl groups, alkynyl groups, aryl groups, and aralkyl groups. Examples of the alkyl group include a methyl group, an ethyl group, a n-propyl group, an isopropyl group, a n-butyl group, a sec-butyl group, and a tert-butyl group. Examples of the alkenyl group include a vinyl group, an allyl group, a 1-propenyl group, and an isopropenyl group. Examples of the alkynyl group include an ethynyl group and a 2-propynyl group. Examples of the aryl group include a phenyl group, a tolyl group, and a xylyl group. Examples of the aralkyl group include a benzyl group.

The number of carbon atoms of the hydrocarbyl group in $R^{85}$ and $R^{86}$ is preferably 1 to 10, more preferably 1 to 4, and still more preferably 1 to 2.

The hydrocarbyl group in $R^{85}$ and $R^{86}$ is preferably an alkyl group or an alkenyl group, more preferably an alkyl group, and still more preferably a chain alkyl group.

Examples of the trihydrocarbylsilyl group in $R^{85}$ and $R^{86}$ include trialkylsilyl groups such as a trimethylsilyl group, a triethylsilyl group, a triisopropylsilyl group, and a tert-butyldimethylsilyl group.

The trihydrocarbylsilyl group in $R^{85}$ and $R^{86}$ is preferably a trialkylsilyl group having 3 to 9 carbon atoms, more preferably a trialkylsilyl group in which an alkyl group which is bonded to a silicon atom is an alkyl group having 1 to 4 carbon atoms, and still more preferably a trimethylsilyl group.

In the group in which $R^{85}$ is bonded to $R^{86}$, examples of the hydrocarbylene group optionally having, as a hetero atom, a nitrogen atom and/or an oxygen atom include a hydrocarbylene group, a hetero atom-containing hydrocarbylene group having, as a hetero atom, a nitrogen atom, and a hetero atom-containing hydrocarbylene group having, as a hetero atom, an oxygen atom. Examples of the hydrocarbylene group include alkylene groups such as an ethylene group, a trimethylene group, a tetramethylene group, a pentamethylene group and a hexamethylene group, and a 1,3-butadiene-1,4-diyl group. Examples of the hetero atom-containing hydrocarbylene group having, as a hetero atom, a nitrogen atom include a group represented by —CH$_2$CH$_2$—NH—CH$_2$—, a group represented by —CH$_2$CH$_2$—N═CH—, a group represented by —CH═CH—N═CH—, and a group represented by —CH$_2$CH$_2$—NH—CH$_2$CH$_2$—. Examples of the hetero atom-containing hydrocarbylene group having, as a hetero atom, an oxygen atom include a group represented by —CH$_2$CH$_2$—O—CH$_2$CH$_2$—.

The number of carbon atoms of the group in which $R^{85}$ is bonded to $R^{86}$ is preferably 2 to 20, more preferably 3 to 8, and still more preferably 4 to 6.

In the group in which $R^{85}$ is bonded to $R^{86}$, the hydrocarbylene group optionally having, as a hetero atom, a nitrogen atom and/or an oxygen atom is preferably a hydrocarbylene group, more preferably an alkylene group, and still more preferably a polymethylene group.

Examples of the one group in which $R^{85}$ and $R^{86}$ are bonded to a nitrogen atom with a double bond include hydrocarbylidene groups such as an ethylidene group, a propylidene group, a butylidene group, a 1-methylethylidene group, a 1-methylpropylidene group, and a 1,3-dimethylbutylidene group.

The number of carbon atoms of the one group in which $R^{85}$ and $R^{86}$ are bonded to a nitrogen atom with a double bond is preferably 2 to 20 and more preferably 2 to 6.

$R^{85}$ and $R^{86}$ are preferably a hydrocarbyl group or a trihydrocarbylsilyl group, or $R^{85}$ is bonded to $R^{86}$ and the group in which $R^{85}$ is bonded to $R^{86}$ is a hydrocarbylene group.

Examples of the group represented by the formula (8-A) include acyclic amino groups and cyclic amino groups.

Examples of the group in which $R^{85}$ and $R^{86}$ are a hydrocarbyl group in the formula (8-A), of acyclic amino groups, include dialkyl amino groups such as a dimethylamino group, a diethylamino group, a di(n-propyl)amino group, a di(isopropyl)amino group, a di(n-butyl)amino group, a di(sec-butyl) amino group, a di(tert-butyl) amino group, and an ethylmethylamino group. Examples of the group in which $R^{85}$ and $R^{86}$ are a trihydrocarbylsilyl group in the formula (8-A), of acyclic amino groups, include bis(trialkylsilyl)amino groups such as a bis(trimethylsilyl)amino group and a bis(tert-butyldimethylsilyl)amino group.

Examples of the group in which $R^{85}$ and $R^{86}$ are one group, and are a group which bonds to a nitrogen atom with a double bond in the formula (8-A), of acyclic amino groups, include an ethylideneamino group, a 1-methylpropylideneamino group, a 1,3-dimethylbutylideneamino group, a 1-methylethylideneamino group, and a 4-N,N-dimethylaminobenzylideneamino group.

Examples of the group in which $R^{85}$ is bonded to $R^{86}$ to form a hydrocarbylene group in the formula (8-A), of cyclic amino groups, include a 1-aziridinyl group, a 1-azetidinyl group, a 1-pyrrolidinyl group, a 1-piperidinyl group, a 1-hexamethyleneimino group, and a 1-pyrrolyl group.

Examples of the group in which $R^{85}$ is bonded to $R^{86}$ to form a hydrocarbylene group having, as a hetero atom, a nitrogen atom, in the formula (8-A), of cyclic amino groups, include a 1-imidazolyl group, a 4,5-dihydro-1-imidazolyl group, a 1-imidazolydinyl group, and a 1-piperazinyl group.

Examples of the group in which $R^{85}$ is bonded to $R^{86}$ to form a hydrocarbylene group having, as a hetero atom, an oxygen atom, in the formula (8-A), of cyclic amino groups, include a morpholino group.

The group represented by the formula (8-A) is preferably a group in which $R^{85}$ and $R^{86}$ are a hydrocarbyl group, a group in which $R^{85}$ and $R^{86}$ are a trihydrocarbylsilyl group, or a group in which $R^{85}$ is bonded to $R^{86}$ to form a hydrocarbylene group. More preferably, it is a group in which $R^{85}$ and $R^{86}$ are a linear alkyl group, a group in which $R^{85}$ and $R^{86}$ are a trialkylsilyl group, or a group in which $R^{85}$ and $R^{86}$ are bonded to form a polymethylene group.

As the group represented by the formula (8-A), a still more preferable group in which $R^{85}$ and $R^{86}$ are a chain alkyl group is a dimethylamino group, a diethylamino group, a di(n- propyl)amino group or a di(n-butyl)amino group, a still more preferable group in which $R^{85}$ and $R^{86}$ are trialkylsilyl is a bis(trimethylsilyl)amino group or a bis(tert-butyl-dimethylsilyl)amino group, and a still more preferable group in which the group in which $R^{85}$ is bonded to $R^{86}$ is a polymethylene group is a 1-pyrrolidinyl group, a 1-piperidinyl group, or a 1-hexamethyleneimino group.

Examples of the nitrogen-containing heterocyclic group in $A^8$ include nitrogen-containing alicyclic heterocyclic groups and nitrogen-containing aromatic heterocyclic groups. Herein, the nitrogen-containing alicyclic heterocyclic group represents a group in which one hydrogen atom is removed from hydrogen atoms bonded to carbon atoms of the heterocycle of a compound having a nitrogen-containing alicyclic heterocycle, and the nitrogen-containing alicyclic heterocycle represents an alicyclic heterocycle having a nitrogen atom as a hetero atom contained in atoms constituting the ring. Also, the nitrogen-containing aromatic heterocyclic group represents a group in which one hydrogen atom is removed from hydrogen atoms bonded to carbon atoms of the heterocycle of a compound having a nitrogen-containing aromatic heterocycle, and the nitrogen-containing aromatic heterocycle represents an aromatic heterocycle having a nitrogen atom as a hetero atom contained in atoms constituting the ring.

Examples of the nitrogen-containing alicyclic heterocyclic group in $A^8$ include groups only having a nitrogen atom as a hetero atom contained in atoms constituting the ring, groups having a nitrogen atom and an oxygen atom as a hetero atom contained in atoms constituting the ring, and groups having a nitrogen atom and a sulfur atom as a hetero atom contained in atoms constituting the ring.

Examples of the nitrogen-containing alicyclic heterocyclic groups only having a nitrogen atom as a hetero atom contained in atoms constituting the ring include groups having an aziridine ring, groups having an azetidine ring, groups having a pyrrolidine ring, groups having a piperidine ring, groups having a hexamethyleneimine ring, groups having an imidazolidine ring, groups having a piperazine ring, and groups having a pyrazolidine ring.

Examples of the group having an aziridine ring include a 1-alkyl-2-aziridinyl group. Examples of the group having an azetidine ring include a 1-alkyl-2-azetidinyl group and a 1-alkyl-3-azetidinyl group. Examples of the group having a pyrrolidine ring include a 1-alkyl-2-pyrrolidinyl group and a 1-alkyl-3-pyrrolidinyl group. Examples of the group having a piperidine ring include a 1-alkyl-2-piperidinyl group, a 1-alkyl-3-piperidinyl group, and a 1-alkyl-4-piperidinyl group. Examples of the group having a hexamethyleneimine ring include a 1-alkyl-2-hexamethyleneimino group, a 1-alkyl-3-hexamethyleneimino group, and a 1-alkyl-4-hexamethyleneimino group. Examples of the group having an imidazolidine ring include a 1,3-dialkyl-2-imidazolidyl group and a 1,3-dialkyl-4-imidazolidyl group. Examples of the group having a piperazine ring include a 1,4-dialkyl-2-piperazinyl group. Examples of the group having a pyrazolidine ring include a 1,2-dialkyl-3-pyrazolidyl group and a 1,2-dialkyl-4-pyrazolidyl group.

Examples of the nitrogen-containing alicyclic heterocyclic group having a nitrogen atom and an oxygen atom as a hetero atom contained in atoms constituting the ring include groups having a morpholine ring, and groups having an isoxazolidine ring.

Examples of the group having a morpholine ring include a 4-alkyl-2-morpholino group and a 4-alkyl-3-morpholino group. Examples of the group having an isoxazolidine ring include a 2-alkyl-3-isoxazolidinyl group, a 2-alkyl-4-isoxazolidinyl group, and a 2-alkyl-5-isoxazolidinyl group.

Examples of the nitrogen-containing alicyclic heterocyclic group having a nitrogen atom and a sulfur atom as a hetero atom contained in atoms constituting the ring include groups having a thiomorpholine ring and groups having an isothiazolidine ring.

Examples of the group having a thiomorpholine ring include a 4-alkyl-2-thiomorpholino group and a 4-alkyl-3-thiomorpholino group. Examples of the group having an isoxazolidine ring include a 2-alkyl-3-isothiazolidinyl group, a 2-alkyl-4-isothiazolidinyl group, and a 2-alkyl-5-isothiazolidinyl group.

The nitrogen-containing alicyclic heterocyclic group in $A^8$ is preferably a group only having a nitrogen atom as a hetero atom contained in atoms constituting the ring. In addition, the number of carbon atoms of the nitrogen-containing alicyclic heterocyclic group is preferably 4 to 10.

Examples of the nitrogen-containing aromatic heterocyclic group in $A^8$ include groups only having a nitrogen atom as a hetero atom contained in atoms constituting the ring, groups having a nitrogen atom and an oxygen atom as a hetero atom contained in atoms constituting the ring, and groups having a nitrogen atom and a sulfur atom as a hetero atom contained in atoms constituting the ring.

Examples of the nitrogen-containing aromatic heterocyclic groups only having a nitrogen atom as a hetero atom contained in atoms constituting the ring include groups having a pyrrole ring, groups having an imidazole ring, groups having a pyrazole ring, groups having a pyridine ring, groups having a pyridazine ring, groups having a pyrimidine ring, groups having a pyrazine ring, groups having a quinoline ring, groups having an isoquinoline ring, groups having a cinnoline ring, groups having a quinazoline ring, and groups having a phthalazine group.

Examples of the group having a pyrrole ring include a 2-pyrrolyl group, a 3-pyrrolyl group, a 1-alkyl-2-pyrrolyl group, and a 1-alkyl-3-pyrrolyl group.

Examples of the groups having an imidazole ring include a 2-imidazolyl group, a 4-imidazolyl group, a 5-imidazolyl group, a 1-alkyl-2-imidazolyl group, a 1-alkyl-4-imidazolyl group, and a 1-alkyl-5-imidazolyl group.

Examples of the groups having a pyrazole ring include a 3-pyrazolyl group, a 4-pyrazolyl group, a 5-pyrazolyl group, a 1-alkyl-3-pyrazolyl group, a 1-alkyl-4-pyrazolyl group, and a 1-alkyl-5-pyrazolyl group.

Examples of the group having a pyridine ring include a 2-pyridyl group, a 3-pyridyl group, and a 4-pyridyl group.

Examples of the group having a pyridazine ring include a 3-pyridazyl group and a 4-pyridazyl group.

Examples of the group having a pyrimidine ring include a 2-pyrimidyl group, a 4-pyrimidyl group, and a 5-pyrimidyl group.

Examples of the group having a pyrazine ring include a 2-pyrazyl group.

Examples of the group having a quinoline ring include a 2-quinolyl group, a 3-quinolyl group, a 4-quinolyl group, a 5-quinolyl group, a 6-quinolyl group, a 7-quinolyl group, and a 8-quinolyl group.

Examples of the group having an isoquinoline ring include a 1-isoquinolyl group, a 3-isoquinolyl group, a 4-isoquinolyl group, a 5-isoquinolyl group, a 6-isoquinolyl group, a 7-isoquinolyl group, and a 8-isoquinolyl group.

Examples of the group having a cinnoline ring include a 3-cinnolinyl group, a 4-cinnolinyl group, a 5-cinnolinyl group, 6-cinnolinyl group, a 7-cinnolinyl group, and a 8-cinnolinyl group.

Examples of the group having a quinazoline ring include a 2-quinazolinyl group, a 4-quinazolinyl group, a 5-quinazolinyl group, 6-quinazolinyl group, a 7-quinazolinyl group, and a 8-quinazolinyl group.

Examples of the group having a phthalazine ring include a 1-phthalazinyl group, a 5-phthalazinyl group, and a 6-phthalazinyl group.

The nitrogen-containing aromatic heterocyclic group only having a nitrogen atom as a hetero atom contained in atoms constituting the ring is preferably a group having an imidazole ring, a group having a pyridine ring, or a group having a quinoline ring.

Examples of the nitrogen-containing aromatic heterocyclic group having a nitrogen atom and an oxygen atom as a hetero atom contained in atoms constituting the ring include groups having an oxazole ring and groups having an isoxazole ring.

Examples of the group having an oxazole ring include a 2-oxazolyl group, a 4-oxazolyl group, and a 5-oxazolyl group.

Examples of the group having an isoxazole ring include a 3-isooxazolyl group, a 4-isooxazolyl group, and a 5-isooxazolyl group.

The nitrogen-containing aromatic heterocyclic group having a nitrogen atom and an oxygen atom as a hetero atom contained in atoms constituting the ring is preferably a group having an oxazole ring.

Examples of the nitrogen-containing aromatic heterocyclic group having a nitrogen atom and a sulfur atom as a hetero atom contained in atoms constituting the ring include groups having a thiazole ring, and groups having an isothiazole ring.

Examples of the group having a thiazole ring include a 2-thiazolyl group, a 4-thiazolyl group, and a 5-thiazolyl group.

Examples of the group having an isothiazole ring include a 3-isothiazolyl group, a 4-isothiazolyl group, and a 5-isothiazolyl group.

The nitrogen-containing aromatic heterocyclic group having a nitrogen atom and a sulfur atom as a hetero atom contained in atoms constituting the ring is preferably a group having a thiazole ring.

The nitrogen-containing aromatic heterocyclic group in $A^8$ is preferably a nitrogen-containing aromatic heterocyclic group only having a nitrogen atom as a hetero atom contained in atoms constituting the ring, more preferably a group having an imidazole ring, a group having a pyridine ring or a group having a quinoline ring, and still more preferably a group having a pyridine ring.

The compound represented by the formula (8) is preferably a compound represented by the following formula (8-1), in which $E^8$ is a group represented by the formula (8-E1).

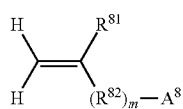

(8-1)

wherein $R^{81}$ represents a hydrogen atom or a hydrocarbyl group, m represents an integer of 0 or 1, $R^{82}$ represents a hydrocarbylene group, and $A^8$ represents a substituted amino group or a nitrogen-containing heterocyclic group.

Examples of a compound in which $R^{81}$ is a hydrogen atom, m is 0, and $A^8$ is a substituted amino group, of the compounds represented by the formula (8-1), include the following compounds.

1-vinylpyrrolidine,
1-vinylpiperidine,
1-vinylhexamethyleneimine,
1-vinylpiperazine,
1-vinylpyrrole,
1-vinyl imidazole.

Examples of a compound in which $R^{81}$ is a hydrogen atom, m is 1, $R^{82}$ is a phenylene group, and $A^8$ is a substituted amino group, of the compounds represented by the formula (8-1), include the following compounds.

4-dimethylaminostyrene,
4-diethylaminostyrene,
4-dipropylaminostyrene,
4-dibutylaminostyrene,
4-diallylaminostyrene,
4-bis(trimethylsilyl)aminostyrene,
4-bis(tert-butyl-dimethylsilyl)aminostyrene,
4-(1-aziridinyl)styrene,
4-(1-pyrrolidinyl)styrene,
4-(1-piperidinyl)styrene,
4-(1-hexamethyleneimino)styrene,
3-dimethylaminostyrene,
3-diethylaminostyrene,
3-dipropylaminostyrene,
3-dibutylaminostyrene,
3-diallylaminostyrene,
3-bis(trimethylsilyl)aminostyrene,
3-bis(tert-butyl-dimethylsilyl)aminostyrene,
3-(1-aziridinyl)styrene,
3-(1-pyrrolidinyl)styrene,
3-(1-piperidinyl)styrene,
3-(1-hexamethyleneimino)styrene.

Examples of a compound in which $R^{81}$ is a hydrogen atom, m is 1, $R^{82}$ is a group represented by the formula (8-Ra), and $A^8$ is a substituted amino group, of the compounds represented by the formula (8-1), include the following compounds.

Compounds in which p in the formula (8-Ra) is 1:
4-(dimethylaminomethyl)styrene,
4-(diethylaminomethyl)styrene,
4-(dipropylaminomethyl)styrene,
4-(dibutylaminomethyl)styrene,
4-(diallylaminomethyl)styrene,
4-[bis(trimethylsilyl)aminomethyl]styrene,
4-[bis(tert-butyl-dimethylsilyl)aminomethyl]styrene,
4-(1-aziridinyl)methylstyrene,
4-(1-pyrrolidinyl)methylstyrene,
4-(1-piperidinyl)methylstyrene,
4-(1-hexamethyleneimino)methylstyrene.

Compounds in which p in the formula (8-Ra) is 2:
4-[2-(dimethylamino)ethyl]styrene,
4-[2-(diethylamino)ethyl]styrene,
4-[2-(dipropylamino)ethyl]styrene,
4-[2-(dibutylamino)ethyl]styrene,
4-[2-(diallylamino)ethyl]styrene,
4-{2-[bis(trimethylsilyl)amino]ethyl}styrene,
4-{2-[bis(tert-butyl-dimethylsilyl)amino]ethyl}styrene,
4-[2-(1-aziridinyl)ethyl]styrene,
4-[2-(1-pyrrolidinyl)ethyl]styrene,
4-[2-(1-piperidinyl)ethyl]styrene,
4-[2-(1-hexamethyleneimino)ethyl]styrene.

Examples of a compound in which $R^{81}$ is a hydrogen atom, m is 1, $R^{82}$ is a group represented by the formula (8-Rb), and $A^8$ is a substituted amino group, of the compounds represented by the formula (8-1), include the following compounds.

Compounds in which q in the formula (8-Rb) is 1:
3-(dimethylaminomethyl)styrene,
3-(diethylaminomethyl)styrene,
3-(dipropylaminomethyl)styrene,
3-(dibutylaminomethyl)styrene,
3-(diallylaminomethyl)styrene,
3-[bis(trimethylsilyl)aminomethyl]styrene,
3-[bis(tert-butyl-dimethylsilyl)aminomethyl]styrene,
3-(1-aziridinyl)methylstyrene,
3-(1-pyrrolidinyl)methylstyrene,
3-(1-piperidinyl)methylstyrene,
3-(1-hexamethyleneimino)methylstyrene.

Compounds in which q in the formula (8-Rb) is 2:
3-[2-(dimethylamino)ethyl]styrene,
3-[2-(diethylamino)ethyl]styrene,
3-[2-(dipropylamino)ethyl]styrene,
3-[2-(dibutylamino)ethyl]styrene,
3-[2-(diallylamino)ethyl]styrene,
3-{2-[bis(trimethylsilyl)amino]ethyl}styrene,
3-{2-[bis(tert-butyl-dimethylsilyl)amino]ethyl}styrene,
3-[2-(1-aziridinyl)ethyl]styrene,
3-[2-(1-pyrrolidinyl)ethyl]styrene,
3-[2-(1-piperidinyl)ethyl]styrene,
3-[2-(1-hexamethyleneimino)ethyl]styrene.

Examples of a compound in which $R^{81}$ is a methyl group, m is 0, and $A^8$ is a substituted amino group, of the compounds represented by the formula (8-1), include the following compounds.
1-isopropenylpyrrolidine,
1-isopropenylpiperidine,
1-isopropenylhexamethyleneimine,
1-isopropenylpiperazine,
1-isopropenylpyrrole,
1-isopropenylimidazole.

Examples of a compound in which $R^{81}$ is a methyl group, m is 1, $R^{82}$ is a phenylene group, and $A^8$ is a substituted amino group, of the compounds represented by the formula (8-1), include the following compounds.
4-dimethylamino-1-isopropenylbenzene,
4-diethylamino-1-isopropenylbenzene,
4-(dipropylamino)-1-isopropenylbenzene,
4-(dibutylamino)-1-isopropenylbenzene,
4-diallylamino-1-isopropenylbenzene,
4-bis(trimethylsilyl)amino-1-isopropenylbenzene,
4-bis(tert-butyl-dimethylsilyl)amino-1-isopropenylbenzene,
4-(1-aziridinyl)-1-isopropenylbenzene,
4-(1-pyrrolidinyl)-1-isopropenylbenzene,
4-(1-piperidinyl)-1-isopropenylbenzene,
4-(1-hexamethyleneimino)-1-isopropenylbenzene,
3-dimethylamino-1-isopropenylbenzene,
3-diethylamino-1-isopropenylbenzene,
3-dipropylamino-1-isopropenylbenzene,
3-dibutylamino-1-isopropenylbenzene,
3-diallylamino-1-isopropenylbenzene,
3-bis(trimethylsilyl)amino-1-isopropenylbenzene,
3-bis(tert-butyl-dimethylsilyl)amino-1-isopropenylbenzene,
3-(1-aziridinyl)-1-isopropenylbenzene,
3-(1-pyrrolidinyl)-1-isopropenylbenzene,
3-(1-piperidinyl)-1-isopropenylbenzene,
3-(1-hexamethyleneimino)-1-isopropenylbenzene.

Examples of a compound in which $R^{81}$ is a methyl group, m is 1, $R^{82}$ is a group represented by the formula (8-Ra), and $A^8$ is a substituted amino group, of the compounds represented by the formula (8-1), include the following compounds.

Compounds in which p in the formula (8-Ra) is 1:
4-dimethylaminomethyl-1-isopropenylbenzene,
4-diethylaminomethyl-1-isopropenylbenzene,
4-di-n-propylaminomethyl-1-isopropenylbenzene,
4-di-n-butylaminomethyl-1-isopropenylbenzene,
4-diallylaminomethyl-1-isopropenylbenzene,
4-bis(trimethylsilyl)aminomethyl-1-isopropenylbenzene,
4-bis(tert-butyl-dimethylsilyl)aminomethyl-1-isopropenylbenzene,
4-(1-aziridinyl)methyl-1-isopropenylbenzene,
4-(1-pyrrolidinyl)methyl-1-isopropenylbenzene,
4-(1-piperidinyl)methyl-1-isopropenylbenzene,
4-(1-hexamethyleneimino)methyl-1-isopropenylbenzene.

Compounds in which p in the formula (8-Ra) is 2:
4-[2-(dimethylamino)ethyl]-1-isopropenylbenzene,
4-[2-(diethylamino)ethyl]-1-isopropenylbenzene,
4-[2-(dipropylamino)ethyl]-1-isopropenylbenzene,
4-[2-(dibutylamino)ethyl]-1-isopropenylbenzene,
4-[2-(diallylamino)ethyl]-1-isopropenylbenzene,
4-{2-[bis(trimethylsilyl)amino]ethyl}-1-isopropenylbenzene,
4-{2-[bis(tert-butyl-dimethylsilyl)amino]ethyl}-1-isopropenylbenzene,
4-[2-(1-aziridinyl)ethyl]-1-isopropenylbenzene,
4-[2-(1-pyrrolidinyl)ethyl]-1-isopropenylbenzene,
4-[2-(1-piperidinyl)ethyl]-1-isopropenylbenzene,
4-[2-(1-hexamethyleneimino)ethyl]-1-isopropenylbenzene.

Examples of a compound in which $R^{81}$ is a methyl group, m is 1, $R^{82}$ is a group represented by the formula (8-Rb), and $A^8$ is a substituted amino group, of the compounds represented by the formula (8-1), include the following compounds.

Compounds in which q in the formula (8-Rb) is 1:
3-dimethylaminomethyl-1-isopropenylbenzene,
3-diethylaminomethyl-1-isopropenylbenzene,
3-dipropylaminomethyl-1-isopropenylbenzene,
3-dibutylaminomethyl-1-isopropenylbenzene,
3-diallylaminomethyl-1-isopropenylbenzene,
3-bis(trimethylsilyl)aminomethyl-1-isopropenylbenzene,
3-bis(tert-butyl-dimethylsilyl)aminomethyl-1-isopropenylbenzene,
3-(1-aziridinyl)methyl-1-isopropenylbenzene,
3-(1-pyrrolidinyl)methyl-1-isopropenylbenzene,
3-(1-piperidinyl)methyl-1-isopropenylbenzene,
3-(1-hexamethyleneimino)methyl-1-isopropenylbenzene.

Compounds in which j in the formula (8-Rb) is q:
3-[2-(dimethylamino)ethyl]-1-isopropenylbenzene,
3-[2-(diethylamino)ethyl]-1-isopropenylbenzene,
3-[2-(dipropylamino)ethyl]-1-isopropenylbenzene,
3-[2-(di-n-butylamino)ethyl]-1-isopropenylbenzene,
3-[2-(diallylamino)ethyl]-1-isopropenylbenzene,
3-{2-[bis(trimethylsilyl)amino]ethyl}-1-isopropenylbenzene,
3-{2-[bis(tert-butyl-dimethylsilyl)amino]ethyl}-1-isopropenylbenzene,
3-[2-(1-aziridinyl)ethyl]-1-isopropenylbenzene,
3-[2-(1-pyrrolidinyl)ethyl]-1-isopropenylbenzene,
3-[2-(1-piperidinyl)ethyl]-1-isopropenylbenzene,
3-[2-(1-hexamethyleneimino)ethyl]-1-isopropenylbenzene.

Examples of a compound in which $R^{81}$ is a vinyl group, m is 0, and $A^8$ is a substituted amino group, of the compounds represented by the formula (8-1), include the following compounds.
2-dimethylamino-1,3-butadiene,
2-diethylamino-1,3-butadiene,
2-(dipropylamino)-1,3-butadiene,
2-(dibutylamino)-1,3-butadiene, 2-diallylamino-1,3-butadiene,
2-[bis(trimethylsilyl)amino]-1,3-butadiene,
2-[bis(tert-butyl-dimethylsilyl)amino]-1,3-butadiene,
2-(1-aziridinyl)-1,3-butadiene,
2-(1-pyrrolidinyl)-1,3-butadiene,
2-(1-piperidinyl)-1,3-butadiene,
2-(1-hexamethyleneimino)-1,3-butadiene,
2-(1-pyrrolyl)-1,3-butadiene,
2-(1-imidazolyl)-1,3-butadiene.

Examples of a compound in which $R^{81}$ is a vinyl group, m is 1, $R^{82}$ is an alkylene group, and $A^8$ is a substituted amino group, of the compounds represented by the formula (8-1), include the following compounds.

Compounds in which $R^{82}$ is a methylene group:
2-dimethylaminomethyl-1,3-butadiene,
2-diethylaminomethyl-1,3-butadiene,
2-(di-n-propylaminomethyl)-1,3-butadiene,
2-(di-n-butylaminomethyl)-1,3-butadiene,
2-diallylaminomethyl-1,3-butadiene,
2-[bis(trimethylsilyl)aminomethyl]-1,3-butadiene,
2-[bis(tert-butyl-dimethylsilyl)aminomethyl]-1,3-butadiene,
2-[(1-aziridinyl)methyl]-1,3-butadiene,
2-[(1-pyrrolidinyl)methyl]-1,3-butadiene,
2-[(1-piperidinyl)methyl]-1,3-butadiene,
2-[(1-hexamethyleneimino)methyl]-1,3-butadiene,
1-(2-methylene-3-butenyl)pyrrole,
1-(2-methylene-3-butenyl)imidazole.

Compounds in which $R^{82}$ is an ethylene group:
5-dimethylamino-3-methylene-1-pentene,
5-diethylamino-3-methylene-1-pentene,
5-(di-n-propylamino)-3-methylene-1-pentene,
5-(di-n-butylamino)-3-methylene-1-pentene,
5-diallylamino-3-methylene-1-pentene,
5-bis(trimethylsilyl)amino-3-methylene-1-pentene,
5-bis(tert-butyl-dimethylsilyl)amino-3-methylene-1-pentene,
5-(1-aziridinyl)-3-methylene-1-pentene,
5-(1-pyrrolidinyl)-3-methylene-1-pentene,
5-(1-piperidinyl)-3-methylene-1-pentene,
5-(1-hexamethyleneimino)-3-methylene-1-pentene,
1-(3-methylene-4-pentenyl)pyrrole,
1-(3-methylene-4-pentenyl)imidazole.

Examples of a compound in which $R^{81}$ is a phenyl group, m is 1, $R^{82}$ is a phenylene group, and $A^8$ is a substituted amino group, of the compounds represented by the formula (8-1), include the following compounds.
1-(4-dimethylaminophenyl)-1-phenylethylene,
1-(4-diethylaminophenyl)-1-phenylethylene,
1-(4-dipropylaminophenyl)-1-phenylethylene,
1-(4-diisopropylaminophenyl)-1-phenylethylene,
1-(4-dibutylaminophenyl)-1-phenylethylene,
1-(4-diisobutylaminophenyl)-1-phenylethylene,
1-(4-di-tert-butylaminophenyl)-1-phenylethylene,
1-(4-diphenylaminophenyl)-1-phenylethylene,
1-[4-(1-aziridinyl)phenyl]-1-phenylethylene,
1-[4-(1-pyrrolidinyl)phenyl]-1-phenylethylene,
1-[4-(1-piperidinyl)phenyl]-1-phenylethylene,
1-[4-(1-hexamethyleneimino)phenyl]-1-phenylethylene,
1-(4-morpholinophenyl)-1-phenylethylene,
1-{4-[bis(trimethylsilyl)amino]phenyl}-1-phenylethylene,
1-{4-[bis(tert-butyl-dimethylsilyl)amino]phenyl}-1-phenylethylene,
1-{4-[bis(triisopropylsilyl)amino]phenyl}-1-phenylethylene,
1-(3-dimethylaminophenyl)-1-phenylethylene,
1-(3-diethylaminophenyl)-1-phenylethylene,
1-(3-dipropylaminophenyl)-1-phenylethylene,
1-(3-diisopropylaminophenyl)-1-phenylethylene,
1-(3-dibutylaminophenyl)-1-phenylethylene,
1-(3-diisobutylaminophenyl)-1-phenylethylene,
1-(3-di-tert-butylaminophenyl)-1-phenylethylene,
1-(3-diphenylaminophenyl)-1-phenylethylene,
1-[3-(1-aziridinyl)phenyl]-1-phenylethylene,
1-[3-(1-pyrrolidinyl)phenyl]-1-phenylethylene,
1-[3-(1-piperidinyl)phenyl]-1-phenylethylene,
1-[3-(1-hexamethyleneimino)phenyl]-1-phenylethylene,
1-(3-morpholinophenyl)-1-phenylethylene,
1-{3-[bis(trimethylsilyl)amino]phenyl}-1-phenylethylene,
1-{3-[bis(tert-butyl-dimethylsilyl)amino]phenyl}-1-phenylethylene,
1-{3-[bis(triisopropylsilyl)amino]phenyl}-1-phenylethylene.

Examples of a compound in which $R^{81}$ is a phenyl group, m is 1, $R^{82}$ is a group represented by the formula (8-Ra), and $A^8$ is a substituted amino group, of the compounds represented by the formula (8-1), include the following compounds.

Compounds in which p in the formula (8-Ra) is 1:
1-[4-(dimethylaminomethyl)phenyl]-1-phenylethylene,
1-[4-(diethylaminomethyl)phenyl]-1-phenylethylene,
1-[4-(dipropylaminomethyl)phenyl]-1-phenylethylene,
1-[4-(diisopropylaminomethyl)phenyl]-1-phenylethylene,
1-[4-(dibutylaminomethyl)phenyl]-1-phenylethylene,
1-[4-(diisobutylaminomethyl)phenyl]-1-phenylethylene,
1-[4-(di-tert-butylaminomethyl)phenyl]-1-phenylethylene,
1-[4-(diphenylaminomethyl)phenyl]-1-phenylethylene,
1-[4-(1-aziridinylmethyl)phenyl]-1-phenylethylene,
1-[4-(1-pyrrolidinylmethyl)phenyl]-1-phenylethylene,
1-[4-(1-piperidinylmethyl)phenyl]-1-phenylethylene,
1-[4-(1-hexamethyleneiminomethyl)phenyl]-1-phenylethylene,
1-(4-morpholinomethylphenyl)-1-phenylethylene,
1-{4-[bis(trimethylsilyl)aminomethyl]phenyl}-1-phenylethylene,
1-{4-[bis(tert-butyl-dimethylsilyl)aminomethyl]phenyl}-1-phenylethylene,
1-{4-[bis(triisopropylsilyl)aminomethyl]phenyl}-1-phenylethylene.

Examples of a compound in which $R^{81}$ is a phenyl group, m is 1, $R^{82}$ is a group represented by the formula (8-Rb), and $A^8$ is a substituted amino group, of the compounds represented by the formula (8-1), include the following compounds.

Compounds in which q in the formula (8-Rb) is 1:
1-[3-(dimethylaminomethyl)phenyl]-1-phenylethylene,
1-[3-(diethylaminomethyl)phenyl]-1-phenylethylene,
1-[3-(dipropylaminomethyl)phenyl]-1-phenylethylene,
1-[3-(diisopropylaminomethyl)phenyl]-1-phenylethylene,
1-[3-(dibutylaminomethyl)phenyl]-1-phenylethylene,
1-[3-(diisobutylaminomethyl)phenyl]-1-phenylethylene,
1-[3-(di-tert-butylaminomethyl)phenyl]-1-phenylethylene,
1-[3-(diphenylaminomethyl)phenyl]-1-phenylethylene,
1-[3-(1-aziridinylmethyl)phenyl]-1-phenylethylene,
1-[3-(1-pyrrolidinylmethyl)phenyl]-1-phenylethylene,
1-[3-(1-piperidinylmethyl)phenyl]-1-phenylethylene,
1-[3-(1-hexamethyleneiminomethyl)phenyl]-1-phenylethylene,
1-(3-morpholinomethylphenyl)-1-phenylethylene,
1-{3-[bis(trimethylsilyl)aminomethyl]phenyl}-1-phenylethylene,
1-{3-[bis(tert-butyl-dimethylsilyl)aminomethyl]phenyl}-1-phenylethylene,
1-{3-[bis(triisopropylsilyl)aminomethyl]phenyl}-1-phenylethylene.

Examples of a compound in which $R^{81}$ is a hydrogen atom, m is 0, and $A^8$ is a nitrogen-containing alicyclic heterocyclic group, of the compounds represented by the formula (8-1), include the following compounds.
1-methyl-3-vinylpyrrolidine,
1-methyl-4-vinylpiperidine,
1-methyl-3-vinylhexamethyleneimine,
1-methyl-4-vinylhexamethyleneimine.

Examples of a compound in which $R^{81}$ is a hydrogen atom, m is 1, $R^{82}$ is a phenylene group, and $A^8$ is a nitrogen-containing alicyclic heterocyclic group, of the compounds represented by the formula (8-1), include the following compounds.
1-methyl-3-(4-vinylphenyl)pyrrolidine,
1-methyl-4-(4-vinylphenyl)piperidine,
1-methyl-3-(4-vinylphenyl)hexamethyleneimine,
1-methyl-4-(4-vinylphenyl)hexamethyleneimine,
1-methyl-3-(3-vinylphenyl)pyrrolidine,
1-methyl-4-(3-vinylphenyl)piperidine,
1-methyl-3-(3-vinylphenyl)hexamethyleneimine,
1-methyl-4-(3-vinylphenyl)hexamethyleneimine.

Examples of a compound in which $R^{81}$ is a hydrogen atom, m is 1, $R^{82}$ is a group represented by the formula (8-Ra), and $A^8$ is a nitrogen-containing alicyclic heterocyclic group, of the compounds represented by the formula (8-1), include the following compounds.

Compounds in which p in the formula (8-Ra) is 1:
1-methyl-3-(4-vinylphenylmethyl)pyrrolidine,
1-methyl-4-(4-vinylphenylmethyl)piperidine,
1-methyl-3-(4-vinylphenylmethyl)hexamethyleneimine,
1-methyl-4-(4-vinylphenylmethyl)hexamethyleneimine.

Compounds in which p in the formula (8-Ra) is 2:
1-methyl-3-[2-(4-vinylphenyl)ethyl]pyrrolidine,
1-methyl-4-[2-(4-vinylphenyl)ethyl]piperidine,
1-methyl-3-[2-(4-vinylphenyl)ethyl]hexamethyleneimine,
1-methyl-4-[2-(4-vinylphenyl)ethyl]hexamethyleneimine.

Examples of a compound in which $R^{81}$ is a hydrogen atom, m is 1, $R^{82}$ is a group represented by the formula (8-Rb), and $A^8$ is a nitrogen-containing alicyclic heterocyclic group, of the compounds represented by the formula (8-1), include the following compounds.

Compounds in which q in the formula (8-Rb) is 1:
1-methyl-3-(3-vinylphenylmethyl)pyrrolidine,
1-methyl-4-(3-vinylphenylmethyl)piperidine,
1-methyl-3-(3-vinylphenylmethyl)hexamethyleneimine,
1-methyl-4-(3-vinylphenylmethyl)hexamethyleneimine.

Compounds in which q in the formula (8-Rb) is 2:
1-methyl-3-[2-(3-vinylphenyl)ethyl]pyrrolidine,
1-methyl-4-[2-(3-vinylphenyl)ethyl]piperidine,
1-methyl-3-[2-(3-vinylphenyl)ethyl]hexamethyleneimine,
1-methyl-4-[2-(3-vinylphenyl)ethyl]hexamethyleneimine.

Examples of a compound in which $R^{81}$ is a methyl group, m is 0, and $A^8$ is a nitrogen-containing alicyclic heterocyclic group, of the compounds represented by the formula (8-1), include the following compounds.
1-methyl-3-isopropenylpyrrolidine,
1-methyl-4-isopropenylpiperidine,
1-methyl-3-isopropenylhexamethyleneimine,
1-methyl-4-isopropenylhexamethyleneimine.

Examples of a compound in which $R^{81}$ is a methyl group, m is 1, $R^{82}$ is a phenylene group, and $A^8$ is a nitrogen-containing alicyclic heterocyclic group, of the compounds represented by the formula (8-1), include the following compounds.
1-methyl-3-(4-isopropenylphenyl)pyrrolidine,
1-methyl-4-(4-isopropenylphenyl)piperidine,
1-methyl-3-(4-isopropenylphenyl)hexamethyleneimine,
1-methyl-4-(4-isopropenylphenyl)hexamethyleneimine.

Examples of a compound in which $R^{81}$ is a methyl group, m is 1, $R^{82}$ is a group represented by the formula (8-Ra), and $A^8$ is a nitrogen-containing alicyclic heterocyclic group, of the compounds represented by the formula (8-1), include the following compounds.

Compounds in which p in the formula (8-Ra) is 1:
1-methyl-3-(4-isopropenylphenylmethyl)pyrrolidine,
1-methyl-4-(4-isopropenylphenylmethyl)piperidine,
1-methyl-3-(4-isopropenylphenylmethyl)hexamethyleneimine,
1-methyl-4-(4-isopropenylphenylmethyl)hexamethyleneimine.

Compounds in which p in the formula (8-Ra) is 2:
1-methyl-3-[2-(4-isopropenylphenyl)ethyl]pyrrolidine,
1-methyl-4-[2-(4-isopropenylphenyl)ethyl]piperidine,
1-methyl-3-[2-(4-isopropenylphenyl)ethyl]hexamethyleneimine,
1-methyl-4-[2-(4-isopropenylphenyl)ethyl]hexamethyleneimine.

Examples of a compound in which $R^{81}$ is a vinyl group, m is 0, and $A^8$ is a nitrogen-containing alicyclic heterocyclic group, of the compounds represented by the formula (8-1), include the following compounds.
1-methyl-3-(1-methylene-2-propenyl)pyrrolidine,
1-methyl-4-(1-methylene-2-propenyl)piperidine,
1-methyl-3-(1-methylene-2-propenyl)hexamethyleneimine,
1-methyl-4-(1-methylene-2-propenyl)hexamethyleneimine.

Examples of a compound in which $R^{81}$ is a vinyl group, m is 1, $R^{82}$ is an alkylene group, and $A^8$ is a nitrogen-containing alicyclic heterocyclic group, of the compounds represented by the formula (8-1), include the following compounds.

Compounds in which $R^{82}$ is a methylene group:
1-methyl-3-(2-methylene-3-butenyl)pyrrolidine,
1-methyl-4-(2-methylene-3-butenyl)piperidine,
1-methyl-3-(2-methylene-3-butenyl)hexamethyleneimine,
1-methyl-4-(2-methylene-3-butenyl)hexamethyleneimine.

Compounds in which $R^{82}$ is an ethylene group:
1-methyl-3-(3-methylene-4-pentenyl)pyrrolidine,
1-methyl-4-(3-methylene-4-pentenyl)piperidine,
1-methyl-3-(3-methylene-4-pentenyl)hexamethyleneimine,
1-methyl-4-(3-methylene-4-pentenyl)hexamethyleneimine.

Examples of a compound in which $R^{81}$ is a phenyl group, m is 1, $R^{82}$ is a phenylene group, and $A^8$ is a nitrogen-containing alicyclic heterocyclic group, of the compounds represented by the formula (8-1), include the following compounds.
1-[4-(1-methyl-3-pyrrolidinyl)phenyl]-1-phenylethylene,
1-[4-(1-methyl-3-piperidinyl)phenyl]-1-phenylethylene,
1-[4-(1-methyl-4-piperidinyl)phenyl]-1-phenylethylene,
1-[4-(1-methyl-3-hexamethyleneimino)phenyl]-1-phenylethylene,
1-[4-(1-methyl-4-hexamethyleneimino)phenyl]-1-phenylethylene,
1-[3-(1-methyl-3-pyrrolidinyl)phenyl]-1-phenylethylene,
1-[3-(1-methyl-3-piperidinyl)phenyl]-1-phenylethylene,
1-[3-(1-methyl-4-piperidinyl)phenyl]-1-phenylethylene,
1-[3-(1-methyl-3-hexamethyleneimino)phenyl]-1-phenylethylene,
1-[3-(1-methyl-4-hexamethyleneimino)phenyl]-1-phenylethylene.

Examples of a compound in which $R^{81}$ is a phenyl group, m is 1, $R^{82}$ is a group represented by the formula (8-Ra), and $A^8$ is a nitrogen-containing alicyclic heterocyclic group, of the compounds represented by the formula (8-1), include the following compounds.

Compounds in which p in the formula (8-Ra) is 1:
1-{4-[(1-methyl-3-pyrrolidinyl)methyl]phenyl}-1-phenyl-ethylene,
1-{4-[(1-methyl-3-piperidinyl)methyl]phenyl}-1-phenyl-ethylene,
1-{4-[(1-methyl-4-piperidinyl)methyl]phenyl}-1-phenyl-ethylene,
1-{4-[(1-methyl-3-hexamethyleneimino)methyl]phenyl}-1-phenylethylene.

Examples of a compound in which $R^{81}$ is a phenyl group, m is 1, $R^{82}$ is a group represented by the formula (8-Rb), and $A^8$ is a nitrogen-containing alicyclic heterocyclic group, of the compounds represented by the formula (8-1), include the following compounds.

Compounds in which q in the formula (8-Rb) is 1:
1-{3-[(1-methyl-3-pyrrolidinyl)methyl]phenyl}-1-phenyl-ethylene,
1-{3-[(1-methyl-3-piperidinyl)methyl]phenyl}-1-phenyl-ethylene,
1-{3-[(1-methyl-4-piperidinyl)methyl]phenyl}-1-phenyl-ethylene,
1-{3-[(1-methyl-3-hexamethyleneimino)methyl]phenyl}-1-phenylethylene.

Examples of a compound in which $R^{81}$ is a hydrogen atom, m is 0, and $A^8$ is a nitrogen-containing aromatic heterocyclic group, of the compounds represented by the formula (8-1), include the following compounds.
1-methyl-2-vinylimidazole,
1-methyl-4-vinylimidazole,
1-methyl-5-vinylimidazole,
2-vinylpyridine,
3-vinylpyridine,
4-vinylpyridine,
2-vinylquinoline,
3-vinylquinoline,
4-vinylquinoline.

Examples of a compound in which $R^{81}$ is a methyl group, m is 0, and $A^8$ is a nitrogen-containing aromatic heterocyclic group, of the compounds represented by the formula (8-1), include the following compounds.
1-methyl-2-isopropenylimidazole,
1-methyl-4-isopropenylimidazole,
1-methyl-5-isopropenylimidazole,
2-isopropenylpyridine,
3-isopropenylpyridine,
4-isopropenylpyridine,
2-isopropenylquinoline,
3-isopropenylquinoline,
4-isopropenylquinoline.

Examples of a compound in which $R^{81}$ is a vinyl group, m is 0, and $A^8$ is a nitrogen-containing alicyclic heterocyclic group, of the compounds represented by the formula (8-1), include the following compounds.
1-methyl-2-(1-methylene-2-propenyl) imidazole,
1-methyl-4-(1-methylene-2-propenyl) imidazole,
1-methyl-5-(1-methylene-2-propenyl) imidazole,
2-(1-methylene-2-propenyl)pyridine,
3-(1-methylene-2-propenyl)pyridine,
4-(1-methylene-2-propenyl)pyridine,
2-(1-methylene-2-propenyl)quinoline,
3-(1-methylene-2-propenyl)quinoline,
4-(1-methylene-2-propenyl)quinoline.

Examples of a compound in which $R^{81}$ is a vinyl group, m is 1, $R^{82}$ is an alkylene group, and $A^8$ is a nitrogen-containing aromatic heterocyclic group, of the compounds represented by the formula (8-1), include the following compounds.

Compounds in which $R^{82}$ is a methylene group:
1-methyl-2-(2-methylene-3-butenyl)imidazole,
1-methyl-4-(2-methylene-3-butenyl)imidazole,
1-methyl-5-(2-methylene-3-butenyl)imidazole,
2-(2-methylene-3-butenyl)pyridine,
3-(2-methylene-3-butenyl)pyridine,
4-(2-methylene-3-butenyl)pyridine,
2-(2-methylene-3-butenyl)quinoline,
3-(2-methylene-3-butenyl)quinoline,
4-(2-methylene-3-butenyl)quinoline.

Compounds in which $R^{82}$ is an ethylene group:
1-methyl-2-(3-methylene-4-pentenyl) imidazole,
1-methyl-4-(3-methylene-4-pentenyl) imidazole,
1-methyl-5-(3-methylene-4-pentenyl) imidazole,
2-(3-methylene-4-pentenyl)pyridine,
3-(3-methylene-4-pentenyl)pyridine,
4-(3-methylene-4-pentenyl)pyridine,
2-(3-methylene-4-pentenyl)quinoline,
3-(3-methylene-4-pentenyl)quinoline,
4-(3-methylene-4-pentenyl)quinoline.

The compound represented by the formula (8) is preferably a compound represented by the formula (8-1) in which $R^{81}$ in the formula (8-1) is a hydrogen atom.

The compound represented by the formula (8) is more preferably a compound represented by the formula (8-1) in which $R^{81}$ in the formula (8-1) is a hydrogen atom, m is 1, $R^{82}$ is a phenylene group, and $A^8$ is a substituted amino group represented by the formula (8-A); a compound represented by the formula (8-1) in which $R^{81}$ in the formula (8-1) is a hydrogen atom, m is 1, $R^{82}$ is a group represented by the formula (8-R), and $A^8$ is a substituted amino group represented by the formula (8-A); and a compound represented by the formula (8-1) in which $R^{81}$ in the formula (8-1) is a hydrogen atom, m is 0, and $A^8$ is a nitrogen-containing heterocyclic group.

The compound represented by the formula (8) is still more preferably a compound represented by the formula (8-1) in which $R^{81}$ in the formula (8-1) is a hydrogen atom, m is 1, $R^{82}$ is a para-phenylene group or a meta-phenylene group, and $A^8$ is a polymethylene group in which $R^{85}$ and $R^{86}$ are bonded in the formula (8-A); a compound represented by the formula (8-1) in which $R^{81}$ in the formula (8-1) is a hydrogen atom, m is 1, $R^{82}$ is a group represented by the formula (8-Ra) or (8-Rb), and $A^8$ is a polymethylene group in which $R^{85}$ and $R^{86}$ are bonded in the formula (8-A); and a compound represented by the formula (8-1) in which $R^{81}$ in the formula (8-1) is a hydrogen atom, s is 0, and $A^8$ is a nitrogen-containing aromatic heterocyclic group.

The compound represented by the formula (8) is particularly preferably 4-[2-(1-pyrrolidinyl)ethyl]styrene, 3-[2-(1-pyrrolidinyl)ethyl]styrene, 4-vinylpyridine, or 3-vinylpyridine.

In the method (d) described above, examples of the compound preferred as a vinyl based monomer having a group represented by the formula (2) include compounds represented by the following formula (9).

$$E^9-A^9 \qquad (9)$$

wherein $E^9$ represents a hydrocarbyl group having a polymerizable carbon-carbon double bond, and $A^9$ represents a substituted silyl group.

$E^9$ in the formula (9) represents a hydrocarbyl group having a polymerizable carbon-carbon double bond.

$E^9$ is preferably a group represented by the following formula (9-E).

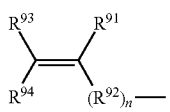

(9-E)

wherein n represents an integer of 0 or 1, $R^{91}$, $R^{93}$ and $R^{94}$ each independently represent a hydrogen atom or a hydrocarbyl group, and $R^{92}$ represents a hydrocarbylene group.

In the formula (9-E), n represents an integer of 0 or 1.

Examples of the hydrocarbyl group in $R^{91}$, $R^{93}$ and $R^{94}$ include alkyl groups, alkenyl groups, and aryl groups. Examples of the alkyl group include a methyl group, an ethyl group, a n-propyl group, an isopropyl group, a n-butyl group, a sec-butyl group, and a tert-butyl group, and preferably a methyl group. Examples of the alkenyl group include a vinyl group, an allyl group, a 1-propenyl group, and an isopropenyl group, and preferably a vinyl group. Examples of the aryl group include a phenyl group, a methyl phenyl group, and an ethyl phenyl group, and preferably a phenyl group.

$R^{91}$ is preferably a hydrogen atom, a methyl group, a vinyl group or a phenyl group, and more preferably a hydrogen atom.

$R^{93}$ and $R^{94}$ are preferably a hydrogen atom.

Examples of the hydrocarbylene group in $R^{92}$ include an alkylene group, an arylene group, and a group in which an arylene group is bonded to an alkylene group.

Examples of the alkylene group include a methylene group, an ethylene group, and a trimethylene group, and preferably a methylene group or an ethylene group. Examples of the arylene group include a phenylene group, a naphthylene group, and a biphenylene group, and preferably a phenylene group.

Examples of the group in which an arylene group is bonded to an alkylene group include groups in which a phenylene group is bonded to an alkylene group, groups in which a naphthylene group is bonded to an alkylene group, and groups in which a biphenylene group is bonded to an alkylene group, and preferably a group in which a phenylene group is bonded to an alkylene group.

In addition, as the group in which an arylene group is bonded to an alkylene group, the carbon atom in the arylene group of the group is preferably bonded to the carbon atom to which $R^{91}$ of the formula (9-E) is bonded.

Examples of the group in which a phenylene group is bonded to an alkylene group (phenylene-alkylene group) include the groups represented by the following formula (9-R).

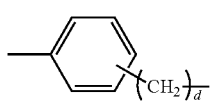

(9-R)

wherein d represents an integer of 1 to 10, and $(CH_2)_d$ is a substituent on a benzene ring.

Examples of the phenylene-alkylene group include a para-phenylene-alkylene group, a meta-phenylene-alkylene group, and an ortho-phenylene-alkylene group, depending on the position of the carbon atom on the benzene ring to which an alkylene group is bonded. In the case of the group represented by the formula (9-R), the para-phenylene-alkylene group is a group represented by the following formula (9-Ra), the meta-phenylene-alkylene group is a group represented by the following formula (9-Rb), and the ortho-phenylene-alkylene group is a group represented by the following formula (9-Rc).

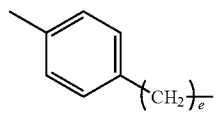

(9-Ra)

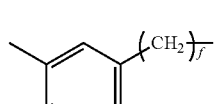

(9-Rb)

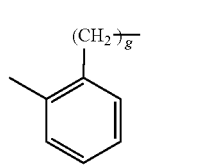

(9-Rc)

wherein e, f and g each represent an integer of 1 to 10.

The group in which an arylene group is bonded to an alkylene group is preferably the group in which a phenylene group is bonded to an alkylene group (phenylene-alkylene group), more preferably the group represented by the formula (9-Ra) or the group represented by the formula (9-Rb), still more preferably a para-phenylene-methylene group (a group represented by the formula (9-Ra) wherein e is 1), a meta-phenylene-methylene group (a group represented by the formula (9-Rb) wherein f is 1), a para-phenylene-ethylene group (a group represented by the formula (9-Ra) wherein e is 2) or a meta-phenylene-ethylene group (a group represented by the formula (9-Rb) wherein f is 2).

Examples of the group represented by the formula (9-E) include the groups shown below.

Examples of the group in which $R^{91}$, $R^{93}$ and $R^{94}$ are a hydrogen atom include a vinyl group, an allyl group, a 3-butenyl group, a 4-vinylphenyl group, a 3-vinylphenyl group, a (4-vinylphenyl)methyl group, a 2-(4-vinylphenyl)ethyl group, a (3-vinylphenyl)methyl group, and a 2-(3-vinylphenyl)ethyl group.

Examples of the group in which $R^{91}$ is a methyl group, and $R^{93}$ and $R^{94}$ are a hydrogen atom include an isopropenyl group, a 2-methyl-2-propenyl group, a 4-isopropenylphenyl group, a 3-isopropenylphenyl group, a (4-isopropenylphenyl)methyl group, a 2-(4-isopropenylphenyl)ethyl group, a (3-isopropenylphenyl)methyl group, and a 2-(3-isopropenylphenyl)ethyl group.

Examples of the group in which $R^{91}$ is a vinyl group, and $R^{93}$ and $R^{94}$ are a hydrogen atom include a 1-methylene-2-propenyl group and a 2-methylene-3-butenyl group.

Examples of the group in which $R^{91}$ is a phenyl group, and $R^{93}$ and $R^{94}$ are a hydrogen atom include a 1-phenylethenyl group, a 2-phenyl-2-propenyl group, a 4-(1-phenylethenyl)phenyl group, a 3-(1-phenylethenyl)phenyl group, and a 2-(1-phenylethenyl)phenyl group.

Examples of the group in which $R^{91}$ is a hydrogen group, $R^{93}$ is a methyl group, and $R^{94}$ is a hydrogen atom include a 1-propenyl group, a 2-butenyl group, a 4-(1-propenyl)phenyl group, a 4-(1-propenyl)phenylmethyl group, a 2-[4-(1-propenyl)phenyl]ethyl group, a 3-(1-propenyl)phenyl group, a 3-(1-propenyl)phenylmethyl group, and a 2-[3-(1-propenyl)phenyl]ethyl group.

The group represented by the formula (9-E) is preferably a group represented by the following formula (9-E1).

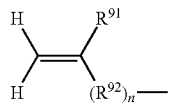

(9-E1)

wherein $R^{91}$ represents a hydrogen atom or a hydrocarbyl group, n represents an integer of 0 or 1, and $R^{92}$ represents a hydrocarbylene group.

Among the preferred groups represented by the formula (9-E1), examples of the group in which $R^{91}$ is a hydrogen atom include a vinyl group, a 4-vinylphenyl group, a 3-vinylphenyl group, a (4-vinylphenyl) methyl group, a 2-(4-vinylphenyl)ethyl group, a (3-vinylphenyl)methyl group, and a 2-(3-vinylphenyl)ethyl group. Examples of the group in which $R^{91}$ is a methyl group include a 4-isopropenylphenyl group, a 3-isopropenylphenyl group, a (4-isopropenylphenyl) methyl group, a 2-(4-isopropenylphenyl)ethyl group, a (3-isopropenylphenyl)methyl group, and a 2-(3-isopropenylphenyl)ethyl group. Examples of the group in which $R^{91}$ is a vinyl group include a 1-methylene-2-propenyl group and a 2-methylene-3-butenyl group. Examples of the group in which $R^{91}$ is a phenyl group include a 4-(1-phenylvinyl)phenyl group.

The group represented by the formula (9-E1) is still more preferably a vinyl group.

$A^9$ in the formula (9) represents a substituted silyl group.

Examples of the substituted silyl group represented by $A^9$ include groups in which a hydrogen atom bonded to a silicon atom of the silyl group is substituted with a substituent such as a hydrocarbyl group optionally having a substituent, a hydrocarbyloxy group, or a substituted amino group. The substituents bonded to a silicon atom may be the same or different.

The substituted silyl group represented by $A^9$ is preferably a group represented by the following formula (9-A).

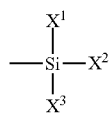

(9-A)

wherein $X^1$, $X^2$ and $X^3$ each represent a substituted amino group, or a hydrocarbyl group optionally having a substituent, and at least one of $X^1$, $X^2$ and $X^3$ is a substituted amino group.

Examples of the hydrocarbyl group optionally having a substituent in $X^1$, $X^2$ and $X^3$ include hydrocarbyl groups and substituted hydrocarbyl groups, and examples of the substituted hydrocarbyl group include groups having at least one atom selected from an atomic group consisting of an oxygen atom, a nitrogen atom, and a silicon atom.

Examples of the hydrocarbyl group in $X^1$, $X^2$ and $X^3$ include alkyl groups, alkenyl groups, alkynyl groups, aryl groups, and aralkyl groups. Examples of the alkyl group include a methyl group, an ethyl group, a n-propyl group, an isopropyl group, a n-butyl group, a sec-butyl group, and a tert-butyl group. Examples of the alkenyl group include a vinyl group, an allyl group, a 1-propenyl group, and an isopropenyl group. Examples of the alkynyl group include an ethynyl group and a 2-propynyl group. Examples of the aryl group include a phenyl group, a tolyl group, and a xylyl group. Examples of the aralkyl group include a benzyl group. The hydrocarbyl group is preferably an alkyl group.

Examples of the substituted hydrocarbyl group having an oxygen atom in $X^1$, $X^2$ and $X^3$ include alkoxy alkyl groups such as a methoxy methyl group, a methoxy ethyl group, an ethoxy methyl group, and an ethoxy ethyl group.

Examples of the substituted hydrocarbyl group having a nitrogen atom in $X^1$, $X^2$ and $X^3$ include dialkylaminoalkyl groups such as a dimethylaminomethyl group, a dimethylaminoethyl group, a diethylaminomethyl group, and a diethylaminoethyl group.

Examples of the substituted hydrocarbyl group having a silicon atom in $X^1$, $X^2$ and $X^3$ include trialkylsilylalkyl groups such as a trimethylsilylmethyl group, a trimethylsilylethyl group, a triethylsilylmethyl group, and a triethylsilylethyl group.

The number of carbon atoms of the hydrocarbyl group optionally having a substituent in $X^1$, $X^2$ and $X^3$ is preferably 1 to 10 and more preferably 1 to 4.

The hydrocarbyl group optionally having a substituent in $X^1$, $X^2$ and $X^3$ is preferably an alkyl group or an alkoxy alkyl group. The alkyl group is preferably an alkyl group having 1 to 4 carbon atoms, and more preferably a methyl group or an ethyl group. The alkoxy alkyl group is preferably an alkoxy alkyl group having 2 to 4 carbon atoms.

The substituted amino group in $X^1$, $X^2$ and $X^3$ is preferably a group represented by the following formula (9-X).

(9-X)

wherein $R^{95}$ and $R^{96}$ each independently represent a hydrocarbyl group or a trihydrocarbylsilyl group, or $R^{95}$ is bonded to $R^{96}$, and a group in which $R^{95}$ is bonded to $R^{96}$ represents a hydrocarbylene group optionally having, as a hetero atom, a nitrogen atom and/or an oxygen atom, or $R^{95}$ and $R^{96}$ are one group, and represent a group which bonds to a nitrogen atom with a double bond.

Examples of the hydrocarbyl group in $R^{95}$ and $R^{96}$ include alkyl groups, alkenyl groups, alkynyl groups, aryl groups, and aralkyl groups. Examples of the alkyl group include a methyl group, an ethyl group, a n-propyl group, an isopropyl group, a n-butyl group, a sec-butyl group, and a tert-butyl group. Examples of the alkenyl group include a vinyl group, an allyl group, a 1-propenyl group, and an isopropenyl group. Examples of the alkynyl group include an ethynyl group and a 2-propynyl group. Examples of the aryl group include a phenyl group, a tolyl group, and a xylyl group. Examples of the aralkyl group include a benzyl group.

The number of carbon atoms of the hydrocarbyl group in $R^{95}$ and $R^{96}$ is preferably 1 to 10, more preferably 1 to 4, and still more preferably 1 to 2.

The hydrocarbyl group in $R^{95}$ and $R^{96}$ is preferably an alkyl group, and more preferably a chain alkyl group.

Examples of the trihydrocarbylsilyl group in $R^{95}$ and $R^{96}$ include trialkylsilyl groups such as a trimethylsilyl group, a triethylsilyl group, a triisopropylsilyl group, and a tert-butyldimethylsilyl group.

The trihydrocarbylsilyl group in $R^{95}$ and $R^{96}$ is preferably a trialkylsilyl group having 3 to 9 carbon atoms, more preferably a trialkylsilyl group in which an alkyl group which is bonded to a silicon atom is an alkyl group having 1 to 3 carbon atoms, and still more preferably a trimethylsilyl group.

In the group in which $R^{95}$ is bonded to $R^{96}$, examples of the hydrocarbylene group optionally having, as a hetero atom, a nitrogen atom and/or an oxygen atom include a hydrocarbylene group, a hydrocarbylene group having a nitrogen atom, and a hydrocarbylene group having an oxygen atom. Examples of the hydrocarbylene group include alkylene groups such as an ethylene group, a trimethylene group, a tetramethylene group, a pentamethylene group, and a hexamethylene group. Examples of the hydrocarbylene group having a nitrogen atom include a group represented by —CH$_2$CH$_2$—NH—CH$_2$—, a group represented by —CH$_2$CH$_2$—N=CH—, a group represented by —CH=CH—N=CH—, and a group represented by —CH$_2$CH$_2$—NH—CH$_2$CH$_2$—. Examples of the hydrocarbylene group having an oxygen atom include a group represented by —CH$_2$CH$_2$—O—CH$_2$CH$_2$—.

The number of carbon atoms of the group in which $R^{95}$ is bonded to $R^{96}$ is preferably 2 to 20, more preferably 2 to 7, and still more preferably 4 to 6.

In the group in which $R^{95}$ is bonded to $R^{96}$, the hydrocarbylene group optionally having, as a hetero atom, a nitrogen atom and/or an oxygen atom is preferably a hydrocarbylene group, more preferably an alkylene group, and still more preferably a polymethylene group.

Examples of the one group in which $R^{95}$ and $R^{96}$ are bonded to a nitrogen atom with a double bond include hydrocarbylidene groups such as an ethylidene group, a propylidene group, a butylidene group, a 1-methylethylidene group, a 1-methylpropylidene group, and a 1,3-dimethylbutylidene group.

The number of carbon atoms of the one group in which $R^{95}$ and $R^{96}$ are bonded to a nitrogen atom with a double bond is preferably 2 to 20 and more preferably 2 to 6.

$R^{95}$ and $R^{96}$ are preferably an alkyl group or a trialkylsilyl group, or $R^{95}$ is bonded to $R^{96}$, and the group in which $R^{95}$ is bonded to $R^{96}$ is an alkylene group, and more preferably an alkyl group.

Examples of the group represented by the formula (9-X) include acyclic amino groups and cyclic amino groups.

Examples of the group in which $R^{95}$ and $R^{96}$ are a hydrocarbyl group in the formula (9-X), of acyclic amino groups, include dialkyl amino groups such as a dimethylamino group, a diethylamino group, a di(n-propyl)amino group, a di(isopropyl)amino group, a di(n-butyl)amino group, a di(sec-butyl) amino group, a di(tert-butyl) amino group, and an ethylmethylamino group. Examples of the group in which $R^{95}$ and $R^{96}$ are a trihydrocarbylsilyl group in the formula (9-X), of acyclic amino groups, include bis(trialkylsilyl)amino groups such as a bis(trimethylsilyl)amino group, and a bis(tert-butyldimethylsilyl)amino group.

Examples of the group in which $R^{95}$ and $R^{96}$ are one group, and are a group which bonds to a nitrogen atom with a double bond in the formula (9-X), of acyclic amino groups, include an ethylideneamino group, a 1-methylpropylideneamino group, a 1,3-dimethylbutylideneamino group, a 1-methylethylideneamino group, and a 4-N,N-dimethylaminobenzylideneamino group.

Examples of the group in which $R^{95}$ is bonded to $R^{96}$ to form a hydrocarbylene group in the formula (9-X), of cyclic amino groups, include a 1-aziridinyl group, a 1-azetidinyl group, a 1-pyrrolidinyl group, a 1-piperidinyl group, a 1-hexamethyleneimino group, and a 1-pyrrolyl group. Examples of the group in which $R^{95}$ is bonded to $R^{96}$ to form a hydrocarbylene group having, as a hetero atom, a nitrogen atom, in the formula (9-X), of cyclic amino groups, include a 1-imidazolyl group, a 4,5-dihydro-1-imidazolyl group, a 1-imidazolydinyl group, and a 1-piperazinyl group. Examples of the group in which $R^{95}$ is bonded to $R^{96}$ to form a hydrocarbylene group having, as a hetero atom, an oxygen atom, in the formula (9-X), of cyclic amino groups, include a morpholino group.

The substituted amino group in $X^1$, $X^2$ and $X^3$ is preferably an acyclic amino group, more preferably a dialkyl amino group, still more preferably a dimethylamino group, a diethylamino group, a di(n-propyl)amino group or a di(n-butyl) amino group, and particularly preferably a dimethylamino group or a diethylamino group.

In the formula (9-A), at least one of $X^1$, $X^2$ and $X^3$ is a substituted amino group, preferably two or more of $X^1$, $X^2$ and $X^3$ are a substituted amino group, and more preferably two of $X^1$, $X^2$ and $X^3$ are a substituted amino group.

The compound represented by the formula (9) is preferably a compound represented by the following formula (9-1), in which $E^9$ is a group represented by the formula (9-E1) and $A^9$ is a group represented by the formula (9-A).

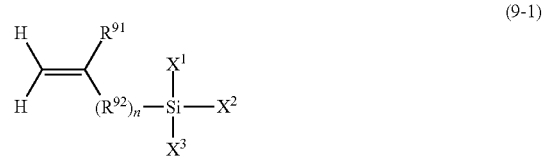

(9-1)

wherein $R^{91}$ represents a hydrogen atom or a hydrocarbyl group, n represents an integer of 0 or 1, and $R^{92}$ represents a hydrocarbylene group, $X^1$, $X^2$ and $X^3$ each represent a substituted amino group, or a hydrocarbyl group optionally having a substituent, and at least one of $X^1$, $X^2$ and $X^3$ is a substituted amino group.

Examples of a compound in which $R^{91}$ is a hydrogen atom, and one of $X^1$, $X^2$ and $X^3$ is a dialkyl amino group, of the compounds represented by the formula (9-1), include the following compounds.

Compounds in which n in the formula (9-1) is 0:
(dimethylamino)dimethylvinylsilane,
(diethylamino)dimethylvinylsilane,
(dipropylamino)dimethylvinylsilane,
(dibutylamino)dimethylvinylsilane,
(dimethylamino)diethylvinylsilane,
(diethylamino)diethylvinylsilane,
(dipropylamino)diethylvinylsilane,
(dibutylamino)diethylvinylsilane.

Compounds in which n in the formula (9-1) is 1:
(dimethylamino)dimethyl(4-vinylphenyl)silane,
(dimethylamino)dimethyl(3-vinylphenyl)silane,
(diethylamino)dimethyl(4-vinylphenyl)silane,
(diethylamino)dimethyl(3-vinylphenyl)silane,
(dipropylamino)dimethyl(4-vinylphenyl)silane,
(dipropylamino)dimethyl(3-vinylphenyl)silane,
(dibutylamino)dimethyl(4-vinylphenyl)silane,
(dibutylamino)dimethyl(3-vinylphenyl)silane,
(dimethylamino)diethyl(4-vinylphenyl)silane,
(dimethylamino)diethyl(3-vinylphenyl)silane,
(diethylamino)diethyl(4-vinylphenyl)silane,
(diethylamino)diethyl(3-vinylphenyl)silane,
(dipropylamino)diethyl(4-vinylphenyl)silane,
(dipropylamino)diethyl(3-vinylphenyl)silane, (dibutylamino)diethyl(4-vinylphenyl)silane,
(dibutylamino)diethyl(3-vinylphenyl)silane.

Examples of a compound in which $R^{91}$ is a hydrogen atom, and two of $X^1$, $X^2$ and $X^3$ are a dialkyl amino group, of the compounds represented by the formula (9-1), include the following compounds.

Compounds in which n in the formula (9-1) is 0:
bis(dimethylamino)methylvinylsilane,
bis(diethylamino)methylvinylsilane,
bis(dipropylamino)methylvinylsilane,
bis(dibutylamino)methylvinylsilane,
bis(dimethylamino)ethylvinylsilane,
bis(diethylamino)ethylvinylsilane,
bis(dipropylamino)ethylvinylsilane,
bis(dibutylamino)ethylvinylsilane.

Compounds in which n in the formula (9-1) is 1:
bis(dimethylamino)methyl(4-vinylphenyl)silane,
bis(dimethylamino)methyl(3-vinylphenyl)silane,
bis(diethylamino)methyl(4-vinylphenyl)silane,
bis(diethylamino)methyl(3-vinylphenyl)silane,
bis(dipropylamino)methyl(4-vinylphenyl)silane,
bis(dipropylamino)methyl(3-vinylphenyl)silane,
bis(dibutylamino)methyl(4-vinylphenyl)silane,
bis(dibutylamino)methyl(3-vinylphenyl)silane,
bis(dimethylamino)ethyl(4-vinylphenyl)silane,
bis(dimethylamino)ethyl(3-vinylphenyl)silane,
bis(diethylamino)ethyl(4-vinylphenyl)silane,
bis(diethylamino)ethyl(3-vinylphenyl)silane,
bis(dipropylamino)ethyl(4-vinylphenyl)silane,
bis(dipropylamino)ethyl(3-vinylphenyl)silane,
bis(dibutylamino)ethyl(4-vinylphenyl)silane,
bis(dibutylamino)ethyl(3-vinylphenyl)silane.

Examples of a compound in which $R^{91}$ is a methyl group, and two of $X^1$, $X^2$ and $X^3$ are a dialkyl amino group, of the compounds represented by the formula (9-1), include the following compounds.

Compounds in which n in the formula (9-1) is 1:
bis(dimethylamino)methyl(4-isopropenylphenyl)silane,
bis(dimethylamino)methyl(3-isopropenylphenyl)silane,
bis(diethylamino)methyl(4-isopropenylphenyl)silane,
bis(diethylamino)methyl(3-isopropenylphenyl)silane,
bis(dipropylamino)methyl(4-isopropenylphenyl)silane,
bis(dipropylamino)methyl(3-isopropenylphenyl)silane,
bis(dibutylamino)methyl(4-isopropenylphenyl)silane,
bis(dibutylamino)methyl(3-isopropenylphenyl)silane,
bis(dimethylamino)ethyl(4-isopropenylphenyl)silane,
bis(dimethylamino)ethyl(3-isopropenylphenyl)silane,
bis(diethylamino)ethyl(4-isopropenylphenyl)silane,
bis(diethylamino)ethyl(3-isopropenylphenyl)silane,
bis(dipropylamino)ethyl(4-isopropenylphenyl)silane,
bis(dipropylamino)ethyl(3-isopropenylphenyl)silane,
bis(dibutylamino)ethyl(4-isopropenylphenyl)silane,
bis(dibutylamino)ethyl(3-isopropenylphenyl)silane.

Examples of a compound in which $R^{91}$ is a vinyl group, and two of $X^1$, $X^2$ and $X^3$ are a dialkyl amino group, of the compounds represented by the formula (9-1), include the following compounds.

Compounds in which n in the formula (9-1) is 0:
bis(dimethylamino)methyl(1-methylene-2-propenyl)silane,
bis(diethylamino)methyl(1-methylene-2-propenyl)silane,
bis(dipropylamino)methyl(1-methylene-2-propenyl)silane,
bis(dibutylamino)methyl(1-methylene-2-propenyl)silane,
bis(dimethylamino)ethyl(1-methylene-2-propenyl)silane,
bis(diethylamino)ethyl(1-methylene-2-propenyl)silane,
bis(dipropylamino)ethyl(1-methylene-2-propenyl)silane,
bis(dibutylamino)ethyl(1-methylene-2-propenyl)silane.

Examples of a compound in which $R^{91}$ is a phenyl group, and two of $X^1$, $X^2$ and $X^3$ are a dialkyl amino group, of the compounds represented by the formula (9-1), include the following compounds.

Compounds in which n in the formula (9-1) is 1:
1-{4-[bis(dimethylamino)methylsilyl]phenyl}-1-phenylethylene,
1-{4-[bis(diethylamino)methylsilyl]phenyl}-1-phenylethylene,
1-{4-[bis(dipropylamino)methylsilyl]phenyl}-1-phenylethylene,
1-{4-[bis(dibutylamino)methylsilyl]phenyl}-1-phenylethylene,
1-{4-[bis(dimethylamino)ethylsilyl]phenyl}-1-phenylethylene,
1-{4-[bis(diethylamino)ethylsilyl]phenyl}-1-phenylethylene,
1-{4-[bis(dipropylamino)ethylsilyl]phenyl}-1-phenylethylene,
1-{4-[bis(dibutylamino)ethylsilyl]phenyl}-1-phenylethylene.

Examples of a compound in which $R^{91}$ is a hydrogen atom, and three of $X^1$, $X^2$ and $X^3$ are a dialkyl amino group, of the compounds represented by the formula (9-1), include the following compounds.

Compounds in which n in the formula (9-1) is 0:
tris(dimethylamino)vinylsilane,
tris(diethylamino)vinylsilane,
tris(dipropylamino)vinylsilane,
tris(dibutylamino)vinylsilane.

Compounds in which n in the formula (9-1) is 1:
tris(dimethylamino)(4-vinylphenyl)silane,
tris(dimethylamino)(3-vinylphenyl)silane,
tris(diethylamino)(4-vinylphenyl)silane,
tris(diethylamino)(3-vinylphenyl)silane,
tris(dipropylamino)(4-vinylphenyl)silane,
tris(dipropylamino)(3-vinylphenyl)silane,
tris(dibutylamino)(4-vinylphenyl)silane,
tris(dibutylamino)(3-vinylphenyl)silane.

Examples of a compound in which $R^{91}$ is a methyl group, and three of $X^1$, $X^2$ and $X^3$ are a dialkyl amino group, of the compounds represented by the formula (9-1), include the following compounds.

Compounds in which n in the formula (9-1) is 1:
tris(dimethylamino)(4-isopropenylphenyl)silane,
tris(dimethylamino)(3-isopropenylphenyl)silane,
tris(diethylamino)(4-isopropenylphenyl)silane,
tris(diethylamino)(3-isopropenylphenyl)silane,
tris(dipropylamino)(4-isopropenylphenyl)silane,
tris(dipropylamino)(3-isopropenylphenyl)silane,
tris(dibutylamino)(4-isopropenylphenyl)silane,
tris(dibutylamino)(3-isopropenylphenyl)silane.

Examples of a compound in which $R^{91}$ is a vinyl group, and three of $X^1$, $X^2$ and $X^3$ are a dialkyl amino group, of the compounds represented by the formula (9-1), include the following compounds.

Compounds in which n in the formula (9-1) is 0:
tris(dimethylamino)(1-methylene-2-propenyl)silane,
tris(diethylamino)(1-methylene-2-propenyl)silane,
tris(dipropylamino)(1-methylene-2-propenyl)silane,
tris(dibutylamino)(1-methylene-2-propenyl)silane.

Examples of a compound in which $R^{91}$ is a phenyl group, and three of $X^1$, $X^2$ and $X^3$ are a dialkyl amino group, of the compounds represented by the formula (9-1), include the following compounds.

Compounds in which n in the formula (9-1) is 1:
1-[4-tris(dimethylamino)silylphenyl]-1-phenylethylene,
1-[4-tris(diethylamino)silylphenyl]-1-phenylethylene,
1-[4-tris(di-n-propylamino)methylsilylphenyl]-1-phenylethylene,
1-[4-tris(di-n-butylamino)methylsilylphenyl]-1-phenylethylene.

The compound represented by the formula (9) is preferably a compound represented by the formula (9-1), more preferably a compound represented by the formula (9-1), and two of $X^1$, $X^2$ and $X^3$ in the formula (9-1) are a dialkyl amino group, and still more preferably a compound represented by the formula (9-1), in which two of $X^1$, $X^2$ and $X^3$ in the formula (9-1) are a dialkyl amino group, $R^{31}$ is a hydrogen atom, and n is 0.

The compound represented by the formula (9) is particularly preferably a compound represented by the formula (9-1), in which two of $X^1$, $X^2$ and $X^3$ in the formula (9-1) are a dialkyl amino group, the remaining one is an alkyl group or an alkoxy alkyl group, $R^{91}$ is a hydrogen atom, and n is 0.

The compound represented by the formula (9) is most preferably
bis(dimethylamino)methylvinylsilane,
bis(diethylamino)methylvinylsilane,
bis(dipropylamino)methylvinylsilane,
bis(dibutylamino)methylvinylsilane,
bis(dimethylamino)ethylvinylsilane,
bis(diethylamino)ethylvinylsilane,
bis(dipropylamino)ethylvinylsilane, or
bis(dibutylamino)ethylvinylsilane.

The conjugated diene based polymer of the present invention preferably contains a monomer unit derived from an aromatic vinyl compound, in addition to a monomer unit derived from 1,3-butadiene, a monomer unit derived from isoprene, and a monomer unit derived from a compound having two conjugated carbon-carbon double bonds and one or more non-conjugated carbon-carbon double bond. Examples of the aromatic vinyl compound include styrene, α-methylstyrene, vinyltoluene, vinylnaphthalene, divinylbenzene, trivinylbenzene and divinylnaphthalene, and preferably styrene.

The content of the monomer unit derived from an aromatic vinyl compound is preferably not less than 9% by weight and more preferably not less than 14% by weight, based on 100% by weight of the total amount of the monomers. In addition, in order to enhance fuel cost-saving properties, the content of the monomer unit derived from an aromatic vinyl compound is preferably not more than 50% by weight and more preferably not more than 45% by weight.

When the conjugated diene based polymer of the present invention contains the monomer unit derived from an aromatic vinyl compound, the total amount of the content of the monomer unit derived from 1,3-butadiene, the content of the monomer unit derived from isoprene and the content of the monomer unit derived from an aromatic vinyl compound is preferably not more than 99.99% by weight, more preferably not more than 99.98% by weight, still more preferably not more than 99.96% by weight, yet still more preferably not more than 99.95% by weight, and particularly preferably not more than 99.8% by weight, based on 100% by weight of the total amount of the monomer units contained in the conjugated diene based polymer, and is preferably not less than 70% by weight, more preferably not less than 80% by weight, still more preferably not less than 90% by weight, yet still more preferably not less than 93% by weight, particularly preferably not less than 95% by weight, more particularly preferably not less than 96% by weight and most preferably not less than 96.5% by weight.

When the conjugated diene based polymer of the present invention contains the monomer unit derived from an aromatic vinyl compound, in order to enhance fuel cost-saving properties, the weight ratio of the total amount of the amount of the monomer unit derived from 1,3-butadiene and the amount of the monomer unit derived from isoprene to the amount of the monomer unit derived from an aromatic vinyl compound ((the amount of the monomer unit derived from 1,3-butadiene)+the amount of the monomer unit derived from isoprene/the amount of the monomer unit derived from an aromatic vinyl compound) is preferably not less than 50/50 and more preferably not less than 55/45. Also, in order to enhance grip properties and tensile strength, it is preferably not more than 90/10 and more preferably not more than 85/15.

In order to enhance tensile strength at break, the Mooney viscosity ($ML_{1+4}$) of the conjugated diene based polymer in the present invention is preferably not less than 10 and more preferably not less than 20. Also, in order to enhance processability, it is preferably not more than 200 and more preferably not more than 150. The Mooney viscosity ($ML_{1+4}$) is measured at 100° C. according to JIS K6300 (1994). ($ML_{1+4}$) has the following meaning.
M: Mooney viscosity
L: using a large rotor
1+4: a value measured after heating a sample for one minute, and then rotating a rotor at 2 rpm for 4 minutes In order to enhance fuel cost-saving properties, the vinyl bond content in the conjugated diene based polymer in the present invention is preferably not more than 80% by mole and more preferably not more than 70% by mole, based on 100% by mole of the content of the monomer units derived from at least one conjugated diene selected from 1,3-butadiene and isoprene. Also, in order to enhance grip properties, it is preferably not less than 10% by mole, more preferably not less than 15% by mole, still more preferably not less than 20% by mole, and particularly preferably not less than 40% by mole. The vinyl bond content is obtained by absorption intensity at around 910 $cm^{-1}$, which is an absorption peak of a vinyl group, using infrared spectrometry.

The preferred method for producing a conjugated diene based polymer of the present invention is a method in which monomer components in a hydrocarbon solvent are polymerized with an alkali metal catalyst, the monomer components including at least one conjugated diene selected from 1,3-butadiene and isoprene and a compound having two conjugated carbon-carbon double bonds and one or more non-conjugated carbon-carbon double bond.

Examples of the alkali metal catalyst include an alkali metal, an organic alkali metal compound, a complex of an alkali metal and a polar compound, and an oligomer having an alkali metal. Examples of the alkali metal include lithium, sodium potassium, rubidium, and cesium. Examples of the organic alkali metal compound include ethyllithium, n-propyllithium, iso-propyllithium, n-butyllithium, sec-butyllithium, t-octyllithium, n-decyllithium, phenyllithium, 2-naphthyllithium, 2-butylphenyllithium, 4-phenylbutyllithium, cyclohexyllithium, 4-cyclopentyllithium, dimethylaminopropyllithium, diethylaminopropyllithium, t-butyldimethylsilyloxypropyllithium,
N-morpholinopropyllithium, lithium hexamethyleneimide, lithium pyrrolidide, lithium piperidide, lithium heptamethyleneimide, lithium dodecamethyleneimide, 1,4-dithio-2-butene, sodium naphthalenide, sodium biphenylide, and potassium naphthalenide. In addition, examples of the complex of an alkali metal and a polar compound include a potassium-tetrahydrofuran complex, and a potassium-diethoxyethane complex, and examples of the oligomer having an alkali metal include a sodium salt of an α-methylstyrene tetramer. The alkali metal catalyst is preferably an organic lithium compound or an organic sodium compound, and more preferably an organic lithium compound having 2 to 20 carbon atoms or an organic sodium compound having 2 to 20 carbon atoms.

The hydrocarbon solvent is a solvent which does not inactivate an alkali metal catalyst. Examples of the hydrocarbon solvent include aliphatic hydrocarbons such as propane, butane, isobutane, pentane, isopentane and hexane, aromatic hydrocarbons such as benzene, toluene, xylene and ethylbenzene, and alicyclic hydrocarbons such as cyclopentane and cyclohexane. Two or more of these may be concurrently used.

The polymerization of the monomer components may be carried out in the presence of an agent for regulating the vinyl bond content of the monomer unit derived from at least one conjugated diene selected from 1,3-butadiene and isoprene and an agent for regulating distribution of the monomer unit derived from at least one conjugated diene selected from 1,3-butadiene and isoprene and the monomer unit derived from a compound having two conjugated carbon-carbon double bonds and one or more non-conjugated carbon-carbon double bond and other compounds in the conjugated diene based polymer chain (hereinafter, collectively referred to as "regulators").

Examples of the regulator include ether compounds, tertiary amines, phosphine compounds, alkali metal alkoxides, and alkali metal phenoxides. Examples of the ether compound include cyclic ethers such as tetrahydrofuran, tetrahydropyran and 1,4-dioxane; aliphatic monoethers such as diethyl ether and dibutyl ether; aliphatic diethers such as ethylene glycol dimethyl ether, ethylene glycol diethyl ether and ethylene glycol dibutyl ether; aliphatic triethers such as diethylene glycol diethyl ether and diethylene glycol dibutyl ether; and aromatic ethers such as diphenyl ether and anisole. Examples of the tertiary amine include triethylamine, tripropylamine, tributylamine, 1,1,2,2-tetramethylethylenediamine, N,N-diethylaniline, pyridine, and quinoline. Examples of the phosphine compound include trimethylphosphine, triethylphosphine, and triphenylphosphine. Examples of the alkali metal alkoxide include sodium-tert-butoxide, potassium-tert-butoxide, sodium-tert-pentoxide, and potassium-tert-pentoxide. Examples of the alkali metal phenoxide include sodium phenoxide and potassium phenoxide. Two or more of these may be concurrently used.

The amount of the alkali metal catalyst used in the polymerization of the monomer components is preferably 0.01 mmol to 15 mmol, per 100 g of the monomer components used in the polymerization.

Among the monomer components, in order to enhance fuel cost-saving properties, the amount of the compound having two conjugated carbon-carbon double bonds and one or more non-conjugated carbon-carbon double bond used in the polymerization is preferably not less than 0.01% by weight, more preferably not less than 0.02% by weight, and still more preferably not less than 0.05% by weight, based on 100% by weight of the total amount of the monomer components to be used. In order to enhance economical properties and to enhance grip properties, it is preferably not more than 30% by weight, more preferably not more than 10% by weight, and still more preferably not more than 5% by weight.

When the polymerization of the monomer components is carried out in a solution using hydrocarbon as a solvent, the concentration of the monomer components in the solution is usually 1% by weight to 50% by weight and preferably 5% by weight to 30% by weight.

The polymerization temperature is usually 25° C. to 100° C., preferably 35° C. to 90° C., and still more preferably 50° C. to 80° C. The polymerization time is usually 10 minutes to 5 hours.

In the method for producing a conjugated diene based polymer of the present invention, from the polymerization initiation of monomer components to the recovery of a polymer described below, a coupling agent may be added to a polymerization solution. Examples of the coupling agent include compounds represented by the following formula (10).

$$R^{100}{}_a M^1 L_{4-a} \quad (10)$$

wherein $R^{100}$ represents an alkyl group, an alkenyl group, a cycloalkenyl group or an aryl group, $M^1$ represents a silicon atom or a tin atom, L represents a halogen atom or a hydrocarbyloxy group, and a represents an integer of 0 to 2.

Examples of the coupling agent represented by the formula (10) include silicon tetrachloride, methyltrichlorosilane, dimethyldichlorosilane, tin tetrachloride, methyltrichlorotin, dimethyldichlorotin, tetramethoxysilane, methyltrimethoxysilane, dimethoxydimethylsilane, methyltriethoxysilane, ethyltrimethoxysilane, dimethoxydiethylsilane, diethoxydimethylsilane, tetraethoxysilane, ethyltriethoxysilane, and diethoxydiethylsilane.

When a coupling agent is added to a polymerization solution, in order to enhance the processability of the conjugated diene based polymer, the amount of the coupling agent added is preferably not less than 0.03 mol and more preferably not less than 0.05 mol, per mole of an alkali metal derived from an alkali metal catalyst. Also, in order to enhance fuel cost-saving properties, it is preferably not more than 0.4 mol and more preferably not more than 0.3 mol.

In the method for producing a conjugated diene based polymer of the present invention, before recovering a polymer from the solution in which the polymer is dissolved, the unreacted active terminal of the polymer may be treated with an alcohol such as methanol, isopropyl alcohol, or 1-butanol.

A known method can be used as a method for recovering a conjugated diene based polymer from the solution in which the polymer is dissolved, and examples include (e) a method of adding a coagulant to the solution containing a conjugated diene based polymer, and (f) a method of blowing steam to the solution containing a conjugated diene based polymer. The recovered conjugated diene based polymer may be dried with a known dryer such as a band dryer or an extrusion-type dryer.

Other polymer components, additives and the like may be incorporated into the conjugated diene based polymer of the present invention to prepare a polymer composition.

Examples of the other polymer components include styrene-butadiene copolymer rubbers, polybutadiene rubbers, butadiene-isoprene copolymer rubbers, and butyl rubbers. Also, examples thereof also include natural rubbers, ethylene-propylene copolymers, and ethylene-octene copolymers. Two or more of these polymer components may be concurrently used.

When other polymer components are incorporated into the conjugated diene based polymer of the present invention, in order to enhance fuel cost-saving properties, the content of the conjugated diene based polymer of the present invention in the polymer composition is preferably not less than 10% by weight and not more than 99.9% by weight, and more preferably not less than 20% by weight and not more than 90% by weight, based on 100% by weight of the total amount of the polymer components in the polymer composition (including the conjugated diene based polymer).

As the additives, known additives can be used, and examples thereof include vulcanization agents such as sulfur; vulcanization accelerators such as thiazole based vulcanization accelerators, thiuram based vulcanization accelerators, sulfenamide based vulcanization accelerators and guanidine based vulcanization accelerators; vulcanization activating agents such as stearic acid and zinc oxide; organic peroxides such as dicumyl peroxide and ditertiarybutyl peroxide; reinforcing agents such as silica and carbon black; fillers such as calcium carbonate, talc, alumina, clay, aluminum hydroxide and mica; silane coupling agents; extender oils; processing aids; anti-aging agents; and lubricants.

Examples of the sulfur include powdery sulfur, precipitated sulfur, colloidal sulfur, insoluble sulfur, and high dispersing sulfur. The amount of the sulfur incorporated is preferably 0.1 to 15 parts by weight, more preferably 0.3 to 10 parts by weight, and still more preferably 0.5 to 5 parts by weight, based on 100 parts by weight of the polymer components.

Examples of the vulcanization accelerator include thiazole based vulcanization accelerators such as 2-mercaptobenzothiazole, dibenzothiazyl disulfide and N-cyclohexyl-2-benzothiazyl sulfenamide; thiuram based vulcanization accelerators such as tetramethylthiuram monosulfide and tetramethylthiuram disulfide; sulfenamide based vulcanization accelerators such as N-cyclohexyl-2-benzothiazole sulfenamide, N-tert-butyl-2-benzothiazole sulfenamide, N-oxymethylene-2-benzothiazole sulfenamide, N-oxyethylene-2-benzothiazole sulfenamide and N,N'-diisopropyl-2-benzothiazole sulfenamide; and guanidine based vulcanization accelerators such as diphenylguanidine, diorthotolylguanidine and orthotolylbiguanidine. The amount of the vulcanization accelerator incorporated is preferably 0.1 to 5 parts by weight and more preferably 0.2 to 3 parts by weight, based on 100 parts by weight of the polymer components.

Examples of the reinforcing agent include silica, calcium silicate, aluminum silicate, and carbon black.

Examples of the silica include dry silica (anhydrous silicic acid), wet silica (hydrous silicic acid), colloidal silica, and precipitated silica. One or more of these can be used. The BET specific surface area of the silica is preferably 50 to 250 m$^2$/g. The BET specific surface area is measured according to ASTM D1993-03. As commercially available products, trade name Ultrasil VN3-G manufactured by Degussa, trade names VN3, AQ, ER and RS-150 manufactured by Tosoh Silica Corporation, trade name Zeosil 1115 MP and 1165 MP manufactured by Rhodia, and the like, can be used.

Examples of the carbon black include furnace black, acetylene black, thermal black, channel black, and graphite. Examples of the carbon black include channel carbon blacks such as EPC, MPC and CC; furnace carbon blacks such as SAF, ISAF, HAF, MAF, FEF, SRF, GPF, APF, FF, CF, SCF and ECF; thermal carbon black such as FT and MT; and acetylene carbon black. Two or more of these may be concurrently used.

The nitrogen adsorption specific surface area ($N_2SA$) of carbon black is preferably 5 to 200 m$^2$/g, and the dibutyl phthalate (DBP) absorption amount of carbon black is preferably 5 to 300 ml/100 g. The nitrogen adsorption specific surface area is measured according to ASTM D4820-93, and the DBP absorption amount is measured according to ASTM D2414-93. As commercially available products, trade name Dia Black N339 manufactured by Mitsubishi Chemical Corporation, trade names Seast 6, Seast 7HM and Seast KH manufactured by Tokai Carbon Co., Ltd., trade names CK 3 and Special Black 4A manufactured by Degussa, and the like, can be used.

In order to enhance abrasion resistance and strength, the content of the reinforcing agent in the polymer composition is preferably not less than 10 parts by weight, more preferably not less than 20 parts by weight, and still more preferably not less than 30 parts by weight, based on 100 parts by weight of the conjugated diene based polymer of the present invention. Also, in order to enhance reinforcing properties, it is preferably not more than 150 parts by weight, more preferably not more than 120 parts by weight, and still more preferably not more than 100 parts by weight.

Examples of the silane coupling agent include vinyltrichlorosilane, vinyltriethoxysilane, vinyltris(β-methoxyethoxy)silane, β-(3,4-epoxycyclohexyl)ethyltrimethoxysilane, γ-glycidoxypropyltrimethoxysilane, γ-methacryloxypropyltrimethoxysilane, N-(β-aminoethyl)-γ-aminopropyltrimethoxysilane, N-(β-aminoethyl)-γ-aminopropylmethyldimethoxysilane, N-phenyl-γ-aminopropyltrimethoxysilane, γ-chloropropyltrimethoxysilane, γ-mercaptopropyltrimethoxysilane, γ-aminopropyltriethoxysilane, bis(3-(triethoxysilyl)propyl)disulfide, bis(3-(triethoxysilyl)propyl)tetrasulfide, γ-trimethoxysilylpropyldimethylthiocarbamyl tetrasulfide, and γ-trimethoxysilylpropylbenzothiazyl tetrasulfide. One or more of these are used. As commercially available products, trade names Si69 and Si75 manufactured by Degussa, and the like, can be used.

The amount of the silane coupling agent incorporated is preferably 1 to 20 parts by weight, more preferably 2 to 15 parts by weight, and still more preferably 5 to 10 parts by weight, based on 100 parts by weight of the silica.

Examples of the extender oil include aromatic mineral oils (viscosity specific gravity constant (V.G.C. value) 0.900 to 1.049), naphthene mineral oils (V.G.C. value 0.850 to 0.899), and paraffin mineral oils (V.G.C. value 0.790 to 0.849). The polycyclic aromatic content of the extender oil is preferably less than 3% by weight, and more preferably less than 1% by weight. The polycyclic aromatic content is measured according to the United Kingdom Petroleum Industry Association 346/92 method. In addition, the content of aromatic compound (CA) of the extender oil is preferably not less than 20% by weight. One or more of these extender oils are used.

As a method of incorporating the other polymer components or additives into the conjugated diene based polymer of the present invention to produce a polymer composition, for example, a method of kneading each component with a known mixer such as a roll mixer or Bambury mixer can be used.

As kneading conditions, when additives other than the vulcanizing agent and the vulcanization accelerator are incorporated, the kneading temperature is usually 50° C. to 200° C. and preferably 80° C. to 190° C., and the kneading time is usually 30 seconds to 30 minutes and preferably 1 minute to 30 minutes. When the vulcanizing agent and the vulcanization accelerator are incorporated, the kneading temperature is usually 100° C. or lower, and preferably room temperature to 80° C. In addition, a composition in which the vulcanizing agent and the vulcanization accelerator are incorporated is usually subjected to vulcanization treatment such as press vulcanization for use. The vulcanization temperature is usually 120° C. to 200° C., and preferably 140° C. to 180° C.

The polymer composition of the present invention is excellent in fuel cost-saving properties and is suitably used in tires.

EXAMPLES

The evaluation of physical properties was performed by the following methods.

1. Mooney Viscosity ($ML_{1+4}$)

The Mooney viscosity of a polymer was measured at 100° C. according to JIS K6300 (1994).

2. Vinyl Bond Content (Unit: %)

The vinyl bond content of a monomer derived from 1,3-butadiene in the polymer was obtained by absorption intensity at around 910 $cm^{-1}$, which is an absorption peak of a vinyl group, using infrared spectrometry.

3. Content of Monomer Unit Derived from Styrene (Unit: % by Weight)

The content of a monomer unit derived from styrene in the polymer was obtained from a refractive index, according to JIS K6383 (1995).

4. Fuel Cost-Saving Properties

From a vulcanized sheet, a strip-like test piece having a width of 1 mm or 2 mm and a length of 40 mm was punched out and subjected to a test. For measurements, loss tangent (tan (70° C.)) of a test piece at a temperature of 70° C. was measured with a viscoelasticity measuring apparatus (manufactured by Ueshima Seisakusho Co., Ltd.) under the conditions of a strain of 1% and a frequency of 10 Hz. As this value is smaller, fuel cost-saving properties are more excellent.

5. Reaction Rate of 7-Methyl-3-Methylene-1,6-Octadiene (Unit: %)

The amount of the monomer unit derived from 7-methyl-3-methylene-1,6-octadiene in the polymer was obtained by carrying out $^{13}C$ NMR of the polymer. The reaction rate was obtained from the ratio of the monomer unit amount in the polymer to the charge amount of 7-methyl-3-methylene-1,6-octadiene.

Example 1

A polymerization reactor made of stainless steel, equipped with a stirring device and having an internal volume of 5 liters was washed and dried, and the gas inside the polymerization reactor was replaced with dry nitrogen. Then, 2.55 kg of industrial hexane (density 680 $kg/m^3$), 137 g of 1,3-butadiene, 43 g of styrene, 3.8 g of 7-methyl-3-methylene-1,6-octadiene, 1.5 ml of tetrahydrofuran and 1.0 ml of ethylene glycol diethyl ether were charged to the polymerization reactor. Next, in order to detoxify impurities causing inactivation of a polymerization initiator in advance, a small amount of a solution of n-butyllithium in hexane as a scavenger was charged to the polymerization reactor.

A solution of n-butyllithium in n-hexane (content of n-butyllithium: 2.75 mmol) was charged to the polymerization reactor, thereby a polymerization reaction was initiated.

The polymerization reaction was performed for 2.5 hours. During the polymerization reaction, the temperature in the polymerization reactor was adjusted to 65° C., and the solution in the polymerization reactor was stirred at a stirring rate of 130 rpm, while 205 g of 1,3-butadiene and 65 g of styrene were continuously supplied into the polymerization reactor. The charge amount of 7-methyl-3-methylene-1,6-octadiene was 0.84% by weight, based on 100% by weight of the total amount of the monomers charged or supplied to the polymerization reactor.

To the polymerization reactor was charged 5 ml of a solution of 0.2 ml of methanol in hexane, and the polymerization solution was stirred for 5 minutes.

To the polymerization reactor were added 1.8 g of 2-tert-butyl-6-(3-tert-butyl-2-hydroxy-5-methylbenzyl)-4-methylphenyl acrylate (trade name: Sumilizer GM, manufactured by Sumitomo Chemical Co., Ltd.) and 0.9 g of pentaerythrityltetrakis(3-laurylthiopropionate) (trade name: Sumilizer TP-D, manufactured by Sumitomo Chemical Co., Ltd.), then the polymer solution was evaporated at ordinary temperature for 24 hours, and further dried at 55° C. for 12 hours under reduced pressure to obtain a polymer. The evaluation results of the polymer are shown in Table 1. The amount of the monomer unit derived from 7-methyl-3-methylene-1,6-octadiene in the polymer was 0.79% by weight, the amount of the monomer unit derived from styrene was 24% by weight, and the residual monomer unit was a monomer unit derived from 1,3-butadiene. The reaction rate of 7-methyl-3-methylene-1,6-octadiene is shown in Table 2.

One hundred parts by weight of the resulting polymer, 50 parts by weight of carbon black (trade name: Diablack N339, manufactured by Mitsubishi Chemical Corporation), 10 parts by weight of an extender oil (trade name: JOMO Process NC-140, manufactured by Japan Energy Corporation), 1 part by weight of an anti-aging agent (trade name: Antigen 3C, manufactured by Sumitomo Chemical Co., Ltd.), 1.5 parts by weight of a wax (trade name: Sunnoc N, manufactured by Ouchi Shinko Chemical Industrial Co., Ltd.), 4 parts by weight of zinc oxide, 2 parts by weight of stearic acid, 1 part by weight of a vulcanization accelerator (trade name: Soxinol CZ, manufactured by Sumitomo Chemical Co., Ltd.), and 1.75 parts by weight of sulfur were kneaded with Laboplast Mill to prepare a polymer composition. The resulting polymer composition was molded into a sheet with a 6 inch roll, and the sheet was heated at 160° C. for 45 minutes for vulcanization to prepare a vulcanized sheet. The evaluation results of physical properties of the vulcanized sheet are shown in Table 1.

Reference Example 1

A polymerization reactor made of stainless steel, equipped with a stirring device and having an internal volume of 5 liters was washed and dried, and the gas inside the polymerization reactor was replaced with dry nitrogen. Then, 2.55 kg of industrial hexane (density 680 $kg/m^3$), 137 g of 1,3-butadiene, 43 g of styrene, 13.5 g of 7-methyl-3-methylene-1,6-octadiene, 1.5 ml of tetrahydrofuran and 1.0 ml of ethylene glycol diethyl ether were charged to the polymerization reactor. Next, in order to detoxify impurities causing inactivation of a polymerization initiator in advance, a small amount of a solution of n-butyllithium in hexane as a scavenger was charged to the polymerization reactor.

A solution of n-butyllithium in n-hexane (content of n-butyllithium: 2.75 mmol) was charged to the polymerization reactor, thereby a polymerization reaction was initiated.

The polymerization reaction was performed for 2.5 hours. During the polymerization reaction, the temperature in the polymerization reactor was adjusted to 65° C., and the solution in the polymerization reactor was stirred at a stirring rate of 130 rpm, while 205 g of 1,3-butadiene and 65 g of styrene were continuously supplied into the polymerization reactor. The charge amount of 7-methyl-3-methylene-1,6-octadiene was 2.91% by weight, based on 100% by weight of the total amount of the monomers charged and supplied to the polymerization reactor.

To the polymerization reactor was charged 5 ml of a solution of 0.2 ml of methanol in hexane, and the polymerization solution was stirred for 5 minutes.

To the polymerization reactor were added 1.8 g of 2-tert-butyl-6-(3-tert-butyl-2-hydroxy-5-methylbenzyl)-4-methylphenyl acrylate (trade name: Sumilizer GM, manufactured by Sumitomo Chemical Co., Ltd.) and 0.9 g of pentaerythrityltetrakis(3-laurylthiopropionate) (trade name: Sumilizer TP-D, manufactured by Sumitomo Chemical Co., Ltd.), then the polymer solution was evaporated at ordinary temperature for 24 hours, and further dried at 55° C. for 12 hours under reduced pressure to obtain a polymer. The amount of the monomer unit derived from 7-methyl-3-methylene-1,6-octadiene in the polymer was 2.7% by weight.

The reaction rate of 7-methyl-3-methylene-1,6-octadiene is shown in Table 2.

From the results of Example 1 and Reference Example, each monomer unit amount in the polymer was calculated assuming the reaction rate of 7-methyl-3-methylene-1,6-octadiene as 94% in the following examples.

Example 2

A polymerization reactor made of stainless steel, equipped with a stirring device and having an internal volume of 20 liters was washed and dried, and the gas inside the polymerization reactor was replaced with dry nitrogen. Then, 10.2 kg of industrial hexane (density 680 kg/m$^3$), 608 g of 1,3-butadiene, 192 g of styrene, 20 g of 7-methyl-3-methylene-1,6-octadiene, 6.1 ml of tetrahydrofuran and 3.9 ml of ethylene glycol diethyl ether were charged to the polymerization reactor. Next, in order to detoxify impurities causing inactivation of a polymerization initiator in advance, a small amount of a solution of n-butyllithium in hexane as a scavenger was charged to the polymerization reactor.

A solution of n-butyllithium in n-hexane (content of n-butyllithium: 13.0 mmol) was charged to the polymerization reactor, thereby a polymerization reaction was initiated.

The polymerization reaction was performed for 3 hours. During the polymerization reaction, the temperature in the polymerization reactor was adjusted to 65° C., and the solution in the polymerization reactor was stirred at a stirring rate of 130 rpm, while 912 g of 1,3-butadiene and 288 g of styrene were continuously supplied into the polymerization reactor. The charge amount of 7-methyl-3-methylene-1,6-octadiene was 0.99% by weight, based on 100% by weight of the total amount of the monomers charged and supplied to the polymerization reactor.

Next, while maintaining the polymerization reactor temperature at 65° C., the resulting polymerization solution was stirred at a stirring rate of 130 rpm in the polymerization reactor, 13.0 mmol of [3-(diethylamino)propyl]trimethoxysilane was added to the polymerization solution, and the mixture was stirred for 15 minutes.

To the polymerization reactor was charged 5 ml of a solution containing 0.8 ml of methanol in hexane, and the polymerization solution was stirred for 5 minutes.

To the polymerization reactor were added 8.0 g of 2-tert-butyl-6-(3-tert-butyl-2-hydroxy-5-methylbenzyl)-4-methylphenyl acrylate (trade name: Sumilizer GM, manufactured by Sumitomo Chemical Co., Ltd.) and 4.0 g of pentaerythrityltetrakis(3-laurylthiopropionate) (trade name: Sumilizer TP-D, manufactured by Sumitomo Chemical Co., Ltd.), then the polymer solution was evaporated at ordinary temperature for 24 hours, and further dried at 55° C. for 12 hours under reduced pressure to obtain a polymer. The evaluation results of the polymer are shown in Table 1. The amount of the monomer unit derived from styrene in the polymer was 24% by weight, the amount of the monomer unit derived from 7-methyl-3-methylene-1,6-octadiene obtained by assuming the reaction rate of 7-methyl-3-methylene-1,6-octadiene as 94% was 0.93% by weight, and the residual monomer unit was a monomer unit derived from 1,3-butadiene.

One hundred parts by weight of the resulting polymer, 50 parts by weight of carbon black (trade name: Diablack N339, manufactured by Mitsubishi Chemical Corporation), 10 parts by weight of an extender oil (trade name: JOMO Process NC-140, manufactured by Japan Energy Corporation), 1 part by weight of an anti-aging agent (trade name: Antigen 3C, manufactured by Sumitomo Chemical Co., Ltd.), 1.5 parts by weight of a wax (trade name: Sunnoc N, manufactured by Ouchi Shinko Chemical Industrial Co., Ltd.), 4 parts by weight of zinc oxide, 2 parts by weight of stearic acid, 1 part by weight of a vulcanization accelerator (trade name: Soxinol CZ, manufactured by Sumitomo Chemical Co., Ltd.), and 1.75 parts by weight of sulfur were kneaded with Laboplast Mill to prepare a polymer composition. The resulting polymer composition was molded into a sheet with a 6 inch roll, and the sheet was heated at 160° C. for 45 minutes for vulcanization to prepare a vulcanized sheet. The evaluation results of physical properties of the vulcanized sheet are shown in Table 1.

Example 3

A polymerization reactor made of stainless steel, equipped with a stirring device and having an internal volume of 20 liters was washed and dried, and the gas inside the polymerization reactor was replaced with dry nitrogen. Then, 10.2 kg of industrial hexane (density 680 kg/m$^3$), 608 g of 1,3-butadiene, 192 g of styrene, 20 g of 7-methyl-3-methylene-1,6-octadiene, 6.1 ml of tetrahydrofuran and 4.4 ml of ethylene glycol diethyl ether were charged to the polymerization reactor. Next, in order to detoxify impurities causing inactivation of a polymerization initiator in advance, a small amount of a solution of n-butyllithium in hexane as a scavenger was charged to the polymerization reactor.

13.4 mmol of a compound obtained by reacting 3-(diethylamino)propyllithium with isoprene [reaction ratio: isoprene/3-(diethylamino)propyllithium=2/1 (molar ratio), trade name: AI-200CE2 (cyclohexane solution), manufactured by FMC] as a cyclohexane solution was charged to the polymerization reactor as an alkali metal catalyst, thereby a polymerization reaction was initiated.

The polymerization reaction was performed for 3 hours. During the polymerization reaction, the temperature in the polymerization reactor was adjusted to 65° C., and the solution in the polymerization reactor was stirred at a stirring rate of 130 rpm, while 912 g of 1,3-butadiene and 288 g of styrene were continuously supplied into the polymerization reactor. The charge amount of 7-methyl-3-methylene-1,6-octadiene was 0.99% by weight, based on 100% by weight of the total amount of the monomers charged or supplied to the polymerization reactor.

Next, while maintaining the polymerization reactor temperature at 65° C., the resulting polymerization solution was stirred at a stirring rate of 130 rpm in the polymerization reactor, 13.4 mmol of N-[3-(dimethylamino)propyl]acrylamide was added to the polymerization solution, and the mixture was stirred for 15 minutes.

To the polymerization reactor was charged 5 ml of a solution containing 0.8 ml of methanol in hexane, and the polymerization solution was stirred for 5 minutes.

To the polymerization reactor were added 8.0 g of 2-tert-butyl-6-(3-tert-butyl-2-hydroxy-5-methylbenzyl)-4-methylphenyl acrylate (trade name: Sumilizer GM, manufactured by Sumitomo Chemical Co., Ltd.) and 4.0 g of pentaerythrityltetrakis(3-laurylthiopropionate) (trade name: Sumilizer TP-D, manufactured by Sumitomo Chemical Co., Ltd.), then the polymer solution was evaporated at ordinary temperature for 24 hours, and further dried at 55° C. for 12 hours under reduced pressure to obtain a polymer. The evaluation results of the polymer are shown in Table 1. The amount of the monomer unit derived from styrene in the polymer was 24% by weight, the amount of the monomer unit derived from 7-methyl-3-methylene-1,6-octadiene obtained by assuming the reaction rate of 7-methyl-3-methylene-1,6-octadiene as 94% was 0.93% by weight, and the residual monomer unit was a monomer unit derived from 1,3-butadiene.

One hundred parts by weight of the resulting polymer, 50 parts by weight of carbon black (trade name: Diablack N339, manufactured by Mitsubishi Chemical Corporation), 10 parts by weight of an extender oil (trade name: JOMO Process NC-140, manufactured by Japan Energy Corporation), 1 part by weight of an anti-aging agent (trade name: Antigen 3C, manufactured by Sumitomo Chemical Co., Ltd.), 1.5 parts by weight of a wax (trade name: Sunnoc N, manufactured by Ouchi Shinko Chemical Industrial Co., Ltd.), 4 parts by weight of zinc oxide, 2 parts by weight of stearic acid, 1 part by weight of a vulcanization accelerator (trade name: Soxinol CZ, manufactured by Sumitomo Chemical Co., Ltd.), and 1.75 parts by weight of sulfur were kneaded with Laboplast Mill to prepare a polymer composition. The resulting polymer composition was molded into a sheet with a 6 inch roll, and the sheet was heated at 160° C. for 45 minutes for vulcanization to prepare a vulcanized sheet. The evaluation results of physical properties of the vulcanized sheet are shown in Table 1.

Example 4

A polymerization reactor made of stainless steel, equipped with a stirring device and having an internal volume of 20 liters was washed and dried, and the gas inside the polymerization reactor was replaced with dry nitrogen. Then, 10.2 kg of industrial hexane (density 680 kg/m$^3$), 608 g of 1,3-butadiene, 192 g of styrene, 20 g of 7-methyl-3-methylene-1,6-octadiene, 6.1 ml of tetrahydrofuran and 4.4 ml of ethylene glycol diethyl ether were charged to the polymerization reactor. Next, in order to detoxify impurities causing inactivation of a polymerization initiator in advance, a small amount of a solution of n-butyllithium in hexane as a scavenger was charged to the polymerization reactor.

13.4 mmol of a compound obtained by reacting 3-(diethylamino)propyllithium with isoprene [reaction ratio: isoprene/3-(diethylamino)propyllithium=2/1 (molar ratio), trade name: AI-200CE2 (cyclohexane solution), manufactured by FMC] as a cyclohexane solution was charged to the polymerization reactor as an alkali metal catalyst, thereby a polymerization reaction was initiated.

The polymerization reaction was performed for 3 hours. During the polymerization reaction, the temperature in the polymerization reactor was adjusted to 65° C., and the solution in the polymerization reactor was stirred at a stirring rate of 130 rpm, while 912 g of 1,3-butadiene and 288 g of styrene were continuously supplied into the polymerization reactor. In addition, at 25 minutes after the polymerization initiation, 20 mL of a solution of 1.83 g of bis(diethylamino)methylvinylsilane in hexane was rapidly charged to the polymerization reactor. The charge amount of 7-methyl-3-methylene-1,6-octadiene was 0.99% by weight, and the charge amount of bis(diethylamino)methylvinylsilane was 0.09% by weight, based on 100% by weight of the total amount of the monomers charged or supplied to the polymerization reactor.

Next, while maintaining the polymerization reactor temperature at 65° C., the resulting polymerization solution was stirred at a stirring rate of 130 rpm in the polymerization reactor, 13.4 mmol of N-[3-(dimethylamino)propyl]acrylamide was added to the polymerization solution, and the mixture was stirred for 15 minutes.

To the polymerization reactor was charged 5 ml of a solution containing 0.8 ml of methanol in hexane, and the polymerization solution was stirred for 5 minutes.

To the polymerization reactor were added 8.0 g of 2-tert-butyl-6-(3-tert-butyl-2-hydroxy-5-methylbenzyl)-4-methylphenyl acrylate (trade name: Sumilizer GM, manufactured by Sumitomo Chemical Co., Ltd.) and 4.0 g of pentaerythrityltetrakis(3-laurylthiopropionate) (trade name: Sumilizer TP-D, manufactured by Sumitomo Chemical Co., Ltd.), then the polymer solution was evaporated at ordinary temperature for 24 hours, and further dried at 55° C. for 12 hours under reduced pressure to obtain a polymer. The evaluation results of the polymer are shown in Table 1. The amount of the monomer unit derived from styrene in the polymer was 25% by weight, the amount of the monomer unit derived from 7-methyl-3-methylene-1,6-octadiene obtained by assuming the reaction rate of 7-methyl-3-methylene-1,6-octadiene as 94% was 0.93% by weight, and the residual monomer unit was a monomer unit derived from 1,3-butadiene.

One hundred parts by weight of the resulting polymer, 50 parts by weight of carbon black (trade name: Diablack N339, manufactured by Mitsubishi Chemical Corporation), 10 parts by weight of an extender oil (trade name: JOMO Process NC-140, manufactured by Japan Energy Corporation), 1 part by weight of an anti-aging agent (trade name: Antigen 3C, manufactured by Sumitomo Chemical Co., Ltd.), 1.5 parts by weight of a wax (trade name: Sunnoc N, manufactured by Ouchi Shinko Chemical Industrial Co., Ltd.), 4 parts by weight of zinc oxide, 2 parts by weight of stearic acid, 1 part by weight of a vulcanization accelerator (trade name: Soxinol CZ, manufactured by Sumitomo Chemical Co., Ltd.), and 1.75 parts by weight of sulfur were kneaded with Laboplast Mill to prepare a polymer composition. The resulting polymer composition was molded into a sheet with a 6 inch roll, and the sheet was heated at 160° C. for 45 minutes for vulcanization to prepare a vulcanized sheet. The evaluation results of physical properties of the vulcanized sheet are shown in Table 1.

Comparative Example 1

A polymerization reactor made of stainless steel, equipped with a stirring device and having an internal volume of 20 liters was washed and dried, and the gas inside the polymerization reactor was replaced with dry nitrogen. Then, 10.2 kg of industrial hexane (density 680 kg/m$^3$), 608 g of 1,3-butadiene, 192 g of styrene, 6.1 ml of tetrahydrofuran and 4.0 ml of ethylene glycol diethyl ether were charged to the polymerization reactor. Next, in order to detoxify impurities causing inactivation of a polymerization initiator in advance, a small amount of a solution of n-butyllithium in hexane as a scavenger was charged to the polymerization reactor.

A solution of n-butyllithium in n-hexane (content of n-butyllithium: 12.4 mmol) was charged to the polymerization reactor, thereby a polymerization reaction was initiated.

The polymerization reaction was performed for 3 hours. During the polymerization reaction, the temperature in the polymerization reactor was adjusted to 65° C., and the solution in the polymerization reactor was stirred at a stirring rate of 130 rpm, while 912 g of 1,3-butadiene and 288 g of styrene were continuously supplied into the polymerization reactor.

To the polymerization reactor was charged 20 ml of a solution containing 0.8 ml of methanol in hexane, and the polymerization solution was stirred for 5 minutes.

To the polymerization reactor were added 8.0 g of 2-tert-butyl-6-(3-tert-butyl-2-hydroxy-5-methylbenzyl)-4-methylphenyl acrylate (trade name: Sumilizer GM, manufactured by Sumitomo Chemical Co., Ltd.) and 4.0 g of pentaerythrityltetrakis(3-laurylthiopropionate) (trade name: Sumilizer TP-D, manufactured by Sumitomo Chemical Co., Ltd.), then the polymer solution was evaporated at ordinary temperature for 24 hours, and further dried at 55° C. for 12 hours under reduced pressure to obtain a polymer. The evaluation results of the polymer are shown in Table 1. The amount of the monomer unit derived from styrene in the polymer was 25% by weight, and the residual monomer unit was a monomer unit derived from 1,3-butadiene.

One hundred parts by weight of the resulting polymer, 50 parts by weight of carbon black (trade name: Diablack N339, manufactured by Mitsubishi Chemical Corporation), 10 parts by weight of an extender oil (trade name: JOMO Process NC-140, manufactured by Japan Energy Corporation), 1 part by weight of an anti-aging agent (trade name: Antigen 3C, manufactured by Sumitomo Chemical Co., Ltd.), 1.5 parts by weight of a wax (trade name: Sunnoc N, manufactured by Ouchi Shinko Chemical Industrial Co., Ltd.), 4 parts by weight of zinc oxide, 2 parts by weight of stearic acid, 1 part by weight of a vulcanization accelerator (trade name: Soxinol CZ, manufactured by Sumitomo Chemical Co., Ltd.), and 1.75 parts by weight of sulfur were kneaded with Laboplast Mill to prepare a polymer composition. The resulting polymer composition was molded into a sheet with a 6 inch roll, and the sheet was heated at 160° C. for 45 minutes for vulcanization to prepare a vulcanized sheet. The evaluation results of physical properties of the vulcanized sheet are shown in Table 1.

TABLE 1

|  |  | Example 1 | Example 2 | Example 3 | Example 4 | Comparative Example 1 |
|---|---|---|---|---|---|---|
| Mooney Viscosity | — | 36 | 40 | 53 | 55 | 39 |
| Vinyl Bond Content | % | 56 | 55 | 57 | 56 | 57 |
| Content of Monomer Unit Derived from 7-Methyl-3-Methylene-1,6-Octadiene | % by weight | 0.79 | 0.93 | 0.93 | 0.93 | 0.00 |
| Content of Monomer Unit Derived from Styrene | % by weight | 24 | 24 | 24 | 25 | 25 |
| Fuel Cost-Saving Properties tan δ (70° C.) | — | 0.164 | 0.105 | 0.096 | 0.097 | 0.218 |

TABLE 2

|  |  | 7-Methyl-3-Methylene-1,6-Octadiene |
|---|---|---|
| Example 1 | Composition When Assuming Reaction Rate as 100% [mol %] | 0.39 |
|  | Composition Based on Analysis Result [mol %] | 0.37 |
|  | Reaction Rate [%] | 94 |
| Reference Example 1 | Composition When Assuming Reaction Rate as 100% [mol %] | 1.40 |
|  | Composition Based on Analysis Result [mol %] | 1.31 |
|  | Reaction Rate [%] | 94 |

What is claimed is:

1. A conjugated diene based polymer comprising a monomer unit derived from at least one conjugated diene selected from 1,3-butadiene and isoprene, and not more than 5% by weight of a monomer unit derived from a compound having two conjugated carbon-carbon double bonds and one or more non-conjugated carbon-carbon double bonds, and wherein the conjugated diene based polymer is modified with a group represented by the following formula (2):

wherein $R^{21}$ and $R^{22}$ are each independently selected from the group consisting of an optionally substituted hydrocarbyl group and a trihydrocarbylsilyl group, or $R^1$ and $R^{22}$ are bonded together and a group in which $R^{21}$ is bonded to $R^{22}$ represents a hydrocarbylene group optionally having one or more atoms selected from the group consisting of a nitrogen atom and an oxygen atom.

2. The conjugated diene based polymer according to claim 1, wherein the content of the monomer unit derived from the compound having two conjugated carbon-carbon double bonds and one or more non-conjugated carbon-carbon double bonds is not less than 0.01% by weight and not more than 5% by weight by weight where the total amount of the monomer units contained in the conjugated diene based polymer is taken as 100% by weight.

3. The conjugated diene based polymer according to claim 1, wherein the compound having two conjugated carbon-carbon double bonds and one or more non-conjugated carbon-carbon double bonds is 7-methyl-3-methylene-1,6-octadiene.

4. A polymer composition comprising the conjugated diene based polymer according to claim 1 and a reinforcing agent, wherein the content of the reinforcing agent is not less than 10 parts by weight and not more than 150 parts by weight per 100 parts by weight of the conjugated diene based polymer.

5. A method for producing a conjugated diene based polymer, wherein the method comprises:
(a) a step of polymerizing monomer components comprising at least one conjugated diene selected from 1,3-butadiene and isoprene, and a compound having two conjugated carbon-carbon double bonds and one or more non-conjugated carbon-carbon double bonds in a solvent to form a conjugated diene based polymer, a step of adding a compound having a group represented by the following formula (2) to the solvent, and a step of reacting an active terminal of the conjugated diene based polymer with the compound having a group represented by the following formula (2); or (b) a step of polymerizing monomer components comprising the at least one conjugated diene and a compound having two conjugated carbon-carbon double bonds and one or more non-conjugated carbon-carbon double bonds using an organic alkali metal compound having a group represented by the following formula (2); or (c) a step of polymerizing monomer components comprising the at least one conjugated diene and a compound having two conjugated carbon-carbon double bonds and one or more non-conjugated carbon-carbon double bonds using a secondary amino compound and an organic alkali metal compound having a group represented by the following formula (2); or (d) a step of polymerizing monomer components comprising the at least one conjugated diene, a compound having two conjugated carbon-carbon double bonds and one or more non-conjugated carbon-carbon double bonds, and a vinyl-based monomer having a group represented by the following formula (2):

wherein $R^{21}$ and $R^{22}$ are each independently selected from the group consisting of an optionally substituted hydrocarbyl group and a trihydrocarbylsilyl group, or $R^1$ and $R^{22}$ are bonded together and a group in which $R^{21}$ is bonded to $R^{22}$ represents a hydrocarbylene group optionally having one or more atoms selected from the group consisting of a nitrogen atom and an oxygen atom, and wherein the amount of the compound having two conjugated carbon-carbon double bonds and one or more non-conjugated carbon-carbon double bonds to be used is not more than 5% by weight where the total amount of the monomer components to be used is taken as 100% by weight.

6. The method according to claim 5, wherein the amount of the compound having two conjugated carbon-carbon double bonds and one or more non-conjugated carbon-carbon double bonds to be used is not less than 0.01% by weight and not more than 5% by weight where the total amount of the monomer components to be used is taken as 100% by weight.

* * * * *